(12) United States Patent
Ohno et al.

(10) Patent No.: US 7,677,436 B2
(45) Date of Patent: Mar. 16, 2010

(54) PRESENCE SYSTEM AND METHOD FOR PRESENCE MANAGEMENT

(75) Inventors: Takashi Ohno, Kawasaki (JP); Jun Kakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1252 days.

(21) Appl. No.: 11/070,295

(22) Filed: Mar. 3, 2005

(65) Prior Publication Data

US 2005/0218206 A1 Oct. 6, 2005

(30) Foreign Application Priority Data

Mar. 30, 2004 (JP) ............................. 2004-098202
Sep. 28, 2004 (JP) ............................. 2004-281470

(51) Int. Cl.
*G06F 17/00* (2006.01)
(52) U.S. Cl. ...................... 235/375; 709/204
(58) Field of Classification Search ................ 235/375, 235/376; 709/204, 227; 455/456.6
See application file for complete search history.

(56) References Cited

U.S. PATENT DOCUMENTS

2002/0116461 A1 8/2002 Diacakis et al.

(Continued)

FOREIGN PATENT DOCUMENTS

| JP | 2003-296525 | 10/2003 |
|---|---|---|
| KR | 2003-063421 | 7/2003 |

(Continued)

OTHER PUBLICATIONS

Search Report issued May 7, 2008 in corresponding European Patent Application No. 05251673.9.

(Continued)

*Primary Examiner*—Seung H Lee
(74) *Attorney, Agent, or Firm*—Staas & Halsey LLP

(57) ABSTRACT

A presence server stores a presence that is identified by presence IDs "a1" and "a2", as the presence of a user "A". User "A" can pass a card that they hold through a card reader at a timing of their choosing. The card reader reads in data from the card and transmits a renewal request to the presence server. The renewal request includes a renewer ID, an object ID, category information and the presence. When the presence server receives the renewal request, it specifies the presence ID "a1" of user "A" to be the presence that is to be renewed, based on the category information, and moreover, rewrites the presence of the presence ID "a1" to a presence "meeting room A" that is included in the renewal request. Thus, the card reader can renew the presence designated by the "category information". As for the presence that is renewed, it is notified to a watcher of the presence "a1" from the presence server.

14 Claims, 50 Drawing Sheets

U.S. PATENT DOCUMENTS

| | | |
|---|---|---|
| 2003/0014487 A1 | 1/2003 | Iwakawa et al. |
| 2003/0037103 A1 | 2/2003 | Salmi et al. |
| 2003/0065788 A1 | 4/2003 | Salomaki |
| 2003/0104819 A1 | 6/2003 | Knauerhase et al. |
| 2004/0019912 A1 | 1/2004 | Staack |

FOREIGN PATENT DOCUMENTS

| | | |
|---|---|---|
| KR | 2003-096373 | 12/2003 |
| KR | 2004-0005882 | 1/2004 |
| WO | 01/45322 | 6/2001 |
| WO | 02/093959 | 11/2002 |
| WO | 03/060752 | 7/2003 |
| WO | 03/065701 | 8/2003 |

OTHER PUBLICATIONS

H. Schulzrinne et al. "Rpids—Rich Presence Information Data Format for Presence Based on the Session Initiation Protocol (SIP)", Internet Engineering Task Force, Internet Draft, Feb. 18, 2003; Sections 1, 2, 5 , 6.1-6.13, 9.

Search Report issued Jun. 20, 2008 in corresponding European Patent Application No. 05251673.9.

Japanese Patent Office Action, mailed Jul. 8, 2008 and issued in corresponding Japanese Patent Application No. 2004-281470.

Office Action, mailed on Jul. 28, 2006, for a corresponding Korean Patent Application.

| category info. | check presence ID | content of presence | renewal destination presence ID | presence |
|---|---|---|---|---|
| position | a1 | work | a3 | renewal request content |
| | | | a4 | "work" |
| | | home | a3 | "home" |
| | | | a4 | renewal request content |

Fig. 6

Fig. 7 setting rules for presence use category info: position
conditions presence: a1
content of conditions presence: home
renewal destination presence: a4
presence:

create new presence
content of request

[add rule]

rules set up to present time

| category info. | conditions presence | content | presence | | |
|---|---|---|---|---|---|
| position | a1 | work | (content of request) | change | delete |
| position | a1 | work | work | change | delete |
| position | a1 | home | home | change | delete |

[enter] [cancel]

| category info. | watcher list conditions |
|---|---|
| position | set presence in which X is registered on watcher list |

16

*Fig. 8* notification request setting

| ID requested for notification | A |
| category info. for disclosure judgment | position |

[ enter ]  [ cancel ]

*Fig. 14A* disclosure category info. setting

| object presence | a1 ▼ |
| category info. with completed registration | (none) |
| category info. to add | position |

[ enter ]  [ cancel ]

*Fig. 14B* disclosure category info. operational setting

⦿ refuse notification request
○ confirm with user

[ enter ]  [ cancel ]

*Fig. 14C* subscription receiving screen notification request for category info. "GPS position" received from Y
please designate presence to disclose

|   | category info | presence | disclosure conditions |
|---|---|---|---|
| ☑ a1 | position | meeting room A | X,Y,Z |
| ☐ a2 | schedule | 10:00 to 12:00 meeting | X,Y,Z |

[ enter ]  [ edit disclosure conditions ]  [ cancel ]

| renewer ID | ×1 |
| --- | --- |
| presence | airport entrance |
| category info. | position |

| renewer ID | ×2 |
| --- | --- |
| presence | check-in entrance |
| category info. | procedure |

| renewer ID | ×3 |
| --- | --- |
| presence | boarding gate |
| category info. | procedure |

Fig. 28C please set the presence to renew by dragging the category info.

| presence ID | category info. |
|---|---|
| a1. | |
| a2. | | position procedure enter    cancel

*Fig. 30*

| time | user ID | category info. |
|---|---|---|
| 15:00 | T | position |
| 15:15 | G1 | position |
| 15:20 | G2 | position |

*Fig. 33*

| userID | classification |
|---|---|
| T | truck |
| G1 | goods |
| G2 | goods |
| ⋮ | ⋮ |

| classification | command type |
|---|---|
| goods | transfer request |
| truck | renewal request |

| time | userID |
|---|---|
| 15:00 | T |
| 15:01 | G1 |
| 15:02 | G2 |
| 15:10 | G3 |

| user ID | presence |
|---|---|
| T | cargo collection point CP1 |
| G1 | category: goods |
| G2 | category: goods |

| category | command |
|---|---|
| cargo collection point CP1 | renewal request |
| goods | transfer request |

| time | user ID |
|---|---|
| 15:00 | T |
| 15:01 | G1 |
| 15:02 | G2 |
| 15:10 | G3 |

Fig. 46C

PRESENCE SYSTEM AND METHOD FOR PRESENCE MANAGEMENT

BACKGROUND OF THE INVENTION

1. Field of the Invention

The present invention relates to presence systems. In presence systems, when a presence of a presence owner (henceforth referred to as a presentity) is renewed, this fact is notified in real time to a presence notification requester (henceforth referred to as a watcher).

In the present invention, "presence" refers to any information that the presentity may hold. For example, text messages, image data such as icons, audio data, numerical values, positional information or communication addresses that express the state of the presentity may be considered to be included in a presence. Furthermore, the presentity can be any entity that is capable of having a presence, such as a person or object, enterprise, organization or service.

2. Background Information

In a presence system, a single presentity is capable of possessing a plurality of presences. Furthermore, the presentity is capable of controlling which of the presences that the presentity possesses is notified to the watcher. The presentity is capable of freely determining the application of the presences that the presentity possesses.

Usually, a user who renews a presence is the owner of that presence. However, it has also been proposed that the owner of the presence bestows the right of renewal onto another presentity, and that the other presentity, who is not the owner of the presence, renews the presence. Assume, for example, that an owner of a presence A bestows the right of renewal of the presence onto a renewer B. It may occur, however, that the presentity A holds a plurality of presences. In this situation, the presentity assigns a unique ID to each presence. By designating the ID of the presence for which the right of renewal has been bestowed, the renewer B designates the presence to be renewed and performs the renewal.

Furthermore, technology that associates presences of a plurality of presentities has been described in JP 2003-296525A. More specifically, the association is set in advance, with one of two presentities set as a transfer origin, and the other as a transfer destination. When the presence of the transfer origin is renewed, then this fact is transmitted to the transfer destination, and the presence of the transfer destination is automatically updated to the same content. After this, at the transfer destination, a renewal notification is sent to the watcher of the presentity of the transfer destination.

On the other hand, RFID/IC cards have been the subject of much interest in recent years. The data written on these cards is capable of being automatically detected simply by the card passing through a gate provided with a card reader, and thus applications are expected in various fields such as distribution of goods, for example. When this RFID/IC card technology is applied to presence systems, the following becomes possible. For example, when a user who holds an IC card enters a meeting room A and passes the IC card through the card reader at the entrance, the presence that expresses that card holder's position is automatically changed to "meeting room A". More specifically, it is sufficient that the IC card records the card holder's ID, that the card reader reads in that information, and that the presence information of the card holder is renewed.

It is common that a presentity that possesses a plurality of presences does not wish that the entire structure of the presences that they possess to be disclosed to another party. On the other hand, the presentity that possesses a plurality of presences may feel that it is troublesome to update the presences one by one by themselves. Consequently, such a presentity will wish to automatically update his own presences without disclosing the entire structure of their presences.

On the other hand, in order to update the presences of the presentity, a renewer that renews the presences of the presentity must investigate the structure of the presences that the presentity possesses. For example, the renewer must get the presentity to inform it of the ID of the presence that the renewer is permitted to renew, and the alternatives of the content that can be set as the presence. If the presence that is to be renewed is dependent on the presence of another presentity, the renewer must also acquire that presence.

If the renewer is a card reader that reads RFID cards, RFID tags or IC cards, then it is not realistic if that the card reader designates which of the plurality of presences that the presentity possesses is to be renewed. This is because there is an unspecified multitude of owners of cards that the card reader reads in, and thus it is difficult for the card reader to judge presences of owners when they are disconnected from the card reader. Of course, the IDs of the presences that the card reader can renew can be fixed. However, this is not particularly favorable as it will lead to an infringement of the privacy of the owners of the presence.

That is, from the point of view of the presentity, there is a need to be able to easily renew a plurality of presences without great time and effort. On the other hand, from the point of view of the renewer, it is a burden to renew the presence while considering the privacy of the presentity. But then again, there is a problem of invasion of privacy of the presentity if the renewer freely renews the presences of the presentity.

Moreover, JP 2003-296525A does not consider the situation in which the presentity has a plurality of presences. Thus, if the presentity has a plurality of presences, then the presence system cannot determine which of the presences to transfer from the transfer origin to the transfer destination. Furthermore, there is also no means to determine which presence of the transfer destination to renew. On top of this, the presence that is transferred from the transfer origin to the transfer destination becomes a presence of the transfer destination. Thus, there is a problem in that the transfer origin may disclose a presence, originally owned by the transfer origin, to an unintentional watcher.

Furthermore, when another user (subscriber) requests permission to view a presence (subscription) of the user that has a plurality of presences (subscribee), the following problem occurs. Even within this, when the subscriber cannot make a subscription demand without knowing the structure of the presence of the subscribee, the burden on the subscriber increases. For example, the subscriber must investigate in advance which presence, from among the presences associated with the subscribee, is the information that the subscriber wishes to know. Furthermore, if the disclosure conditions of the presence are set, then the investigation of which presences are disclosed, and the selection of the presences from among these, is the responsibility of the subscriber. On the other hand, the subscribee may be concerned that disclosing the presence structure, including the content and the disclosure conditions set on his own presence may be a privacy or security problem.

It is an object of the present invention to reduce the burden on a presentity for renewing a presence of a presentity that has a plurality of presences, and also reduce the burden when a watcher views a presence of the presentity.

Furthermore, it is another object of the present invention to both protect the privacy of the presentity and reduce the burden on the renewer when, for example, a third party renews a presence of the presentity that has a plurality of presences.

SUMMARY OF THE INVENTION

In order to solve the problem, a first aspect provides a presence system to manage presences of a user identified by a user identifier that specifies the user. The system contains the following unit:

reception unit for receiving a renewal request that includes:

a user identifier of a renewer, who is a user other than the owner of the presences;

a user identifier of an object to be renewed, the object possessing a presence that the renewer attempts to set, and a presence that the renewer attempts to set;

category acquisition unit for acquiring category information associated with the renewer, wherein the category information represents the category of the content of the presence;

an association table that stores an association of the identifiers of the presences of the object to be renewed, and the category information;

presence specification unit for referring to the association table, and for specifying the presence identifier associated with the category information corresponding to the renewer, and presence setting unit for setting the presence included in the renewal request, with respect to the specified presence identifier.

When renewing a presence of a third party, there is no necessity for the renewer to know in advance the entire presence of that third party, or the presence identifiers. Consequently, it is possible to reduce the time and effort required by the renewer for the renewal process. Furthermore, the renewal can be carried out without the object whose presence is to be renewed by the renewer disclosing to the renewer the configuration, for example, of its own presence. Consequently, the privacy of the object to be renewed can be protected.

A second aspect provides the presence system of the first aspect, wherein the renewal request further includes the category information, and wherein the category acquisition unit acquires the category information from the reception unit.

When the renewer designates the category information and transmits the renewal request, the presence is set with respect to the presence identifier associated with that category information. For example, the renewer transmits the renewer X, the object that is to be renewed A, the category information "position" and the presence "meeting room". When this is done, of the presences of the user A the presence of the presence identifier a1, associated with the category information "position", is renewed to "meeting room". That is to say, provided that the presence identifier corresponding to the category information that the renewer specifies is present, the renewer can freely designate the category information, and can transmit the renewal request.

A third aspect provides the presence system of the first aspect, further comprising:

category information management unit for storing a category information management table that stores the category information in association with the user identifier of the renewer;

wherein the category acquisition unit acquires category information corresponding to the renewer from the category information management unit.

The category information management unit is provided on an inner portion, or an outer portion of a presence server. By referring to information that the category information management unit is storing, the renewer can specify which presence corresponding to the category information it is that they wish to renew.

A fourth aspect provides the presence system of the first aspect, further comprising:

a conversion rule table that stores conversion rules for converting the presence included in the renewal request into another presence, and conversion unit for converting the presence included in the renewal request in accordance with the conversion rules.

By converting the presence using the conversion rules, a presence that is understandable by the renewer can be converted to a presence that is easily understood by a watcher of the renewal setter. For example, assume a renewal setter, which is an owner of a presence, is a cargo A, and the renewer is a transport provider. By converting the presence set by the transport provider from a presence "cargo collection point ID" to "loading complete", a watcher of the presence of cargo A can easily monitor the state of the cargo A.

A fifth aspect provides a presence system, comprising the following unit:

a table of presences with attached category that associates and stores a presence identifier of a presence of each user, category information and the presence, a watcher list that stores a watcher that refers to the presence, for each presence identifier of the users;

first subscription receiving unit for receiving a subscription that includes category information corresponding to the presence that the subscriber wishes to subscribe to, a user identifier of the subscriber and a user identifier of a subscribee, and registration unit for specifying the presence identifier corresponding to the user identifier of the subscribee and the category information included in the subscription by searching a table of presences with attached category, and for registering the identifier of the user of the subscriber onto the watcher list of the given presence identifier.

The subscriber designates the category information and transmits the subscription, and thus it is not necessary to investigate in advance the configuration or the presence identifiers of the presence of the subscribee. Consequently, the subscriber can easily perform the subscription.

A sixth aspect provides the presence system of the fifth aspect, comprising:

a table of presences with attached category that stores a disclosure condition of a presence of each user in association with a presence identifier, category information and the presence;

a watcher list that stores a watcher that refers to a presence, for each presence of the users;

first subscription receiving unit for receiving a subscription that includes category information corresponding to the presence to which the subscriber wishes to subscribe, the user identifier of the subscriber and a user identifier of the subscribee, and disclosure judgment unit for judging whether or not the subscriber satisfies the disclosure conditions, from among the disclosure conditions of the presence of the subscribee, of the presence corresponding to the category information included in the subscription, and for registering the subscriber onto the watcher list of the subscribee if the disclosure conditions are satisfied.

The subscriber designates the category information and transmits the subscription, and thus it is not necessary to investigate in advance the configuration or the presence identifiers of the presence of the subscribee. Consequently, the subscriber can easily perform the subscription.

A seventh aspect provides the presence system of the fifth and sixth aspects, wherein the first subscription receiving unit refers the category information management table that stores the identifier of the user of the subscriber, in association with the category information, and provides the category information acquisition unit for acquiring the category information associated with the identifier of a user of the subscriber.

The presence system includes a presence server that manages the presence of a user, and a presence client that transmits renewal notifications and requests for permission to view the presence, to the presence server. The category information management unit is provided on the inner portion or the outer portion of the presence server. By refering to the information stored by the category information unit, the subscriber can specify which presence corresponding to the category information it is that they desire to view.

An eighth aspect provides a presence system comprising:

a first presence table that stores presences of each user in association with presence identifiers and category information;

a first watcher list that stores a watcher that refers to a presence, for each presence of the users;

first transfer request receiving unit for receiving a transfer request that includes a user identifier of a transfer origin of a presence, a user identifier of a transfer destination of the presence, and category information that is associated with the transfer of the presence;

first subscription creation unit for setting the transfer destination as a subscriber and setting the transfer origin as a subscribee, in response to receiving the transfer request, and for creating a subscription that includes category information in the transfer request;

first watcher registration unit for associating the user identifier of the transfer destination with the category information in the transfer request, and for registering them onto the watcher list of the transfer origin, based on the subscription, and notification unit with attached category information for notifying the category information included in the transfer request, and the presence of the transfer origin, to the transfer destination if the presence of the transfer origin is renewed.

When notifying the presence of the transfer origin to the transfer destination, it is possible to notify the category information at the same time. Consequently, the transfer requester can specify, from the category information, in which presence of the transfer destination they wish to cause to reflect the presence from the transfer origin. That is to say, it is possible to freely exchange the structure of the automatic renewal of the presence due to the transfer, where necessary.

A ninth aspect provides the presence system of the eighth aspect wherein the first presence table further stores disclosure conditions of the presence, and wherein the notification unit with attached category information, sets the disclosure conditions of the transfer origin to the disclosure conditions of the presence, from among the presences of the transfer destination, that correspond to the category information included in the transfer request.

When the class of the presence that it is desired to transfer using the category information is specified, the disclosure conditions of the presence of the transfer origin that corresponds to that category information are set as the disclosure conditions of the presence of the transfer destination corresponding to the category information. Consequently, due to a transfer request in which category information is used, the privacy of the transfer origin can be easily protected.

A tenth aspect provides the presence system of the ninth aspect, wherein if the disclosure conditions of the presence of the transfer origin have changed, the notification unit with attached category information, reflects the changes of the disclosure conditions of the transfer origin onto the disclosure conditions of the presence, from among the presences of the transfer destination, corresponding to the category information included in the transfer request.

The disclosure conditions of the transfer origin are set to the disclosure conditions of the transfer destination using the category information, after which changes to the disclosure conditions of the transfer origin are also reflected in the transfer destination. Consequently, even if the disclosure conditions of the transfer origin change, the privacy of the transfer origin can be automatically protected.

An eleventh aspect provides the presence system of the eighth and tenth aspects, wherein the first transfer request receiving unit includes the category information acquisition unit for referring to the category information management table that stores the identifier of the user who is the subscriber in association with the category information, and for acquiring the category information associated with the identifier of a user of the subscriber.

The presence system includes a presence server that manages the presence of a user and a presence client that transmits renewal notifications and requests for permission to view the presence to the presence server. The category information management unit is provided on the inner portion or the outer portion of the presence server. By referring to the information that the category information unit stores, it is possible to specify which presence, corresponding to the category information, it is that the transfer requester is requesting to transfer.

A twelfth aspect provides the presence system of the eighth aspect, further comprising:

a second presence table that stores the presences of each user in association with the presence identifiers and the disclosure conditions of the presences;

a second watcher list that stores a watcher that refers to a presence, for each presence of the users;

second transfer request receiving unit for receiving a transfer request that includes the user identifier of the transfer origin of the presence and the user identifier of the transfer destination of the presence;

second subscription creation unit for setting the transfer destination as the subscriber and setting the transfer origin as the subscribee, in response to receiving the transfer request, and for creating a subscription that includes the watcher list of the transfer destination; and second watcher registration unit for searching for a presence from the second presence table, from among the presences of the transfer origin whose transfer destination satisfies the disclosure conditions of that transfer origin, and for registering the user identifiers of the transfer destination onto the watcher list of the presence that was searched, based on the subscription.

Transfer of the presence of the transfer origin is performed within the range in which the transfer origin A permits its own presence to be distributed. Consequently, the privacy of the transfer origin can be protected.

A thirteenth aspect provides the presence system of the eighth aspect, further comprising:

a third presence table that stores the presences of each user in association with the presence identifiers and the disclosure conditions of the presences;

a third watcher list that stores a watcher that refers to a presence, for each presence of the users;

third transfer request receiving unit for receiving a transfer request that includes the user identifier of the transfer origin of the presence and the user identifier of the transfer destination of the presence;

third subscription creation unit for setting the transfer destination as the subscriber and setting the transfer origin as the subscribee, in response to receiving the transfer request, and for creating a subscription that includes the disclosure conditions of the transfer destination; and third watcher registration unit for searching for a presence from the presence table, from among the presences of the transfer origin whose transfer destination satisfies the disclosure conditions of that transfer origin, and for registering the user identifiers of the transfer destination onto the watcher list of the presence that was searched, based on the subscription.

According to this configuration, transfer is possible in the range in which the disclosure conditions of both the transfer destination and the transfer origin are satisfied. The transfer requester can make the transfer request without having to consider the configuration or privacy of the presences of the transfer origin, and the transfer destination.

A fourteenth aspect provides the presence system of the thirteenth aspect, wherein if the disclosure conditions of the presence of the transfer destination changes, then the third watcher registration unit changes the registered content of the watcher list, based on the disclosure conditions of the transfer destination.

When the disclosure conditions of the transfer destination change, it is possible that the range in which the disclosure conditions of the transfer origin and the transfer destination match, may change. In this situation, by re-evaluation of the watcher list of the presence that is transferred, the privacy of the transfer origin can be protected.

A fifteenth aspect provides a presence system, comprising:

A presence table with attached disclosure conditions that stores the presences of each user in association with a presence identifier, disclosure conditions of the presence and the transfer origin of the presence;

a watcher list that stores watchers that refer to a presence, for each presence of the users;

a second subscription receiving unit for receiving a subscription that includes a user identifier of the subscriber and a user identifier of the subscribee;

indirect subscription creation unit for creating a subscription to the transfer origin of the presence of the subscribee, the subscription including the user identifier of the subscriber, the user identifier of the subscribee and the user identifier of the transfer origin, and indirect subscription unit for retrieving for the presence that includes the subscribee in its watcher list from the presence table with attached disclosure conditions, and for registering the subscriber onto the watcher list of the subscribee, based on the retrieval result, wherein the retrieved presence is among the presences of the transfer origin, and the subscriber satisfies disclosure conditions of the retrieved presence.

Assume, for example, that the presence system receives a subscription involving a subscriber Y and a subscribes B. The presence of the subscribee B is transferred from a user A of the transfer origin. Assume also that the subscribee B is included in the watcher list of the presence "a1" of the user A. On top of this, the disclosure conditions of the presence "a1" permit disclosure to the subscriber Y. In this situation, from the subscription, the presence "a1" of the transfer origin A is transmitted from the transfer origin A to the transfer destination B, and from the transfer destination B to the subscriber Y. Consequently, by the subscription involving the subscriber Y and the subscribee B, the subscriber Y is registered on the watcher list of the subscribee. In the end, this registration adds the watcher of the subscriber B within the range of the disclosure conditions of the user A of the transfer origin.

A sixteenth aspect provides the presence method for managing presences of a user identified by a user identifier that specifies the user, the presence management method comprising:

a reception step for receiving a renewal request that includes:

a user identifier of a renewer, who is a user other than the owner of the presences;

a user identifier of an object to be renewed, the object possessing a presence that the renewer attempts to set, and a presence that the renewer attempts to set;

a category acquisition step for acquiring category information associated with the renewer, wherein the category information represents the category of the content of the presence;

an association memory step for storing an association table that stores an association of the identifiers of the presences of the object to be renewed, and the category information;

a presence specification step for referring to the association table, and for specifying the presence identifier associated with the category information corresponding to the renewer, and a presence setting step for setting the presence included in the renewal request, associated with the specified presence identifier.

A seventeenth aspect provides a computer readable recording medium on which a presence management program is recorded in order to execute the management of presences of a user identified by a user identifier that specifies the user. The presence management program comprising:

a reception step for receiving a renewal request that includes:

a user identifier of a renewer, who is a user other than the owner of the presences;

a user identifier of an object to be renewed, the object possessing a presence that the renewer attempts to set, and a presence that the renewer attempts to set;

a category acquisition step for acquiring category information associated with the renewer, wherein the category information represents the category of the content of the presence;

an association memory step for storing an association table that stores an association of the identifiers of the presences of the object to be renewed, and the category information;

a presence specification step for referring to the association table, and for specifying the presence identifier associated with the category information corresponding to the renewer, and a presence setting step for setting the presence included in the renewal request, associated with the specified presence identifier.

An eighteenth aspect provides a presence management program for managing presences of a user identified by a user identifier that specifies the user. The presence program causing a computer to function as:

reception unit for receiving a renewal request that includes:

a user identifier of a renewer, who is a user other than the owner of the presences;

a user identifier of an object to be renewed, the object possessing a presence that the renewer attempts to set, and a presence that the renewer attempts to set;

category acquisition unit for acquiring category information associated with the renewer, wherein the category information represents the category of the content of the presence;

an association table that stores an association of the identifiers of the presences of the object to be renewed, and the category information;

presence specification unit for referring to the association table, and for specifying the presence identifier associated with the category information corresponding to the renewer, and presence setting unit for setting the presence included in the renewal request, associated with the specified presence identifier.

A nineteenth aspect provides the presence system of the first aspect, further comprising:

requester memory unit for storing the user identifier of the renewer and the category information associated with the renewer;

category information notification unit for notifying the category information associated with the renewer, to the object to be renewed before the reception unit receives the transfer request, and association reception unit for receiving an association of the identifier of each presence of the object that is to be renewed with the category information associated with the renewer, and storing it in the association table.

Take, for example, a situation in which the renewer is a card reader. The user identifier of the card reader and the category information of the card reader are stored in the card reader. The category information of the card reader that the object that is to be renewed is to use, is notified in advance to the object that is to be renewed, and an association is created between the object that is to be renewed and its own presence ID. Accordingly, when the card reader transmits the renewal request that has attached category information to the presence server, the presence ID that corresponds to the category information is definitely present.

A twentieth aspect provides the presence system of the fifth aspect, further comprising:

requester memory unit for storing the user identifier of the subscriber and the category information associated with the subscriber;

category information notification unit for notifying the category information associated with the subscriber to the subscribee before the first subscription receiving unit receives the subscription; and association reception unit for receiving the association of the identifiers of the presences of the subscribee and the category information associated with the subscriber, and for storing the association in the table of presences with attached category;

wherein the registration unit specifies the given presence identifier, based on the association of the identifiers of the presences of the subscribee, and the category information associated with the subscriber.

Take, for example, a situation in which the subscriber is a card reader. The user identifier of the card reader and the category information of the card reader are stored in the card reader. The category information of the card reader that the subscribee is to use, is notified in advance to the subscribee, and an association is created between the subscribee and its own presence ID. Accordingly, when the card reader transmits the subscription that has attached category information to the presence server, the presence ID that corresponds to the category information is definitely present.

A twenty-first aspect provides the presence system of the sixth aspect, further comprising:

requester memory unit for storing the user identifier of the subscriber and the category information associated with the subscriber;

category information notification unit for notifying the category information associated with the subscriber to the subscribee before the first subscription receiving unit receives the subscription, and association reception unit for receiving the association of the identifiers of the presences of the subscribee and the category information associated with the subscriber, and for storing the association in the table of presences with attached category;

wherein the disclosure judgment unit specifies the presence identifier of the subscribee that corresponds to the category information included in the subscription, based on the association of the identifiers of the presences of the subscribee, and the category information associated with the subscriber, and if the subscriber satisfies the disclosure conditions corresponding to the presence identifiers thereof, then the disclosure judgment unit registers the subscriber onto the watcher list.

Take, for example, a situation in which the subscriber is a card reader. The user identifier of the card reader and the category information of the card reader are stored in the card reader. The category information of the card reader that the subscribee is to use is notified in advance to the subscribee, and an association is created between the subscribee and its own presence ID. Accordingly, when the card reader transmits the subscription that has attached category information to the presence server, the presence ID that corresponds to the category information is definitely present. Consequently, if the subscriber satisfies the disclosure conditions of the subscribee, then the subscriber is registered onto the watcher list of the subscribee.

A twenty-second aspect provides the presence system of the eighth aspect, further comprising:

requester memory unit for storing the user identifier of the transfer destination and the category information associated with the transfer destination;

category information notification unit for notifying the category information associated with the transfer destination to the transfer origin, before the reception unit receives the transfer request, and association reception unit for receiving the association of the identifiers of the presences of the transfer origin and the category information associated with the transfer destination, and storing the association in the first presence table;

wherein the first watcher registration unit specifies the presence identifier of the transfer origin corresponding to the category information included in the transfer request and the subscription, and registers the user identifier of the transfer destination and the category information onto the watcher list of the presence identifier thereof.

Take, for example, a situation in which the transfer requester is a card reader. The user identifier of the card reader and the category information of the card reader are stored in the card reader. The category information of the card reader that the transfer destination is to use, is notified in advance to the transfer destination, and an association is created between the transfer destination and its own presence ID. Accordingly, when the card reader transmits the transfer request that has attached category information to the presence server, the presence ID that corresponds to the category information is definitely present.

A twenty-third aspect provides the presence system that manages presences of a user identified by a user identifier. The presence system comprising:

acquisition unit for acquiring a user identifier of a requester, who is a user other than the owner of a given presence, a user identifier of an object that possesses a presence and category information that expresses the category of any presence, and that is associated with the renewer or the object;

deciding unit for determining the type of command to process the presence of the object;

command creation unit for creating commands that include the type of the command that the deciding unit determines, category information that the acquiring unit acquires, and the user identifier of the object; and command execution unit for receiving commands created by the command creation unit, for performing renewal of the presence of the object, subscription/subscription cancellation, or transfer/transfer cancellation in accordance with the commands thereof.

This presence system generates commands for renewal requests, subscriptions/subscription cancellations and transfers/transfer cancellations used in the presence systems according to appendices 1 to 18. That is, these commands, which have attached categories, can be automatically generated by card readers and presence servers.

A twenty-fourth aspect provides the presence system of the twenty-third, further comprising:

The presence system according to claim 23, wherein the acquisition unit further acquires an acquisition time of the user identifier of the requester, the presence system further comprising:

history memory unit for storing acquired history including the user identifier of the object and the acquisition time, wherein when a user identifier of a new requester is acquired, the judgment unit judges whether or not the user identifier of the object was acquired within a past predetermined time interval ΔT, based on the acquisition history, and determines the type of the command based on the decision.

For example, if the data acquired within the past ΔT is in the acquisition history, then the type of the command is "transfer request". On the contrary, if the data acquired within the past ΔT is not in the acquisition history, then the type of the command is "renewal request".

A twenty-fifth aspect provides the presence system of the twenty-fourth aspect, wherein if the type of the command that was decided is transfer, then the judgment unit sets any one of the user identifiers of the objects acquired within the past predetermined time interval ΔT to be the user identifier of the transfer origin user.

For example, a situation can be considered in which the object having the oldest acquisition time of the past predetermined time interval ΔT is set to be the transfer origin user.

A twenty-sixth aspect provides the presence system of the twenty-third aspect, further comprising: further comprising:

corresponding memory unit for storing the association of the user identifier of the object and the type of the command;

wherein the judgment unit determines the command type corresponding to the user identifier of the object based on the association stored in the corresponding memory unit.

By directly, or indirectly associating the user identifier of the object and the type of the command, the acquisition unit can determine the command that corresponds to the acquired object.

A twenty-seventh aspect provides the presence system of the twenty-sixth aspect, wherein the acquisition unit further acquires an acquisition time of the user identifier of the requester, the presence system further comprising:

history memory unit for storing an acquisition history including the user identifier of the object and the acquisition timing thereof;

wherein the judgment unit groups the user identifier of the object based on the acquisition history, and if the command type is transfer or subscription, then the judgment unit specifies the user identifier that will be the transfer origin and the subscribee, within the single group.

For example, if there is a given time interval or greater between acquisition times, then that is judged to be a break between single groups, and grouping of the objects in the acquisition history can be considered. By grouping, buffering to create the commands is possible after a certain accumulation of acquisition history, rather than after acquiring every new acquisition history. This is because the transfer origin or subscribee can be determined within a single group.

A twenty-eighth aspect provides the presence system of the twenty-third aspect, further comprising:

presence content acquisition unit for acquiring the content of a presence based on the user identifier of the object and the category information corresponding to the requester or the object;

wherein the judgment unit judges whether or not the transfer origin is set in the acquired presence content, and designates the command type as either transfer or transfer cancellation, based on the judgment result.

As another method for automatically creating commands, depending on whether the transfer is already set in the presence or not, there is a method for creating a transfer command or a transfer cancellation command. In a similar manner, a subscription command or a subscription cancellation command can be created, depending on whether a watcher of the presence is already set or not.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

FIG. 6 is a diagram showing another example of the association table.

FIG. 7 is an example of a screen for registering the association table of FIG. 6.

FIG. 8 is a diagram showing another example of the association table.

FIG. 14A is an example of a screen for the subscriber to create a subscription attached category information, FIG. 14B is an example of a screen for the subscribee to associate the presence and the category information, FIG. 14C is an example of a screen during reception of a subscription with attached category information, and FIG. 14D is an example of a screen when "confirm with user" is selected in FIG. 14C.

FIG. 28 is a conceptual diagram of a category list that is stored in the card readers of FIG. 27.

FIG. 30 is a diagram showing an example of a screen for notifying a category information list.

FIG. 33 is a conceptual diagram of history information that is stored in a history memory portion of FIG. 32.

FIG. 42A is a conceptual diagram of a user-classification table that is stored in a classification memory portion of FIG. 41, FIG. 42B is a conceptual explanatory diagram of a classification-command table that is stored in the classification memory portion of FIG. 41 and FIG. 42C is a conceptual explanatory diagram of a history table that is stored in the classification memory portion of FIG. 41.

FIG. 46A is a conceptual diagram of a user-presence table that is stored in a presence memory portion of FIG. 45, FIG. 46B is a conceptual explanatory diagram of a presence-command table that is stored in the presence memory portion of FIG. 45, and FIG. 46C is a conceptual diagram of a history table that is stored in the presence memory portion of FIG. 45.

DETAILED DESCRIPTION OF THE PREFERRED EMBODIMENTS

Overview

Figure 1:
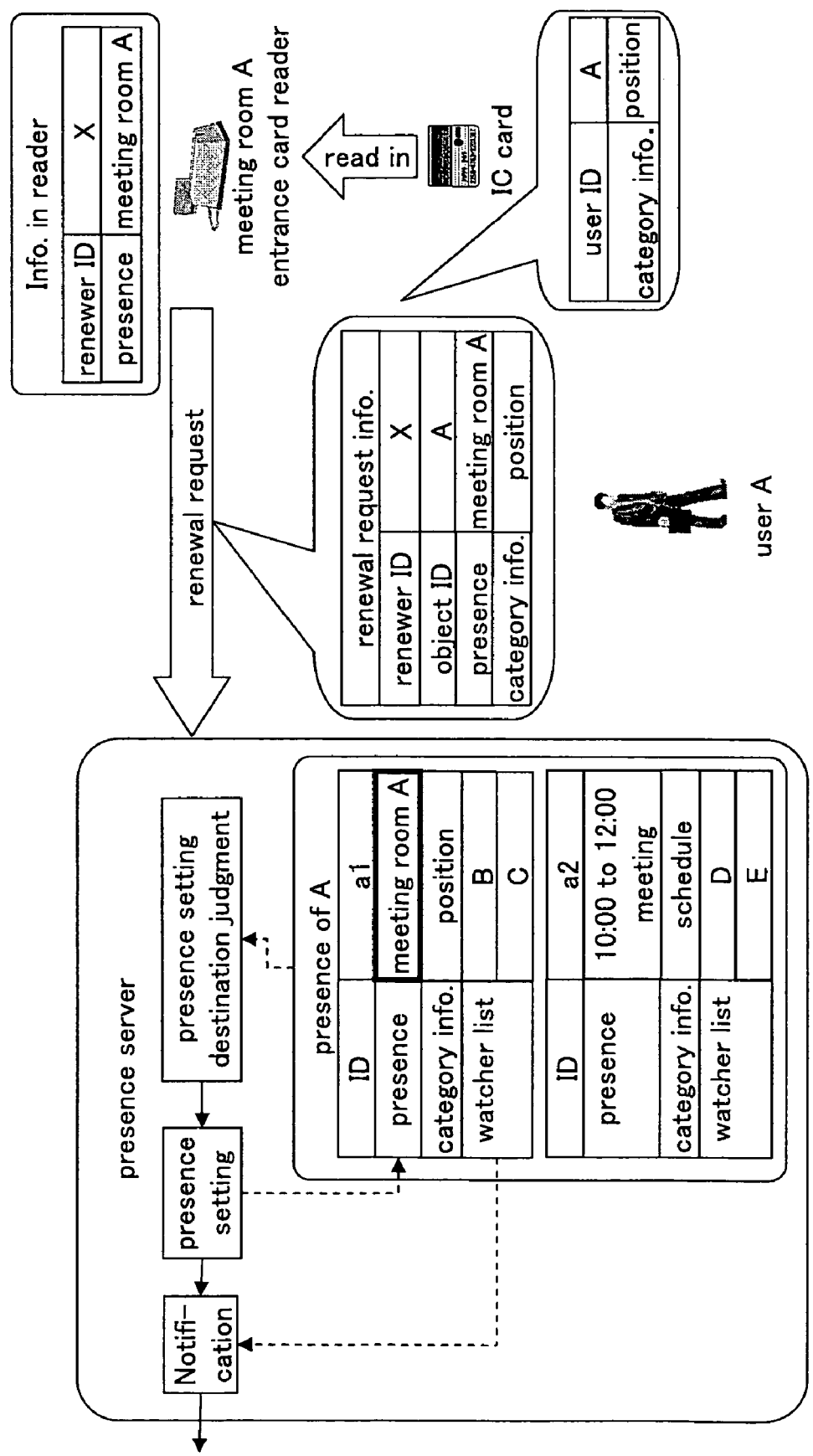
FIG. 1 is a conceptual diagram of the present invention.

FIG. 1 is a diagram of the presence system that shows the concept of the present invention. The presence system is constituted by a presence server and a plurality of presence clients that are connected via a network. The presence server manages the presence of the presentities and notifies renewal of presences to watchers of the presences. A presentity is a user who possesses a presence. A watcher is a user who observes the presence of a presentity. A presence client notifies the presence server of requests for renewals of presences, and receives renewal notifications of presences from the presence server, among other things. Users who may be presentities or watchers are people, organizations, objects and services, for example, and they are identified in the presence system by user IDs. The user of user ID "A" is hereby referred to as user A, presentity A or watcher A. Other user IDs will be identified in the same manner.

The presence server stores a presence of a user A, distinguishing between presence IDs "a1" and "a2". User A holds a card, and can pass the card through a card reader at any time. The card reader reads in the data on the card, and transmits a renewal request to the presence server. The following information (a) to (d) is included in the renewal request.

(a) Renewer ID: In this situation, this is the user ID that is assigned to the card reader. It identifies the transmission origin of the renewal request.

(b) Object ID: This specifies the ID of the user whose presence is to be set, which is included in the renewal request.

(c) Category information: Class of the presence.

(d) Presence: This specifies the presence of the user specified by the object ID.

Of the foregoing information, (a) renewer ID and (d) presence are stored in the card reader. (b) User ID and (c) category information are recorded on the card held by the user A.

When the presence server receives the renewal request, it specifies the presence ID "a1" of the user A as that to be renewed, in accordance with the category information. Moreover, the presence server rewrites the presence of the presence ID "a1" to the presence "meeting room A", which is included in the renewal request. Accordingly, the card reader can renew the presence that is designated by the "category information". The renewed presence is notified to watchers of the presence "a1" from the presence server.

Figure 2:
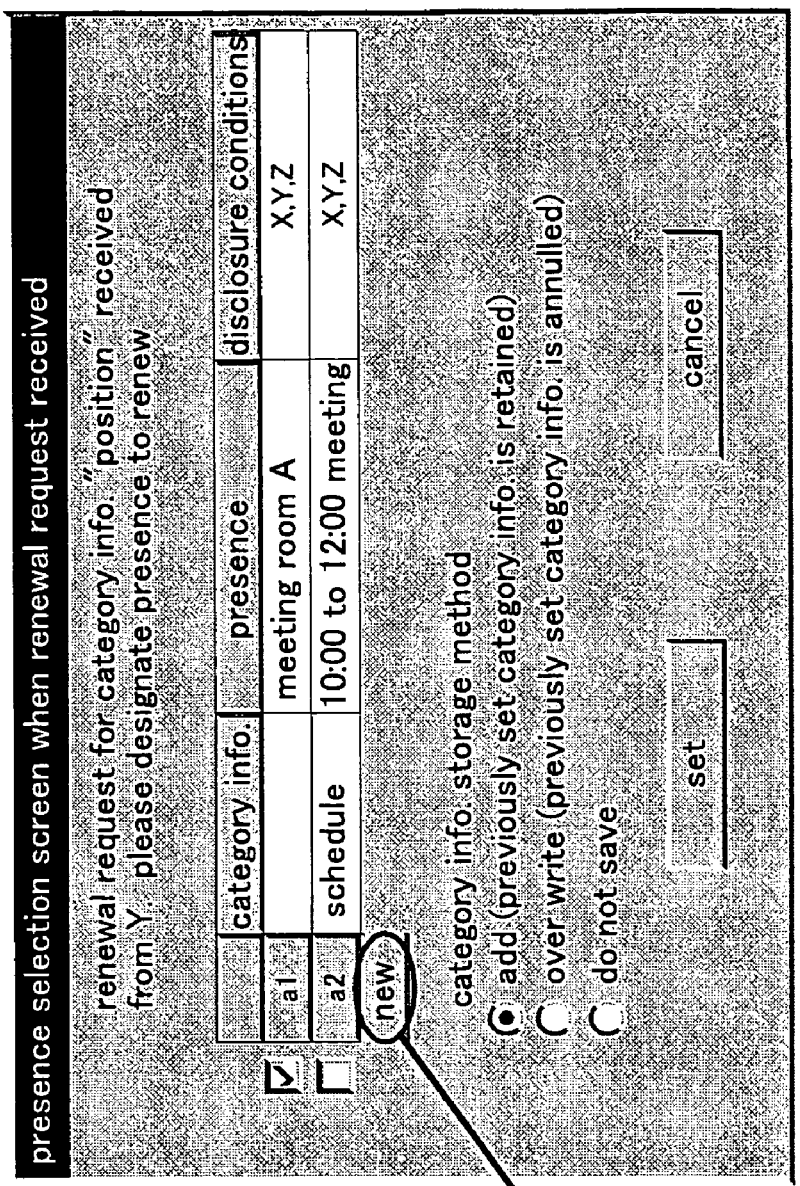
FIG. 2 is an example of a screen showing a situation in which a request to renew a presence of a presentity A has been received from a user Y.

FIG. 2 is an example of a screen showing that there was a renewal request for the presence of the presentity A from a user Y. The presence server transmits the screen example to a presence client operated by user A, for example, and notifies the presence client of a renewal request from third parties. As shown in this diagram, the presentity can freely associate the presences that they hold themselves, with respect to the category information that the renewer has designated.

First Embodiment

Functional Configuration of the Entire System

Figure 3:
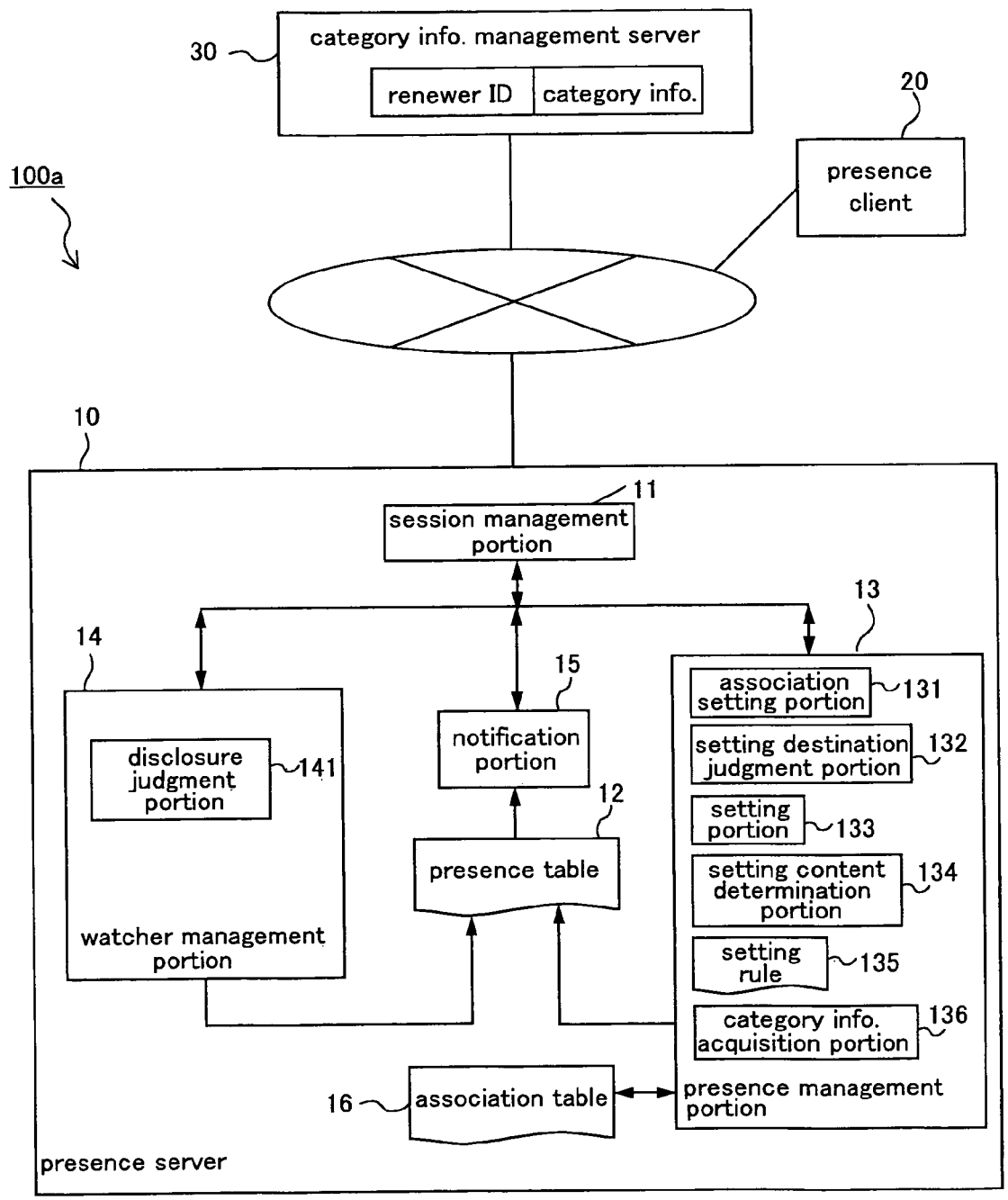
FIG. 3 is a structural overview of a presence system according to a first embodiment of the present invention.

FIG. 3 is a structural overview of a presence system 100a according to the first embodiment of the present invention. The presence system 100a is constituted by a presence server 10 and a presence client 20 that are connected via a network. The presence system 100a may also include a category information management server 30.

The presence server 10 has a session management portion 11, presence tables 12, a presence management portion 13, a watcher management portion 14, a notification portion 15 and an association table 16. The session management portion 11 passes data between the network and the constituent elements within the presence server 10. A presence table 12 is managed for each user, and it records at least their presence ID and their presence. In this example, the presence table 12 includes a watcher list for each presence. Moreover, the presence table 12 is set to include disclosure conditions for each presence.

When the presence management portion 13 receives a renewal notification of a presence, it updates the presence table 12. When the watcher management portion 14 receives a subscription, it updates the watcher list in the presence table 12. When the notification portion 15 receives notification of renewal of a presence, it notifies the watchers of the presence thereof about the new presence. The association table 16 defines the association between the category information and the presences. In the present embodiment, the presence of a third party is renewed using the category information.

Function of Each Part of the Presence Server>

The presence management portion 13 has an association setting portion 131, and preferably has a setting destination judgment portion 132, a setting portion 133, and a setting content determination portion 134 and a setting rule 135 and/or a category information acquisition portion 136. Furthermore, the watcher management portion 14 preferably has a disclosure judgment portion 141. These functions are described in more detail below.

(1) Association of the Category Information and the Presence.

The association table 16 relates the category information and the presence. The association setting portion 131 provides the screen to the presence client 20, receives registrations to the association table 16 and registers the content that was received onto the association table 16. Details of the relationship between the category information and the presence are described with reference to FIGS. 4 to 9.

Figure 4:
FIG. 4 is a diagram showing an example of an association table.
Figure 5:
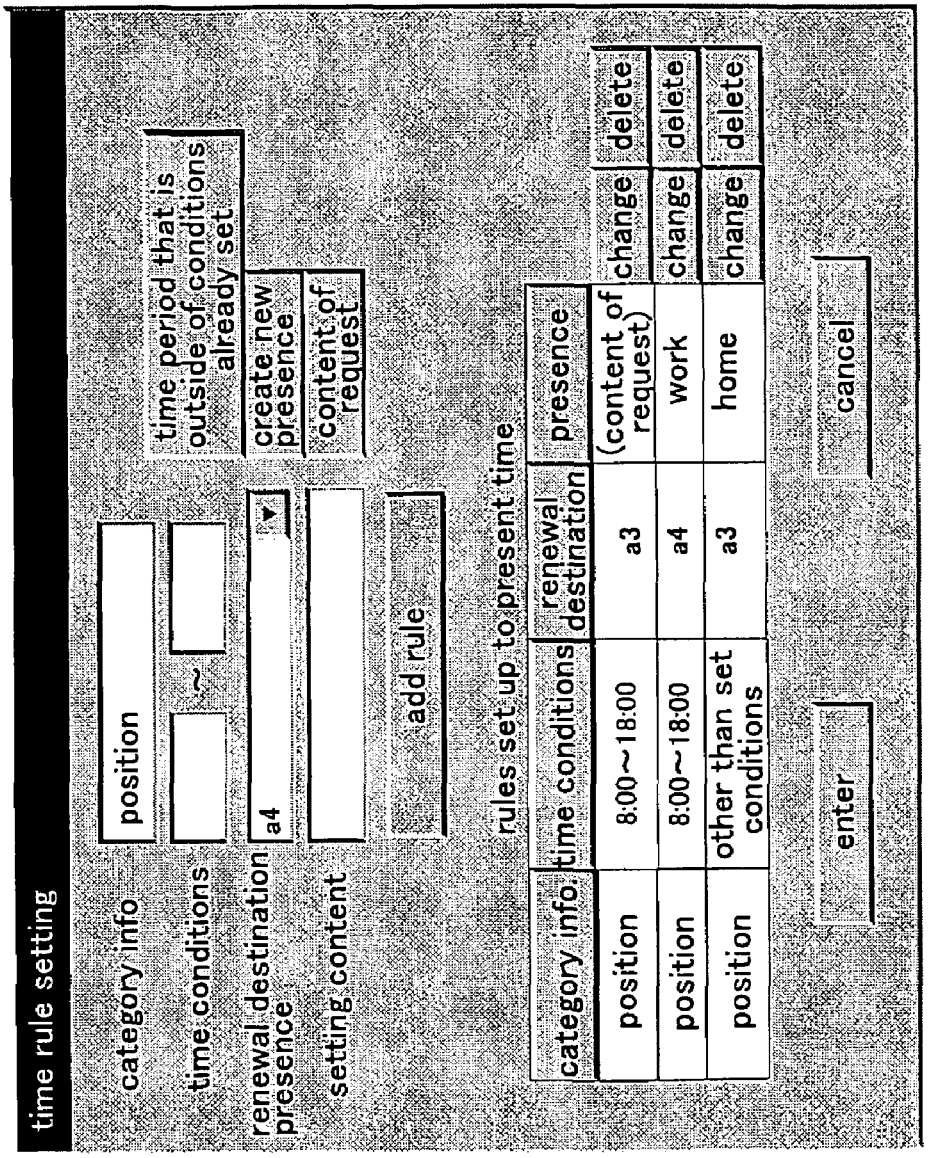
FIG. 5 is an example of a screen for registering the association table of FIG. 4.

FIG. 4 is a diagram showing an example of the association table 16. The association table 16 correlates the category information and the presence IDs. Furthermore, the association table 16 is defined such that renewal of the presence corresponding to the category information changes according to time period. That is, between 8:00 and 18:00 the presence "a3" is renewed by renewal requests, and outside that time period presence "a4" is renewed by renewal requests. FIG. 5 is an example of a screen for registering the association table 16 of FIG. 4 onto the presence server 10. With this screen, the user can associate his own presence and category information. The screen is provided to the client from the association setting portion 131.

FIG. 6 is a diagram of another example of the association table 16. This association table 16 correlates the category information and the presence ID. Furthermore, the association table 16 is defined such that renewal of the presence corresponding to the category information ("renewal destination presence ID" in the diagram) changes in accordance with the content of another presence ("check presence ID" in the diagram). That is, when the check presence "a1" is "work", a renewal request updates the renewal destination presence ID "a3". Furthermore, when the check presence "a1" is "home", a renewal request will update the renewal destination presence ID "a4". FIG. 7 is an example of a screen for registering the association table 16 of FIG. 6 onto the presence server 10. With this screen, the users can associate their own presence and category information. The screen is provided to the client from the association setting portion 131.

Figure 9:
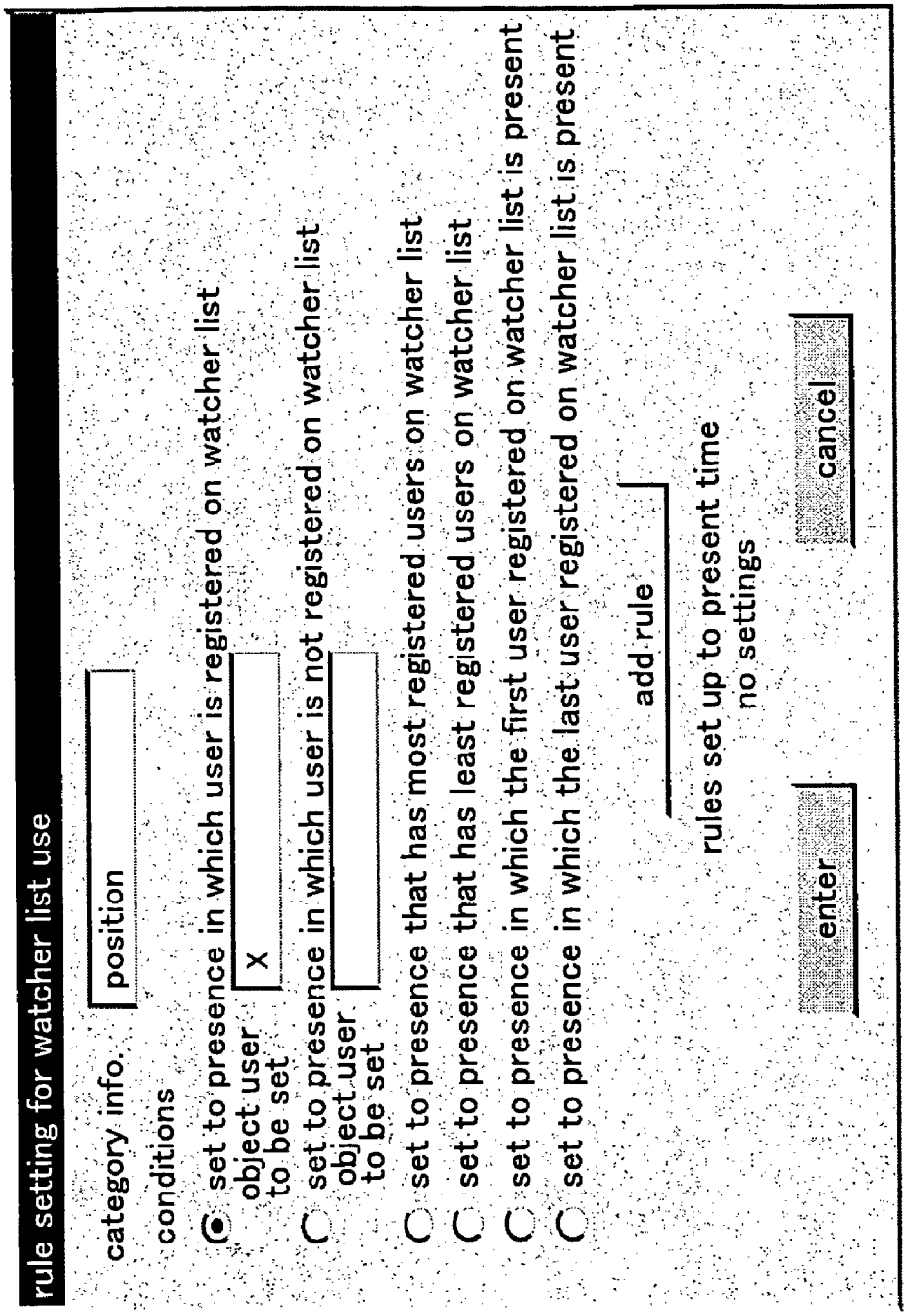
FIG. 9 is an example of a screen for registering the association table of FIG. 8.

FIG. 8 is a diagram showing another example of the association table 16. This association table 16 associates the presence of a renewer that is registered on the watcher list of the presentity with the category information. FIG. 9 is an example of a screen for registering the association table 16 of FIG. 8. This screen is provided to the client from the association setting portion 131.

As described above, the association table 16 defines which presence is renewed and which is not renewed, according to which category information. The presentity can freely set the association table 16.

(2) Renewal Request with Attached Category Information.

Referring to FIG. 1 again, when the setting destination judgment portion 132 receives a renewal request that includes the following content, the setting destination judgment portion 132 specifies the presence ID "a1" corresponding to the category information "position" to be the object to be renewed, from the presence table 12 of user A that is specified by the object ID. In order to simplify the explanation, the presence table 12 and the association table 16 are shown together in FIG. 1. This is similarly shown in the following diagrams. The setting portion 133 sets the presence "meeting room A" as the content of the presence ID "a1". If the object of the renewal has not correlated the category information with its own presence, then the notification illustrated in FIG. 2 is transmitted to the object. In this example, this screen is provided to the presence client 20 that the user A operates. On this screen, user A can set his own presence that is associated with the category information "position". In other words, provided that the presence ID that corresponds to the category information that renewer X designates, is in the presence table 12 of the object, the renewer can freely designate the category information and transmit the renewal request. After this, in a similar manner to that of an ordinary presence server 10, the notification portion 15 notifies the new presence "meeting room A" to the watcher of the presence ID "a1". It should be noted that, in this example, the presence table 12 does not need to include disclosure conditions of the presence.

Renewal Request
Renewer ID "X"
Object ID "A"
Presence "meeting room A"
Category information "position"

(3) Conversion and Setting of the Presence

Figure 10:
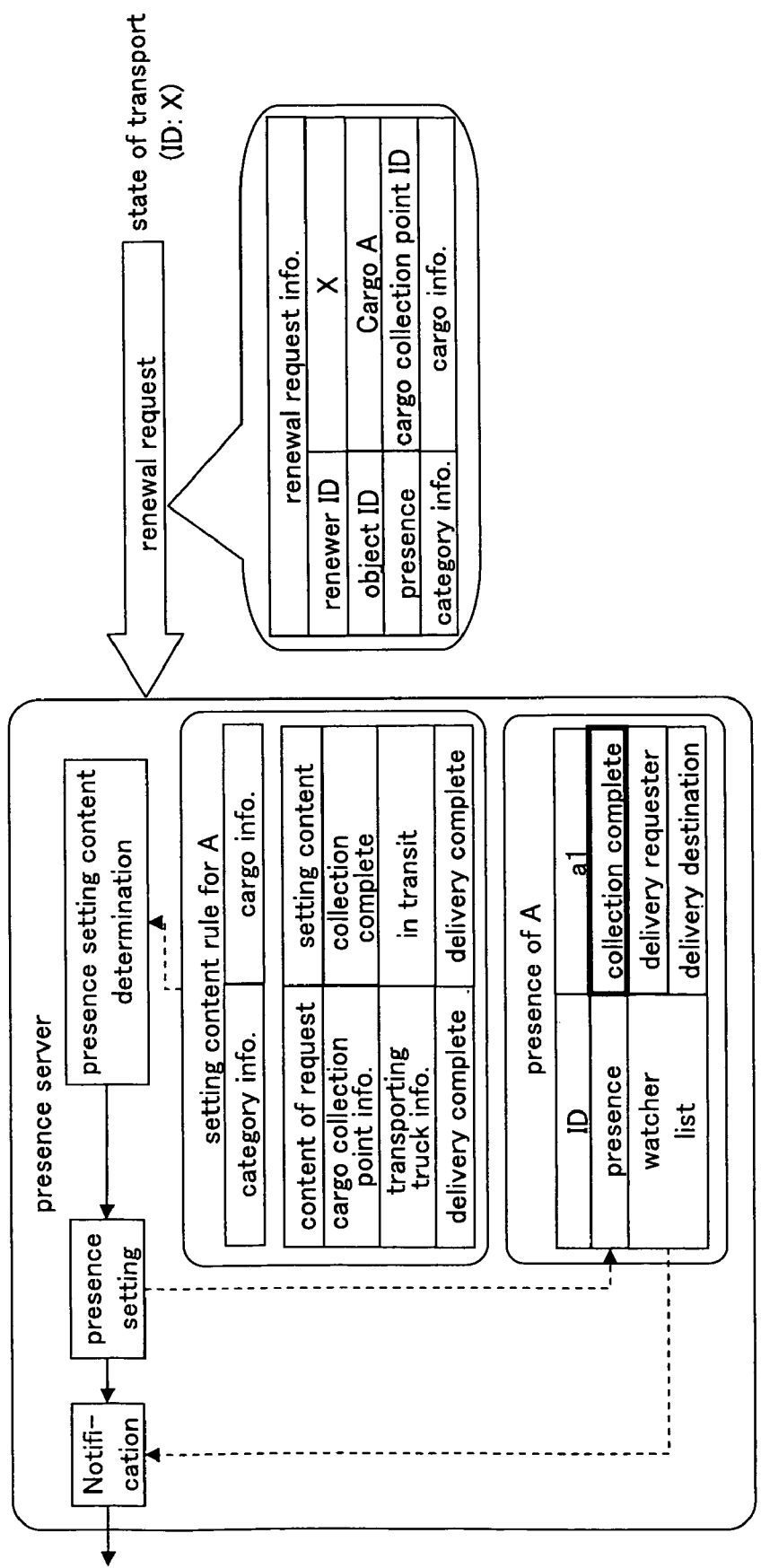
FIG. 10 is a diagram for converting the presence that is included in the transfer request, setting it as the presence of the object.

Referring to FIG. 10, a situation in which the presence included in the renewal request is converted and set to the presence of the object is described. A situation in which the association setting portion 131 receives a renewal request that includes the content described below is considered.

Renewal Request
Renewal ID "X"
Object ID "cargo A"
Presence "cargo collection shop ID"
Category information "cargo information"

Furthermore, the content shown in FIG. 10 is stored as the setting rule 135 of the cargo A, which is the user. The setting rule 135 defines the conversion of the presence that is included in the renewal request, as given below.

Setting Rule

The content of the presence "cargo collection shop ID" that is included in the renewal request becomes "collection complete".

The content of the presence "transporting truck information" that is included in the renewal request becomes "in transit".

The content of the presence "delivery complete" that is included in the renewal request becomes "delivery complete".

In this situation, the setting content determination portion 134 compares the renewal request and the setting rule 135, and judges whether or not the presence can be converted. If the presence is capable of conversion, and provided it has the "cargo collection position ID", then it is converted according to the setting rule 135. The setting portion 133 sets the presence that was converted by the setting content determination portion 134, to the presence of the object. By converting the presence "cargo collection shop ID" that is set by the transport provider to "collection complete", the watcher of the presence of the cargo A can easily monitor the state of the cargo A. In a similar manner as previously described, in this example the presence table 12 may or may not include disclosure conditions of the presence.

If the category information is included in the renewal request as in FIG. 1, then the presence that is converted in accordance with the setting rule 135 can be set as the presence corresponding to the category information.

Figure 11:
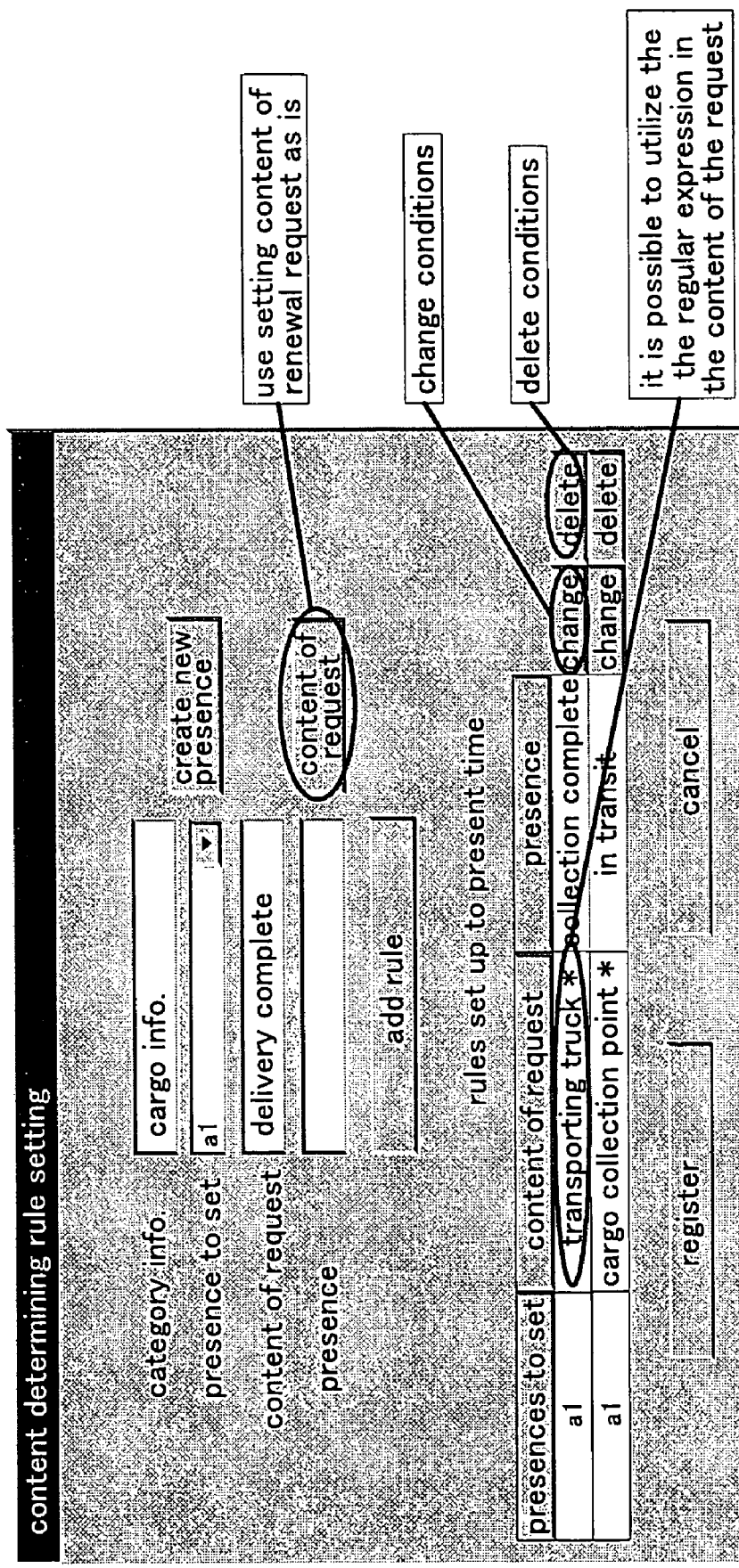
FIG. 11 is an example of a screen that a setting content determining portion provides to a presence client.

FIG. 11 is an example of a screen that the setting content determination portion 134 provides to the presence client 20. This screen receives input of the setting rule 135. The setting content determination portion 134 registers the content that is input on the screen into the setting rule 135.

(4) Management of Category Information and the Renewer

Figure 12:
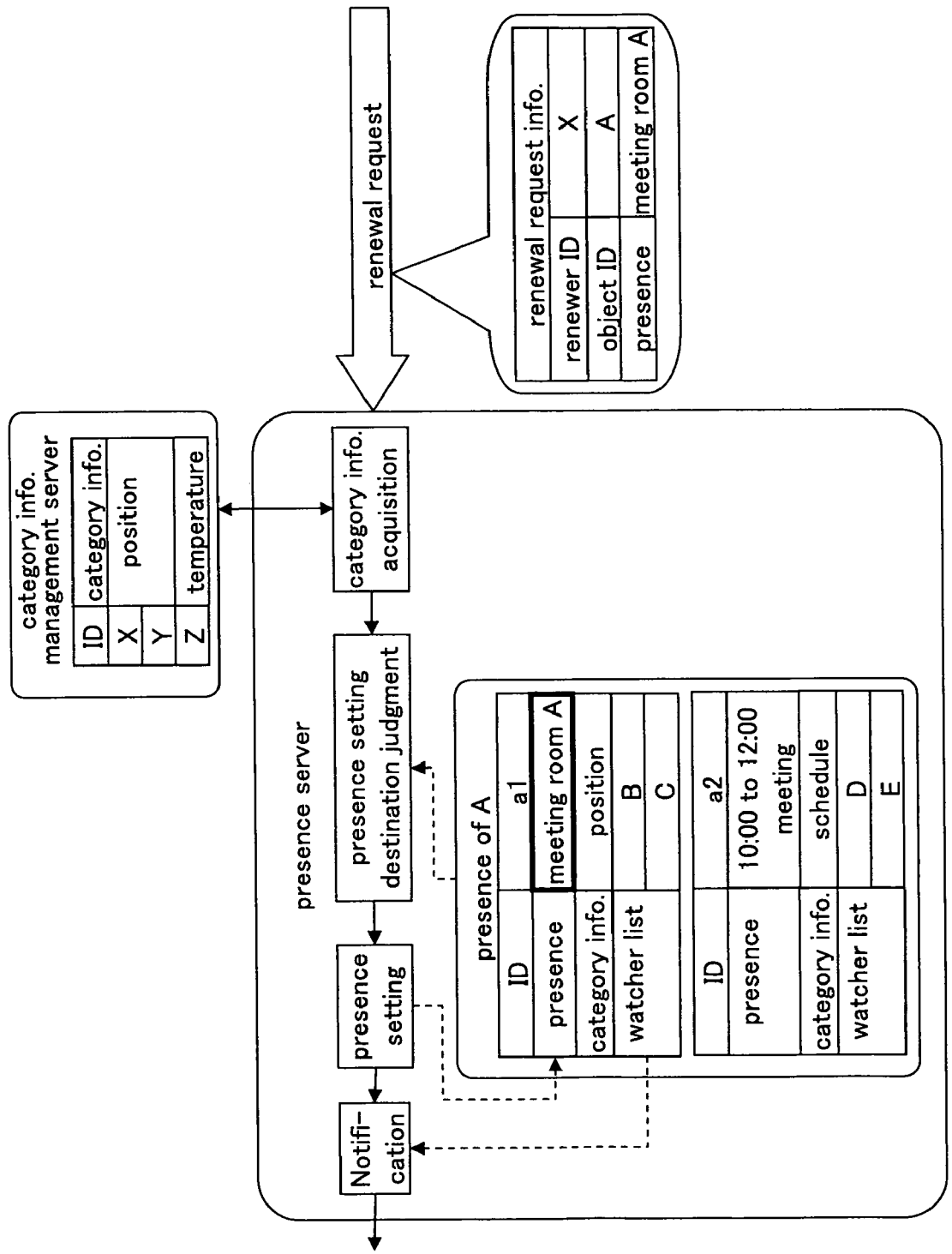
FIG. 12 is a diagram of a renewal of a presence that is based on an association of the category information and the renewer.

FIG. 12 is an explanatory diagram showing a situation in which the renewer renews the presence of a third party in accordance with the correlation between the category information and the renewer.

The category information management server 30 stores the user ID of the renewer in association with category information of the presence that the renewer renews. When the presence server 10 receives a renewal request that includes the following content, the category information acquisition portion 136 acquires the category information "position" corresponding to renewer X from the category information server 30.

Renewal Request
Renewer ID "X"
Object ID "A"
Presence "meeting room A"

After this, the present server 10 carries out processing in a similar manner to that of FIG. 1. That is, the presence ID corresponding to the category information "position" that was acquired by the setting destination judgment portion 132 is specified from the presence table 12 of the user A. Then, the setting portion 133 sets the presence "meeting room A" that was included in the renewal request as the content of the presence ID. As described previously, in this example, the presence table 12 may or may not also include disclosure conditions of the presence.

By providing the category information management server 30 internally or externally of the presence server 10, the presence that is to be renewed can be specified even if the category information is not included in the renewal request.

(5) Subscription Using Category Information.

Figure 13:
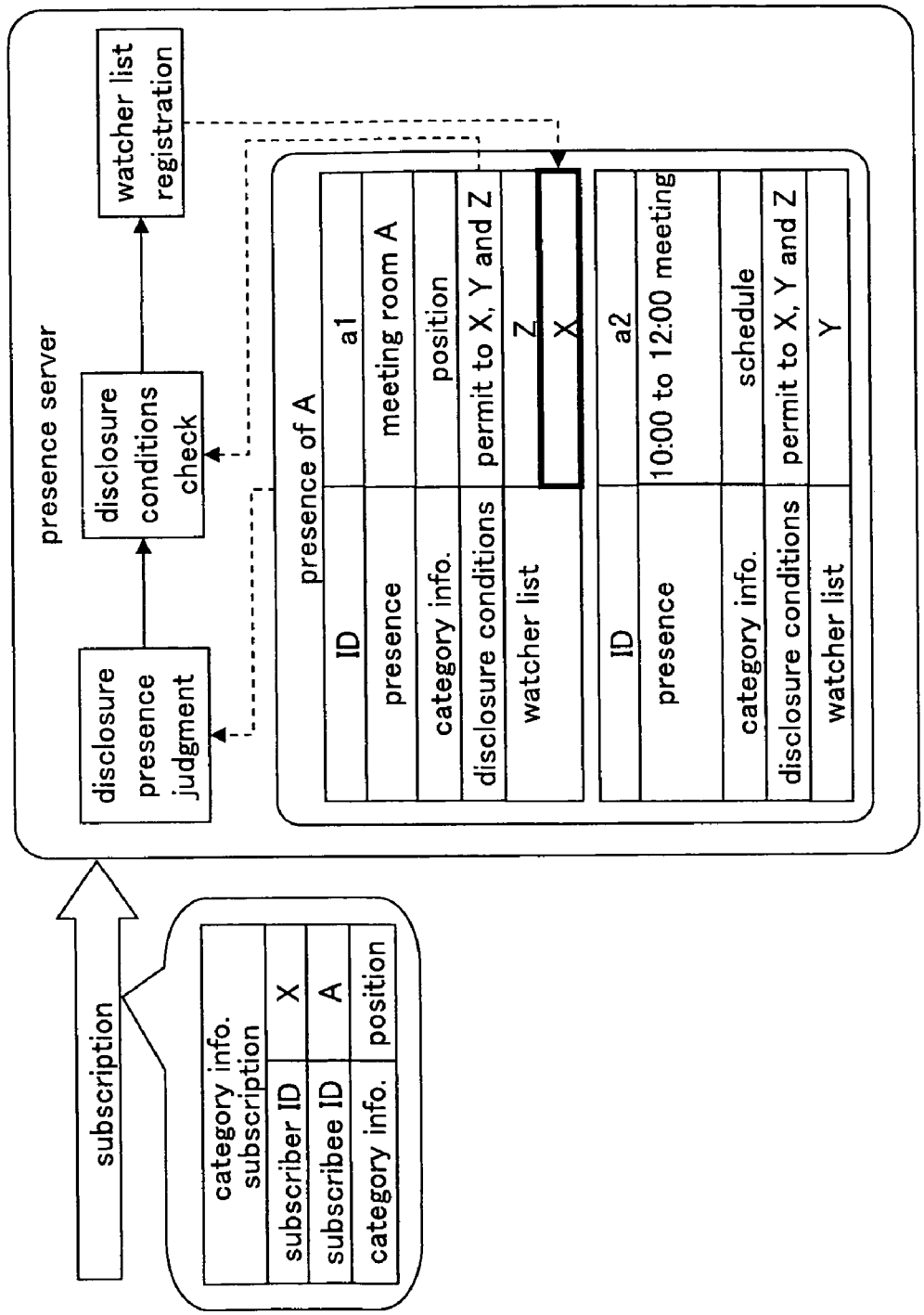
FIG. 13 is a diagram showing the flow of a subscription using the category information.

FIG. 13 is a diagram showing the flow of a subscription in which the category information is used. When the watcher management portion 14 receives a subscription that includes category information, the disclosure judgment portion 141 of the watcher management portion 14 carries out the following process. The following is the content of a subscription with attached category information.

Subscription with Attached Category Information
Subscriber ID "X"
Subscribee ID "A"
Category information "position"

Based on this subscription, the disclosure judgment portion 141 refers to the presence table 12 of the subscribee A, and judges whether or not subscriber X satisfies the disclosure condition of the presence that corresponds to the category information "position" included in the subscription. In this example, the subscriber X satisfies the disclosure conditions of the presence ID "a1". Thus, the disclosure judgment portion 141 registers the subscriber X on the watch list of the presence ID "a1". The disclosure judgment portion 141 may also carry out registration onto the watcher list after contacting the subscribee.

FIGS. 14A to 14D are examples of a screen for requesting a subscription with attached category information. The disclosure judgment portion 141 provides these screens to the presence client 20, and acquires the information that is input to the screen. If X is the subscriber, then FIG. 14A is a screen example for the subscription with attached category information to be created by the subscriber. FIG. 14B is a screen in order for the subscribee to associate the presence ID "a1" and the category information "position", for a subscription with attached category information. FIG. 14C is a screen that is output by a display, for example, connected to the presence server 10. When a subscription with attached category information is received, the disclosure judgment portion 141 is set to either refuse the subscription, or enquire to the subscribee. If "confirm with user" is selected in FIG. 14C, then FIG. 14D is an example of a screen that is notified to the subscribee when the subscription is received.

If category information is attached to the subscription, then because the subscriber designates the category information when sending the subscription, it is not necessary to determine the configuration of the subscribee's presence or presence identifiers in advance. Consequently, the subscriber can easily carry out the subscription. Furthermore, there is an advantage in that the subscribee does not need to disclose his own presence table 12 to another party.

It should be noted that a subscriber is a user who demands to view the presence of another user. Furthermore, a subscribee is the holder of the presence that the subscriber is demanding to view.

Second Embodiment

Functional Structure of the Entire System

Figure 15:
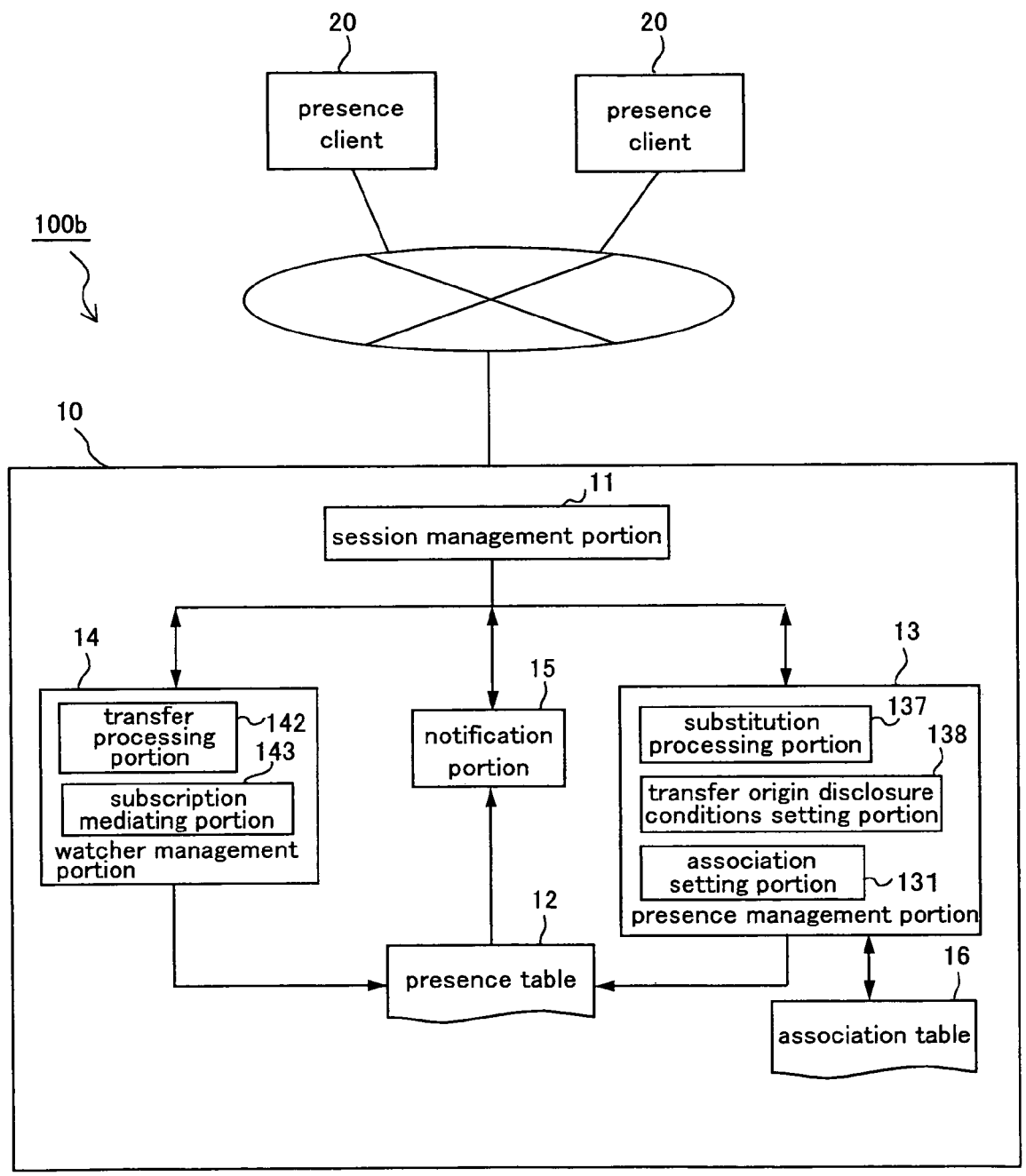
FIG. 15 is a structural overview of a presence system according to a second embodiment of the present invention.

FIG. 15 is a structural overview of a presence system 100b according to the second embodiment of the present invention. The presence system 100b is constituted by the presence server 10 and presence clients 20 that are connected via a network. Although not illustrated, the presence server 100b may also include the information management server 30 in a similar manner to the first embodiment. In the diagram, structural elements having functions similar to those of the first embodiment are provided with the same numbers.

In the present embodiment, the presence server 10 contains a session management portion 11, a presence table 12, a presence management portion 13, a watcher management portion 14 and a notification portion 15, and also preferably contains an association table 16. The session management portion 11 passes data between the network and structural elements within the presence server 10. A presence table 12 is managed for each user, and stores at least their presence ID and their presence. In this example, the presence table 12 includes a watcher list for each presence. Moreover, the presence table 12 includes disclosure conditions of each presence, and where necessary, the transfer origin of the presence.

When the presence management portion 13 receives a renewal notification of a presence, it updates the presence table 12. When the watcher management portion 14 receives a subscription, it updates the watcher list in the presence table 12. When the notification portion 15 receives a renewal notification of a presence, it notifies the new presence to the watchers of the presence thereof. The association table 16 defines the association between the category information and the presences.

Function of the Parts of the Presence Server

The presence management portion 13 preferably contains an association setting portion 131, a substitution processing portion 137 and a transfer origin disclosure condition setting portion 138. Furthermore, the watcher management portion 14 preferably contains a transfer processing portion 142 and a subscription mediating portion 143. The following is a description of these functions in more detail. It should be noted that the function of the association setting portion 131 is the same as in the first embodiment.

(1) Transfer Request in which Category Information is Used

Figure 16:
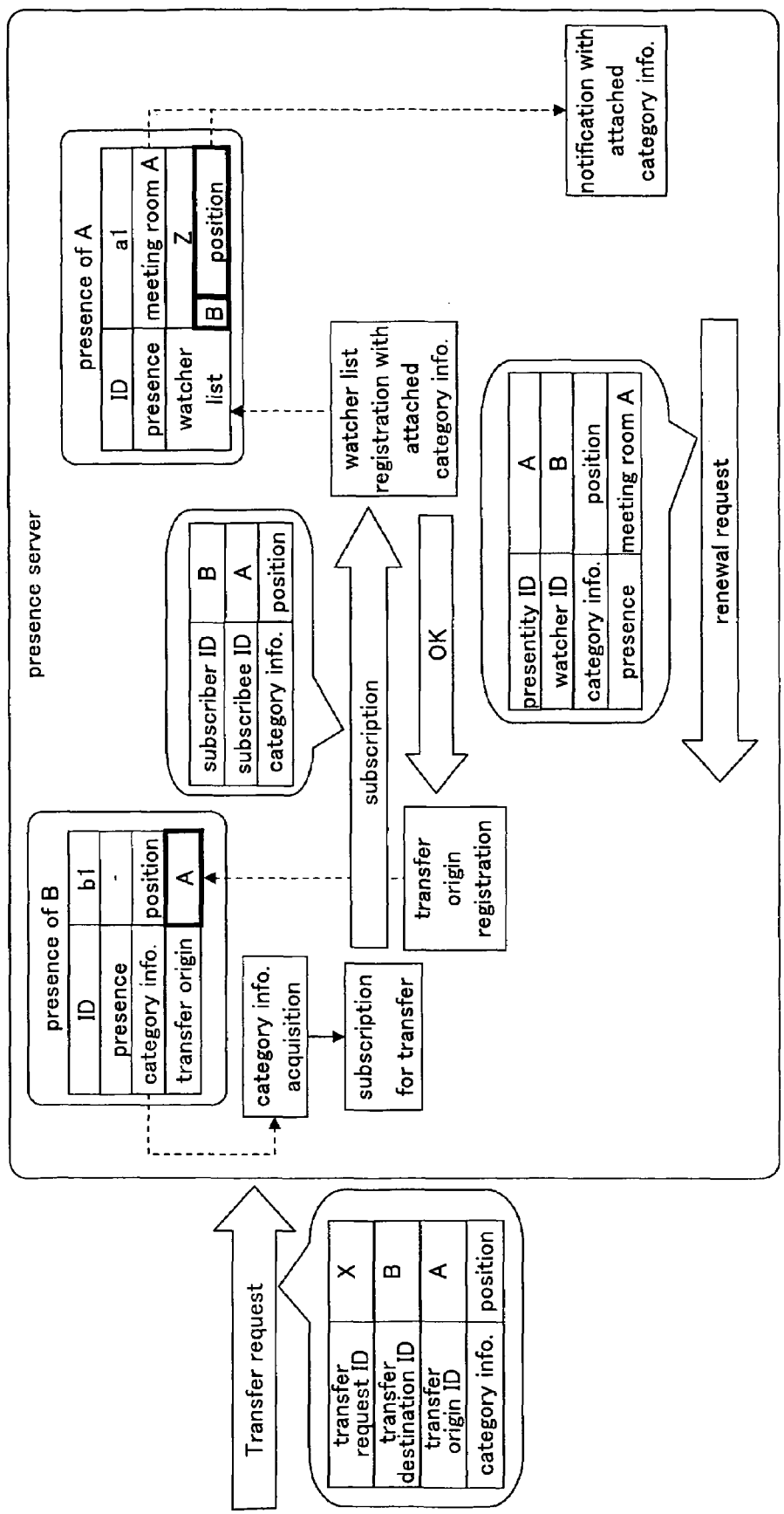
FIG. 16 is a diagram showing the flow of the process of a presence server 10 that has received a transfer request with attached category information.

FIG. 16 is a diagram showing the flow of the process of the presence server 10 that has received a transfer request with attached category information. The transfer request with attached category information includes the following content.

Transfer Request with Attached Category Information
Transfer requester ID "X"
Transfer destination ID "B"
Transfer origin ID "A"
Category information "position"

The transfer processing portion 142 refers to the presence table 12 of the transfer destination user B using the category information "position" that is included in the transfer request as the search key. Moreover, the transfer processing portion 142 creates a subscription with attached category information. The subscription with attached category information includes the following content.

Subscription with Attached Category Information
Subscriber ID=transfer destination ID "B"
Subscribee ID=transfer origin ID "A"
Category Information "Position"

Moreover, the transfer processing portion 142 registers the transfer destination user B and the category information "position" in the watcher list of the presence ID "a1" of the transfer origin user A. Furthermore, the transfer processing portion 142 registers user A in the presence table 12 of the user B as the transfer origin of the presence corresponding to the category information "B" of the transfer destination.

When the presence "a1" of the user A is renewed, the presence management portion 13 transmits the following presence notification with attached category information to the user B. Accordingly, user B knows that the presence of his own category information "position" has been automatically transferred from the presence of user A. Moreover, the substitution process portion 137 of the presence management portion 13 sets the presence of the transfer origin A onto the presence table 12 as the transfer destination B.

Presence Notification with Attached Category Information
Presentity ID=transfer origin ID "A"
Watcher ID=transfer destination ID "B"
Category information "position"
Presence "meeting room A"

Figure 17:
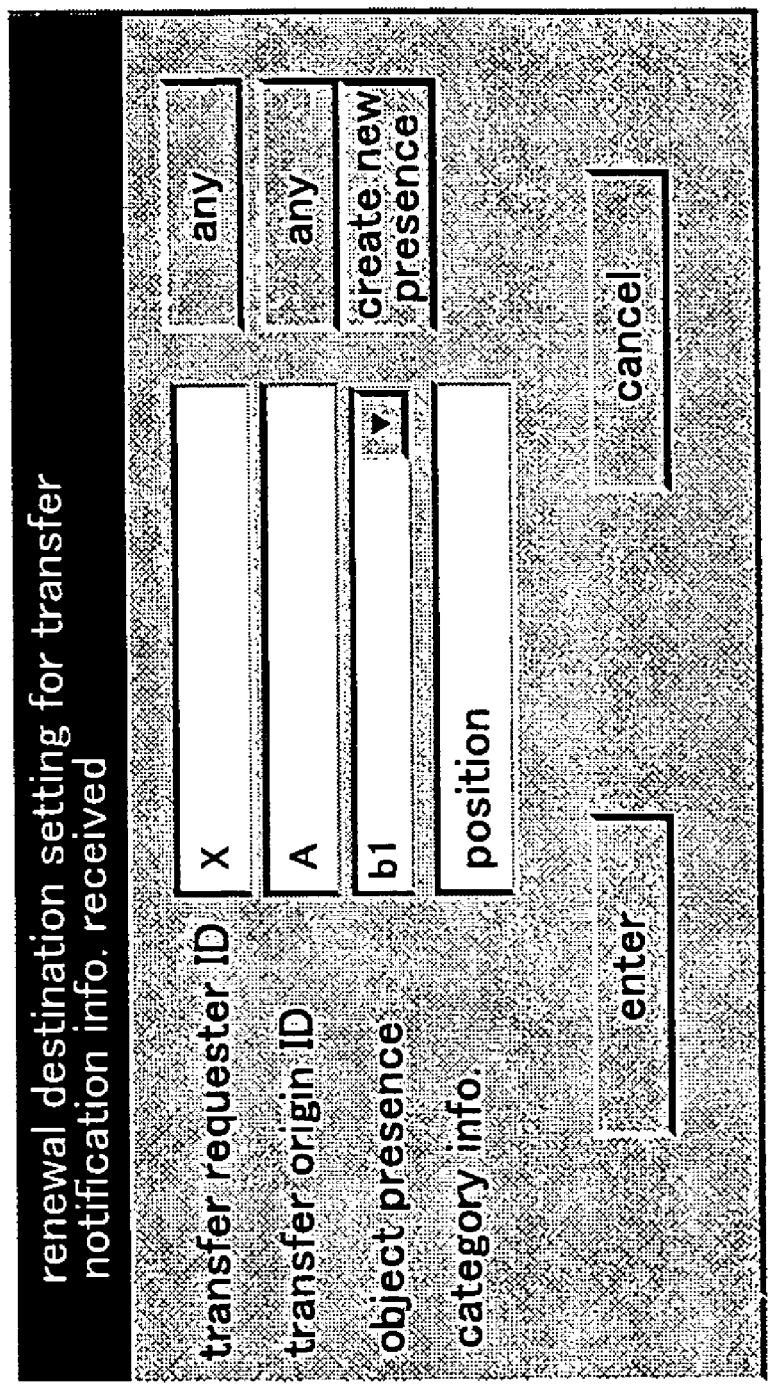
FIG. 17 is an example of a screen that receives settings of transfer requests from a transfer requester.

FIG. 17 is an example of a screen that the transfer processing portion 142 provides to the presence client 20. This screen example receives the setting of the transfer request from the transfer requester and transmits it to the presence server 10.

In this configuration, when the transfer destination is notified of the presence of the transfer origin, the category information can be notified at the same time.

Consequently, the transfer requester can designate which presence of the transfer destination it wishes to be reflected in the presence from the transfer origin, in accordance with the category information. That is, the structure of the automatic renewal of a presence by transfer can be freely changed where necessary.

(2) Transfer with Attached Watcher List

Figure 18:
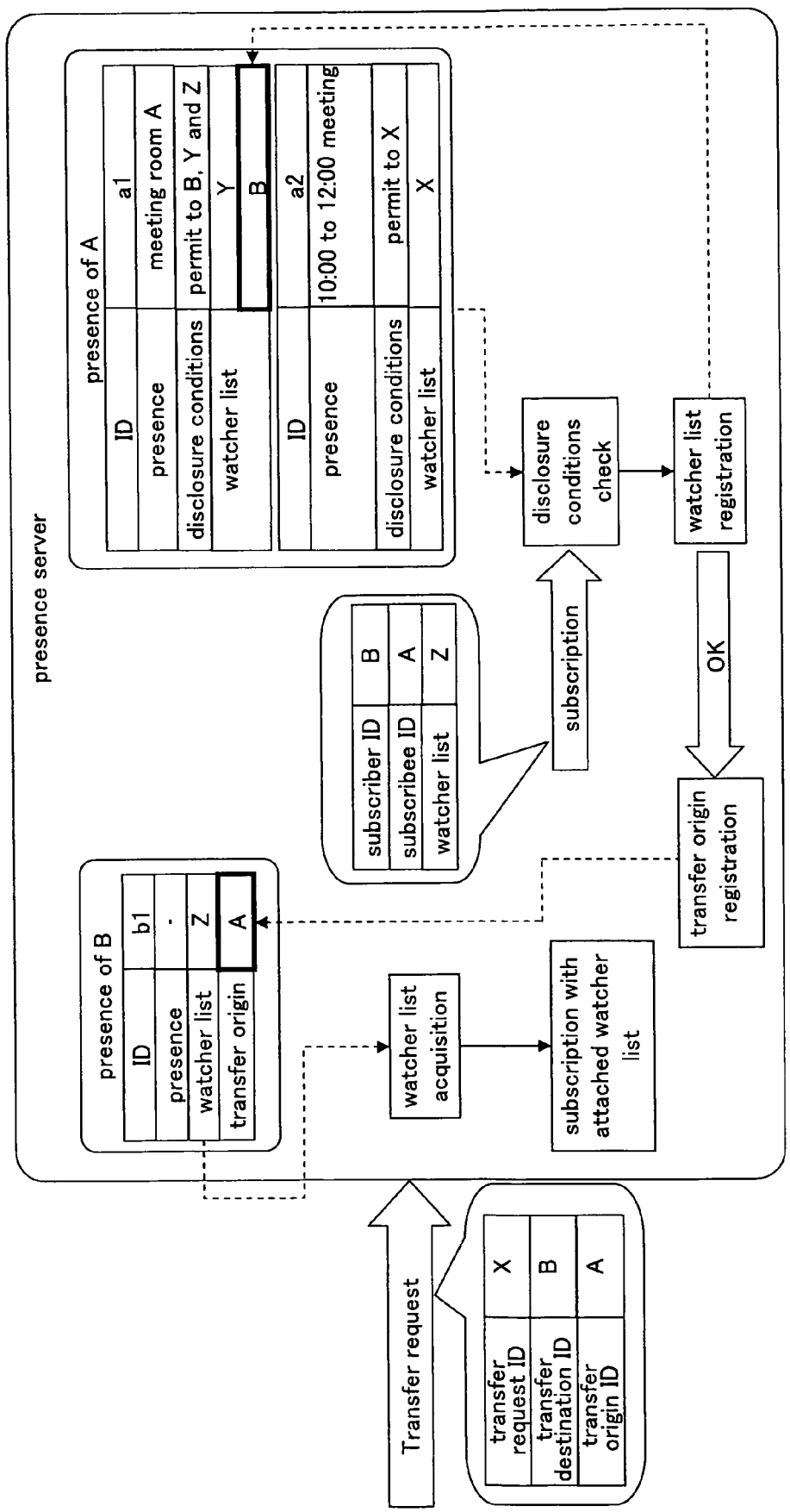
FIG. 18 is a diagram for creating a subscription attached watcher list based on a transfer list with attached watcher list.

FIG. 18 is a diagram for creating a subscription with attached watcher list, based on a transfer request with attached watcher list. The presence server 10 receives a transfer request containing the following content.

Transfer Request
Transfer requester ID "X"
Transfer destination ID "B"
Transfer origin ID "A"

The transfer processing portion 142 of the watcher management portion 14 acquires the watcher list of the transfer destination B, and creates a subscription with attached watcher list.

Subscription with Attached Watcher List
Subscriber ID=transfer destination ID "B"
Subscribee ID=transfer origin ID "A"
Watcher list "Z"

The transfer processing portion 142 retrieves presences from among the presences of the presence table 12 of the transfer origin, in which the transfer origin user satisfies the disclosure conditions. It then registers the transfer destination B as a watcher of the presence. After this, the transfer processing portion 142 registers user A on the presence table 12 of user B as the transfer origin of a presence of the transfer destination B. Moreover, the substitution processing portion 137 of the presence management portion 13 sets the presence of the transfer origin A in the presence table 12 as a presence of the transfer destination B.

In this configuration, the transfer origin A transfers the presence of the transfer origin within the distribution range that the transfer origin A permits itself. Consequently, the privacy of the transfer origin can be protected.

It should be noted that it is also possible for the transfer requester to designate the category information of the presence that it transfers. In this situation, it can be expected that the presence of a type that the requester desires to transfer is transferred, and the privacy of the transfer origin is protected at the same time.

(3) Transfer with Attached Disclosure Conditions

Figure 19:
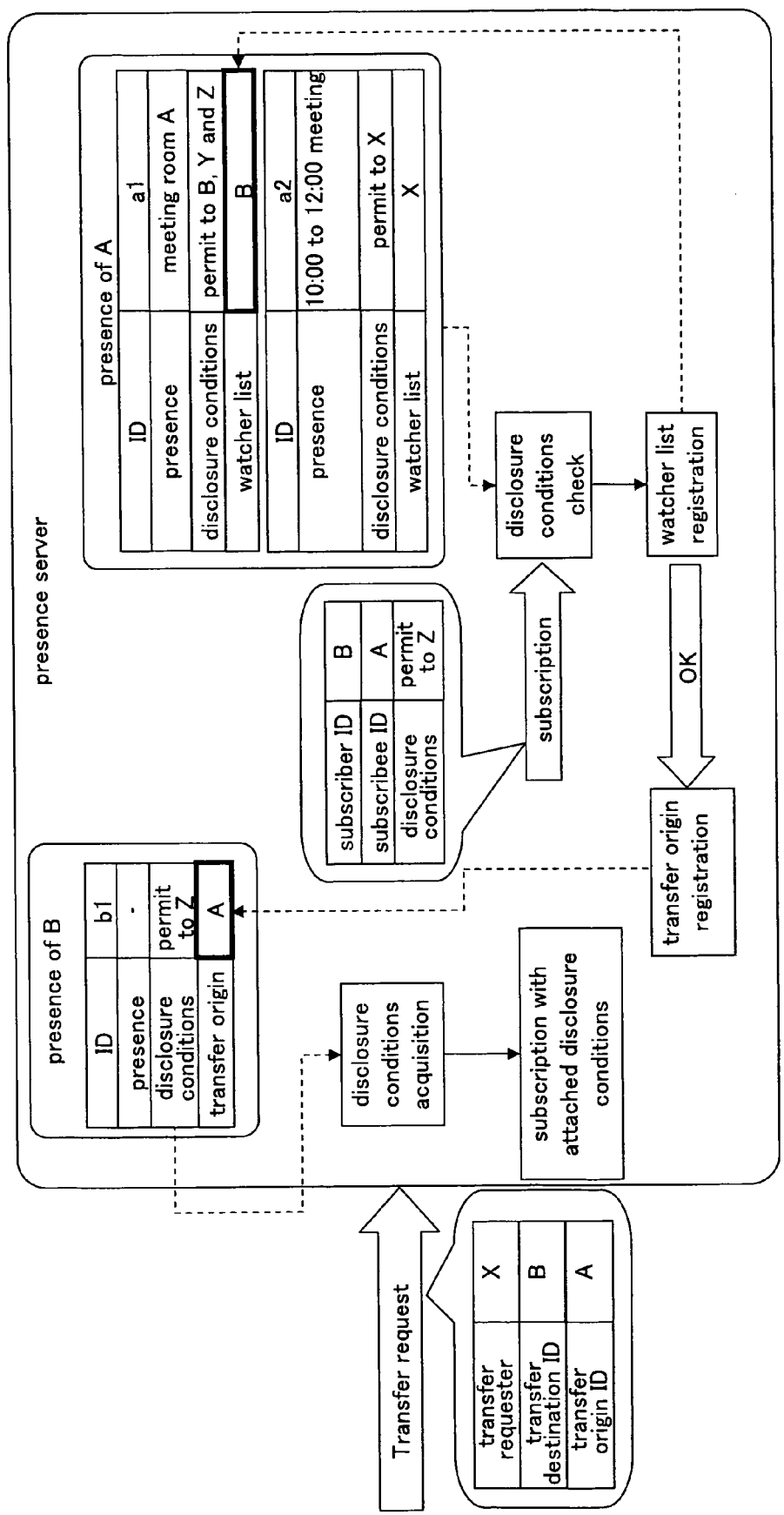
FIG. 19 is a diagram of a transfer with attached disclosure conditions.

FIG. 19 is a diagram of a transfer with attached disclosure conditions. The presence server 10 receives a transfer request with the following content.

Transfer Request
Transfer requester ID "X"
Transfer destination ID "B"
Transfer origin ID "A"

The transfer processing portion 142 of the watcher management portion 14 acquires the disclosure conditions of the transfer destination B, and creates a subscription with attached disclosure conditions that includes the following content.

Subscription with Attached Disclosure Conditions
Subscriber ID=transfer destination ID "B"
Subscribee ID=transfer origin ID "A"
Disclosure conditions "permission to Z"

Moreover, the transfer processing portion 142 compares the disclosure conditions of the transfer origin user A and the disclosure conditions of the transfer destination user B, and registers the transfer destination user B in the watcher list of the transfer origin A, based on the result of the comparison. For example, if the disclosure conditions of the transfer destination user B satisfy the disclosure conditions of the transfer origin user A, then user B is registered as a watcher of the presence corresponding to those disclosure conditions. It is usually preferable to raise the priority of the disclosure conditions of the transfer origin. This is in order to protect the privacy of the transfer origin. After this, the transfer processing portion 142 registers user A in the presence table 12 of user B as the transfer origin of the presence of the transfer destination B. Moreover, the substitution processing portion 137 of the presence management portion 13 sets the presence of the transfer origin A in the presence table 12 as the presence of the transfer destination B.

Figure 20A:
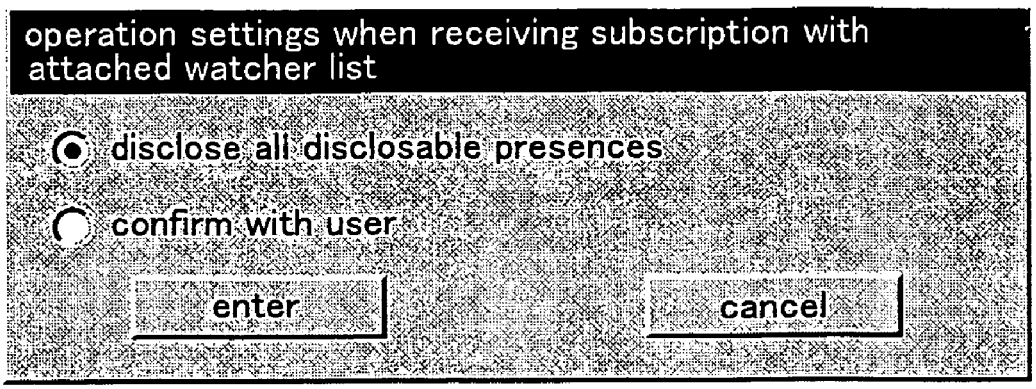
FIG. 20A is an example of a screen during reception of a subscription with attached watcher list.
Figure 20B:
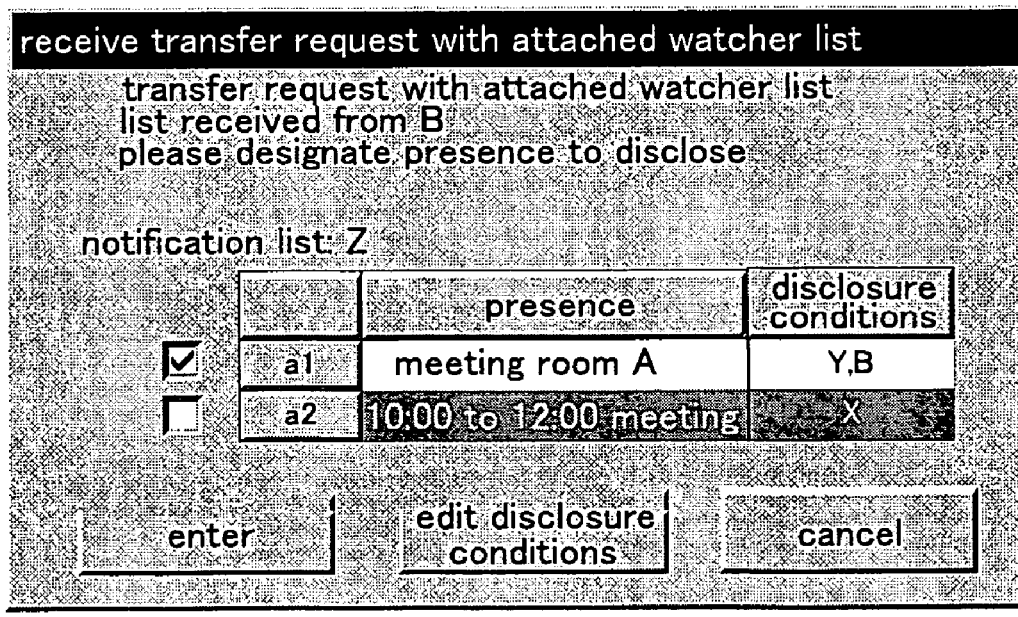
FIG. 20B is an example of a screen to notify the transfer origin of a subscription with attached watcher list (transfer request in the drawing).

FIG. 20A is an example of a screen that the transfer processing portion 142 provides to the presence client 20. When a subscription with attached watcher list is received, the screen example receives the setting of whether to contact the transfer destination (subscribee) or, if the disclosure condition matches, to transfer the presence without enquiry to the transfer destination. FIG. 20B is a screen example to notify the transfer origin of a subscription with attached watcher list (transfer request in the diagram). This screen receives the selection of which presence to transfer.

According to this configuration, transfer is possible in the range in which the disclosure conditions of both the transfer origin and the transfer destination are satisfied. The transfer requester can thus make a transfer request without having to consider the configuration or privacy of the presence of the transfer origin and the transfer destination.

It should be noted that it is, of course, possible to designate a presence to transfer using the category information.

(4) Setting the Disclosure Condition of the Transfer Origin to the Transfer Destination.

Figure 21:
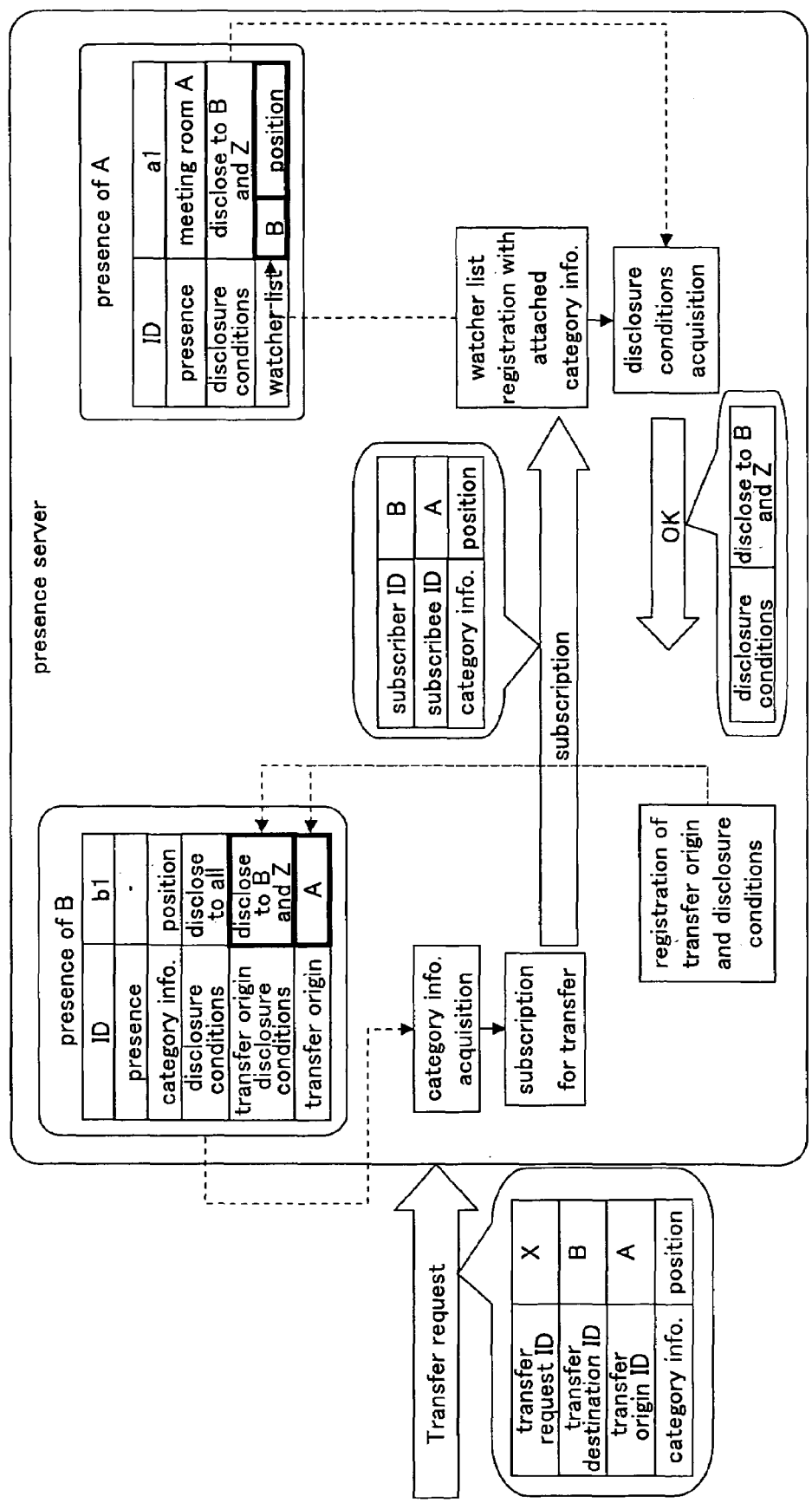
FIG. 21 is a diagram to set disclosure conditions of the transfer origin onto the transfer destination.

FIG. 21 is a diagram for setting the disclosure condition of the transfer origin to that of the transfer destination. The transfer processing portion 142 receives a transfer request with attached category information having the following content.

Transfer Request with Attached Category Information
Transfer requester ID "X"
Transfer destination ID "B"
Transfer origin ID "A"
Category information "position"

The transfer processing portion 142 refers to the presence table 12 of the transfer destination user B using the category information "position" that is included in the transfer request as the search key. Moreover, the transfer processing portion 142 creates a subscription with attached category information. The subscription with attached category information includes the following content.

Subscription with Attached Category Information
Subscriber ID=transfer destination ID "B"
Subscribee ID=transfer origin ID "A"
Category information "position"

The transfer processing portion 142 registers the transfer destination user B and the category information "position" in the watcher list of the presence ID "a1" of the transfer origin user A. Furthermore, the transfer processing portion 142 registers user A in the presence table 12 of the user B as the transfer origin of the presence corresponding to the category information "portion" of the transfer destination B.

On the other hand, the transfer origin disclosure condition setting portion 138 of the presence management portion 13 reads out the disclosure condition of the presence "a1" in which the transfer destination B is a watcher, from the presence table 12 of user A. It then registers these onto the presence table 12 of user B as the disclosure conditions of the presence "b1" corresponding to the category information included in the transfer request.

That is, when the transfer requester designates the category of the presence that the transfer requester desires to transfer, using the category information, the disclosure conditions of the presence of the transfer origin corresponding to this category information are set as the disclosure conditions of the presence of the transfer destination corresponding to that category information. Consequently the privacy of the transfer origin can be easily protected by a transfer request in which the category information is used.

(5) Reflecting the Renewal of the Transfer Origin Disclosure Condition onto the Transfer Destination.

Figure 22:
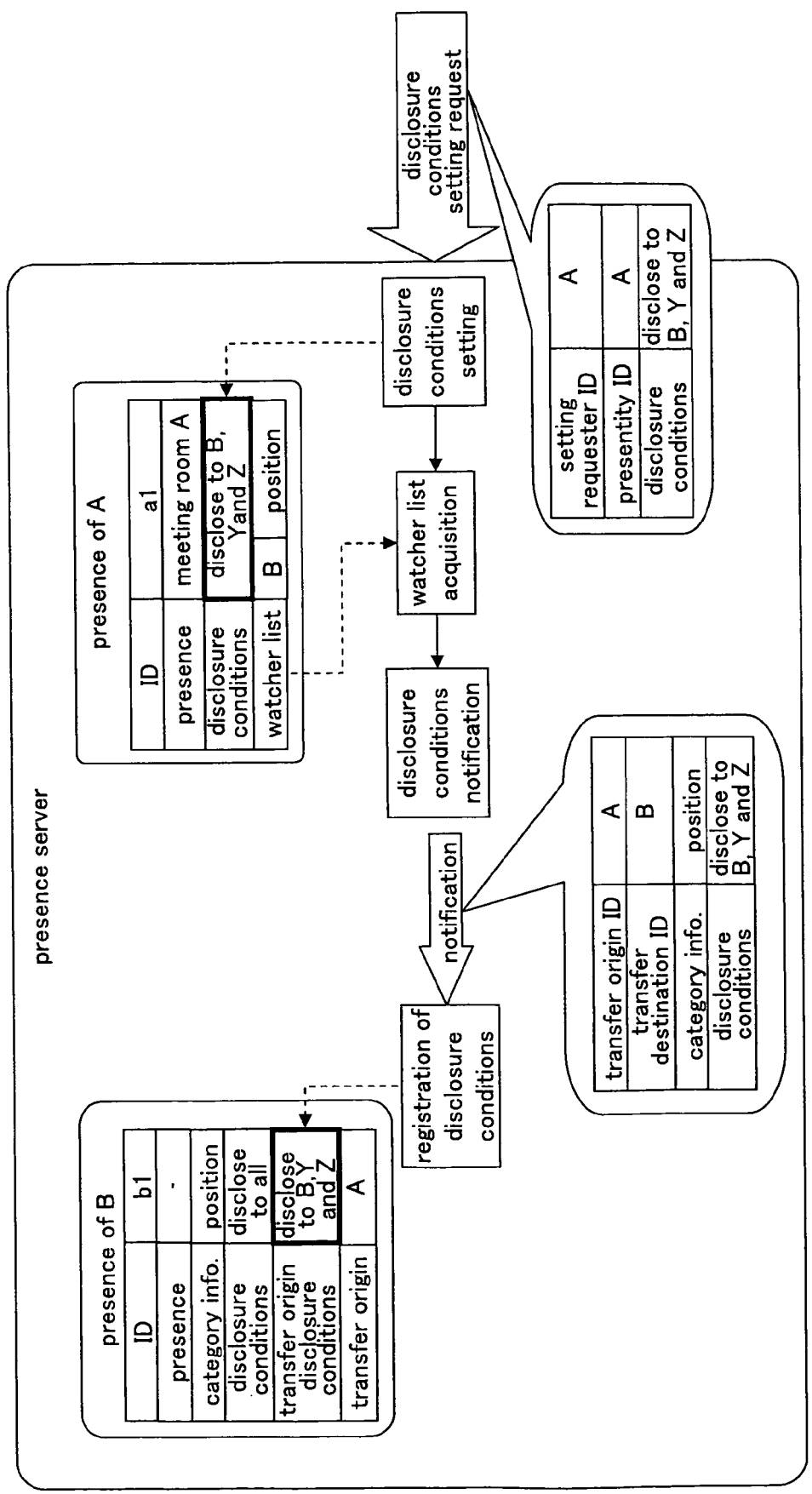
FIG. 22 is a diagram to reflect changes in the disclosure conditions of the transfer origin onto the disclosure conditions of the transfer destination.

FIG. 22 is a diagram reflecting changes in the disclosure condition of the transfer origin in the disclosure conditions of the transfer destination. In FIG. 19, the watcher list of the transfer origin was updated so as to satisfy the disclosure conditions of both the transfer origin A and the transfer destination B, after which the disclosure conditions of the transfer origin A may change. Furthermore, in FIG. 21, the disclosure conditions of the transfer origin A are set to those of a presence "b1" of the transfer destination B, after which the disclosure conditions of this may be changed. The notification of the settings of the disclosure conditions of the transfer origin A includes the following content.

Request to Set Disclosure Conditions
    Setting requester ID "A"
    Presentity "A"
    Disclosure conditions "B, Y and Z"

The transfer origin disclosure conditions setting portion 138 refers to the watcher list and creates the following disclosure conditions notification. Now, the user ID "B" and "position" are described on the watcher list.

Disclosure Condition Notification
    Transfer origin ID "A"
    Transfer destination ID "B"
    Category information "position"
    Disclosure condition "B, Y and Z"

The transfer origin disclosure condition setting portion 138 specifies the presence ID "b1" that is associated with the category information "position" in accordance with this notification, and overwrites the disclosure conditions.

In accordance with this configuration, the disclosure conditions of the transfer origin are set to the disclosure conditions of the transfer destination using the category information, after which changes in the disclosure conditions of the transfer origin are also reflected in the transfer destination. Consequently, even if the disclosure conditions of the transfer origin change, the privacy of the transfer origin can be automatically protected.

(6) Reflecting the Renewal of the Transfer Destination Disclosure Conditions Onto the Transfer Origin.

Figure 23:
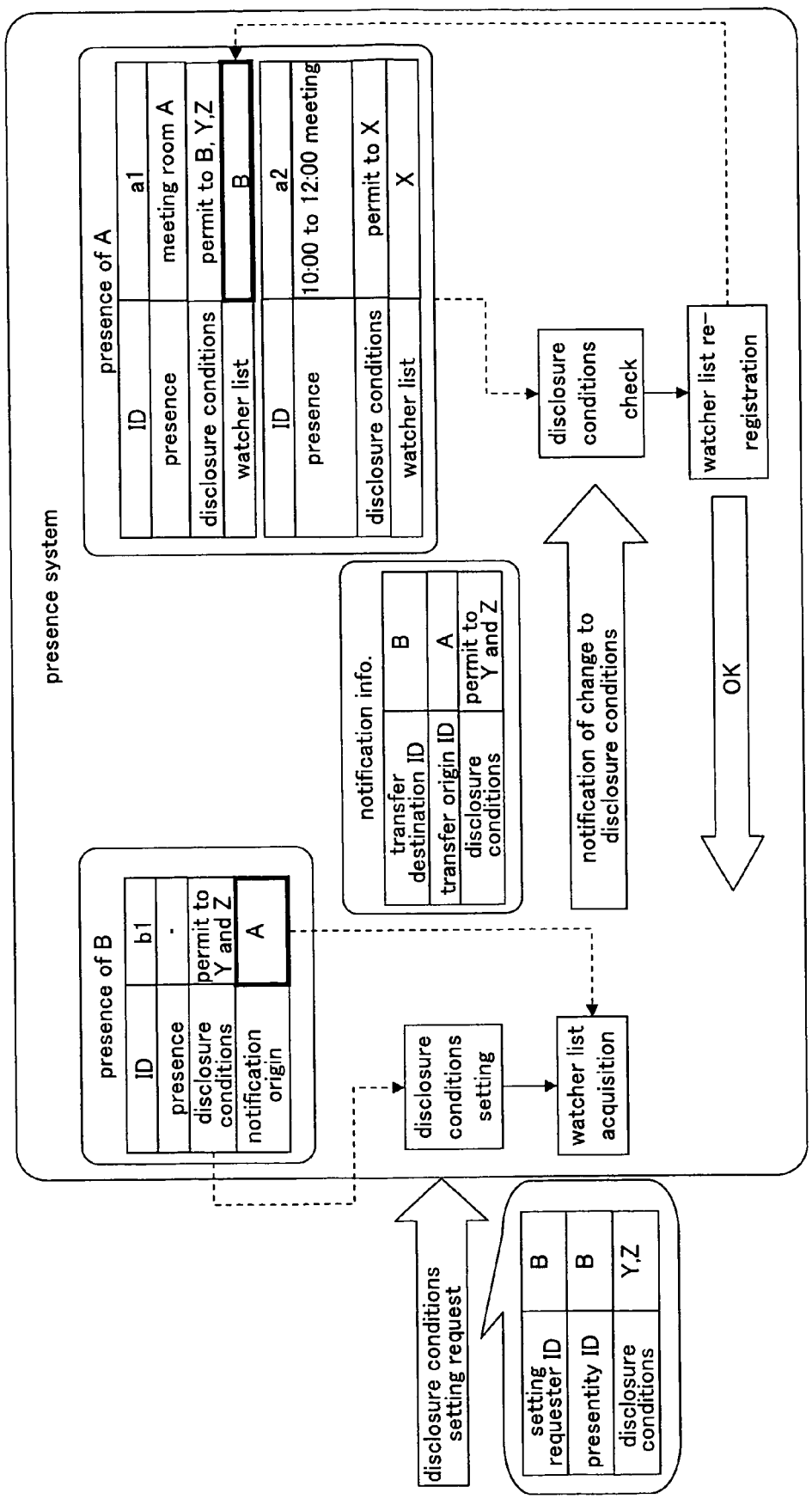
FIG. 23 is a diagram to reflect changes in the disclosure conditions of the transfer destination onto the disclosure conditions of the transfer origin.

FIG. 23 is a diagram reflecting changes in the disclosure conditions of the transfer destination onto the disclosure conditions of the transfer origin. In FIG. 19, the watcher list of the transfer origin A was updated so as to satisfy the disclosure conditions of both the transfer origin A and the transfer destination B, after which the disclosure conditions of the transfer destination B may change. Furthermore, in FIG. 21, the disclosure condition of the transfer origin A were set to the presence "b1" of the transfer destination B, after which the user B may change these. Notification of the setting of the new disclosure condition of the transfer destination B includes the following content.

Request to Set New Disclosure Conditions of the User B
    Setting requester ID "B"
    Presentity "B"
    Disclosure conditions "Y and Z"

The transfer processing portion 142 of the watcher management portion 14 acquires the disclosure conditions of the transfer destination B, and creates a subscription with attached disclosure conditions that includes the following content.

Subscription with Attached Disclosure Conditions
    Subscriber ID=transfer destination ID "B"
    Subscribee ID=transfer origin ID "A"
    Disclosure condition "permission to Y and Z"

Moreover, the transfer processing portion 142 compares the disclosure conditions of the transfer origin user A and the new disclosure conditions of the transfer destination user B, and updates the watcher list of the transfer origin user A based on the result of the comparison. For example, with regards to a presence that the transfer destination user B has registered on the watcher, the transfer processing portion 142 judges whether or not the disclosure conditions of the transfer destination B satisfy the disclosure conditions of the transfer origin A. Usually, it is preferable to increase the priority of the disclosure conditions of the transfer origin. This is to protect the privacy of the transfer origin. If the new disclosure conditions of the transfer destination B satisfy the disclosure conditions of the transfer origin A, then the user B is registered as a watcher of that presence. If the condition is not satisfied, then the user B is removed from the watcher. In this situation, the transfer processing portion 142 removes the notification origin A from the presence of the transfer destination B.

According to this configuration, even if the disclosure conditions of the transfer destination are automatically changed, then transfer within the range in which the disclosure condition of both the transfer destination and the transfer origin are satisfied, is always possible. The transfer requester can make a transfer request without concern that the privacy of the transfer origin will be compromised because of changes to the disclosure conditions of the transfer destination after the transfer request has been made.

It should be noted that it is also possible, of course, to designate a presence to transfer using the category information.

(7) Indirect Subscription

Figure 24:
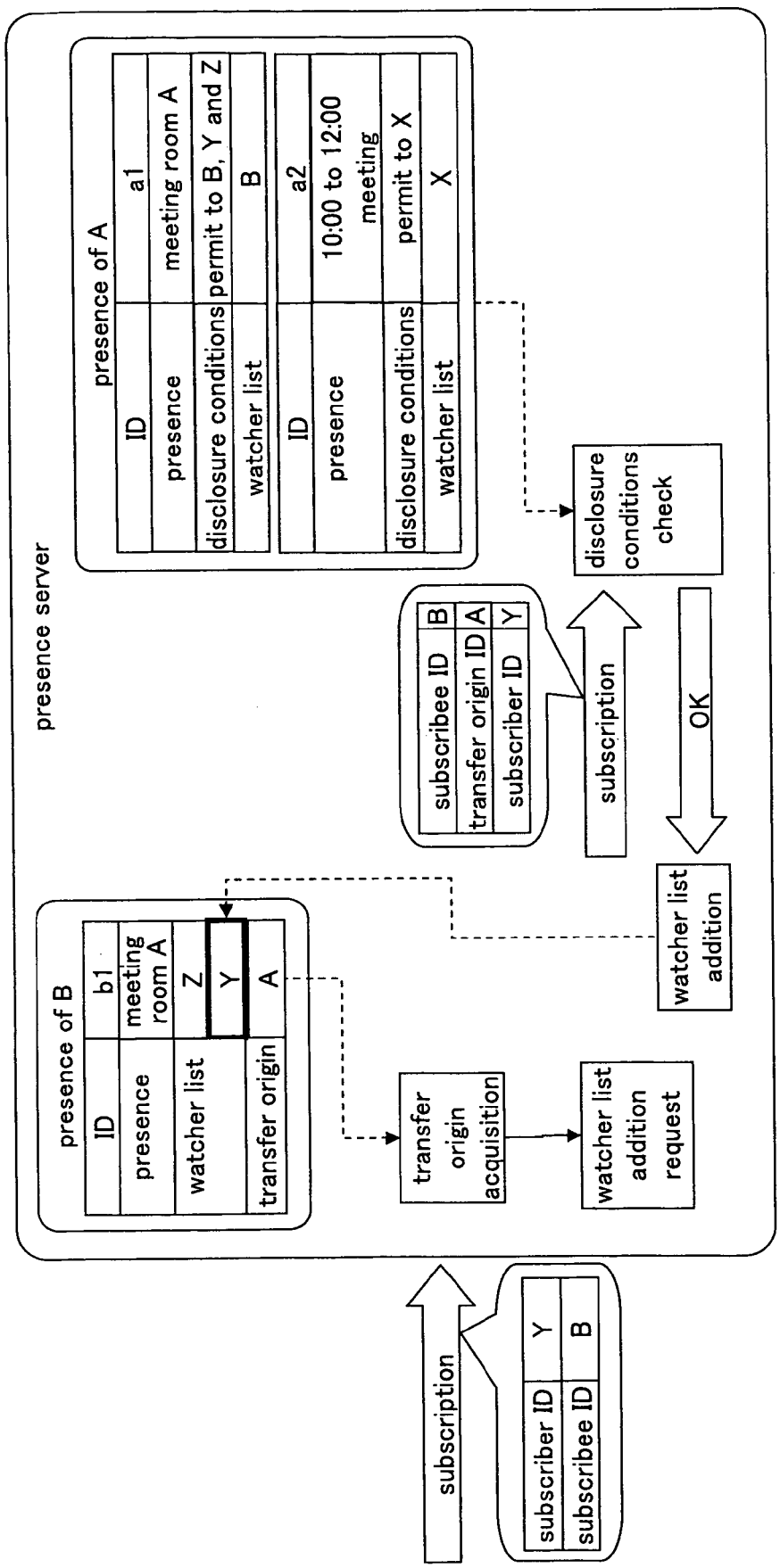
FIG. 24 is a diagram of an indirect subscription.

FIG. 24 is a diagram of an indirect subscription. When the subscription mediating portion 143 of the watcher management portion 14 receives a description as described below, it requests the transfer origin A for a watcher list addition request, as described below. Here, a presence "b1" of the subscribee B is a presence that is transferred by a presence of user A.

Subscription
    Subscriber ID "Y"
    Subscribee ID "B"
    Watcher List Addition Request
    Subscribee ID "B"
    Transfer origin ID "A"
    Subscriber ID "Y"

The subscription mediating portion 143 compares the disclosure conditions of the transfer destination A and those of the subscriber of the watcher list addition request. Based on the result of this comparison, the subscription mediating portion 143 adds the subscriber Y to the watcher of the presence "b1" of the transfer destination B. For example, it is possible that all the subscribers may satisfy the disclosure conditions of the transfer destination.

Figure 25A:
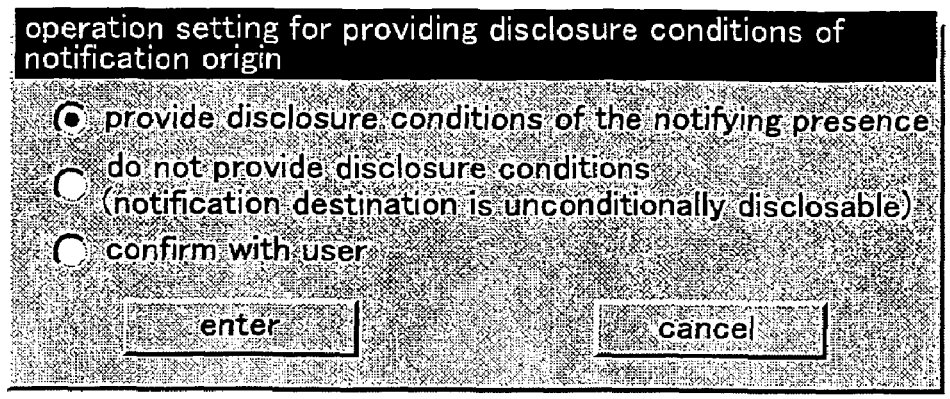
FIG. 25A is an example of a screen to notify an operator of the presence server when an additional watcher list request is generated.
Figure 25B:
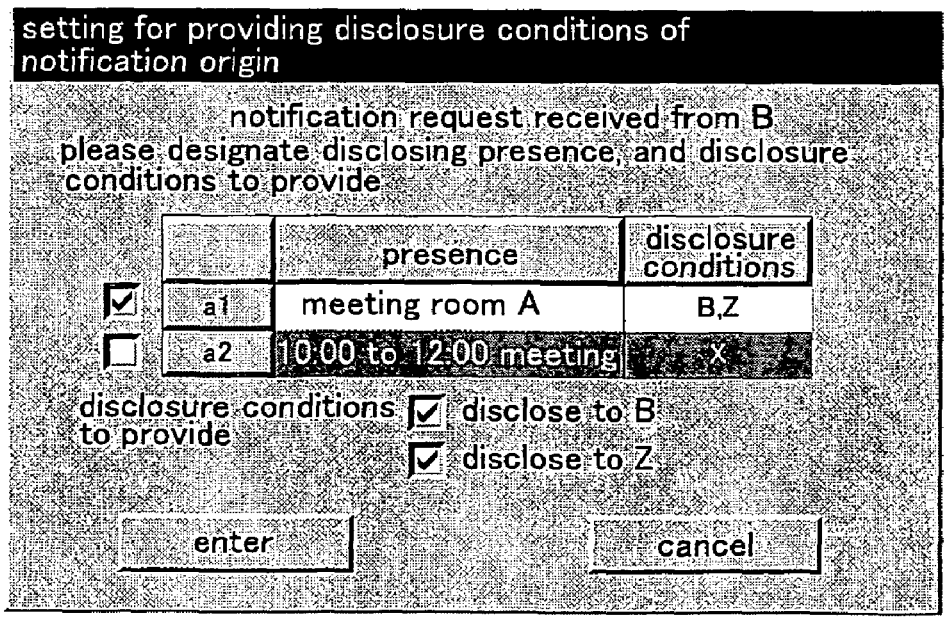
FIG. 25B is an example of a screen to notify the transfer origin.

FIG. 25 is an example of a screen provided by the transfer origin disclosure condition setting portion 138. FIG. 25A is an example of a screen to notify an operator of the presence server 10 when a watcher list addition request is generated. FIG. 25B is an example of a screen to notify the transfer origin. The transfer origin user can set the presence to be disclosed, and the disclosure conditions.

Ultimately, if the watcher of the subscriber B is added within the range of the disclosure conditions of the user A of the transfer origin, then the privacy of the transfer origin user can be protected.

Third Embodiment

In the third and the fourth embodiments, consideration is given to avoiding a state in which there is no presence ID corresponding to the category information, when a renewal request, subscription or transfer request is performed using the category information.

Figure 26:
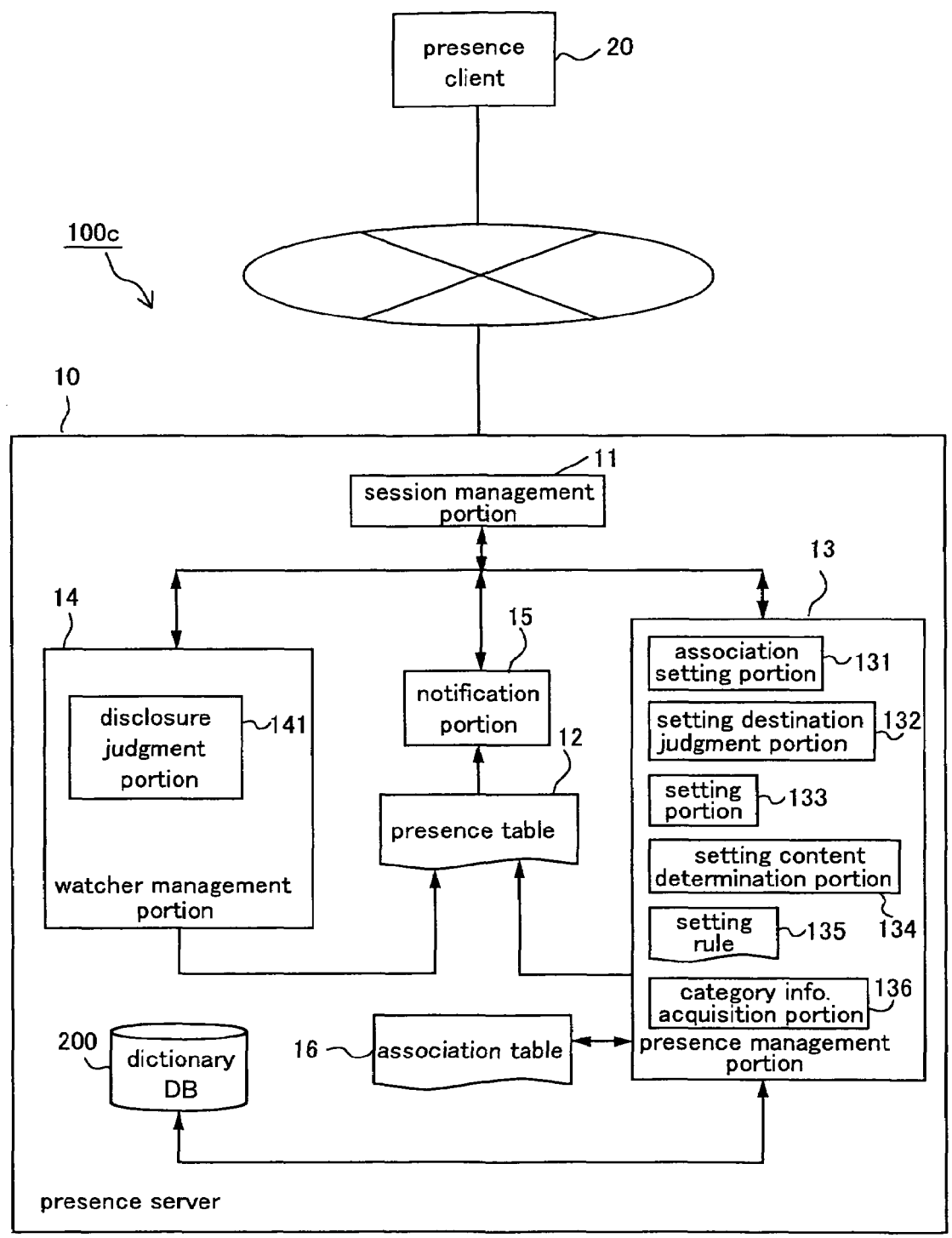
FIG. 26 is a structural overview of a presence system according to a third embodiment of the present invention.

FIG. 26 is a structural overview of a presence system 100c according to the third embodiment. In a similar manner to the presence system 100a of the first embodiment, the presence system 100c is configured by a presence server 10 and a presence client 20 that are connected via a network. The presence system 100c may also include a category information management server 30. The presence server 10 is connected via the network to a card reader that is not illustrated. In the diagram, structural elements having functions similar to those of the first embodiment are provided with the same numbers.

In the present embodiment, the presence server 10 has a dictionary DB 200. The dictionary DB 200 stores thesauruses, for example. An example in which the dictionary DB 200 stores a thesaurus will be described. In order to simplify the description, a situation will be considered in which a renewal request that has the following attached category information is transmitted from a card reader to the presence server 10.

Renewal Request
Renewer ID "X"
Object ID "A"
Presence "meeting room A"
Category information "position"

A setting destination judgment portion 132 of the presence server 10 specifies the presence ID corresponding to the category information in the renewal request from the presence table of user A, based on the thesaurus. The setting portion 133 sets the presence "meeting room A" included in the renewal request as the content of the presence ID.

The process of the setting destination judgment portion 132 is described in further detail. The setting destination judgment portion 132 extracts synonyms corresponding to the category information in the renewal request from the dictionary DB 200, for example "place" and "location". The setting destination judgment portion 132 specifies the presence ID corresponding to the category information in the renewal request and any of the synonyms, from the presence table of user A. By specifying the presence ID that is to be renewed using the thesaurus, the scope of the presence ID capable of handling category information that is freely designated by a third party, is widened. That is, there is a widening of the degree of freedom of a third party attempting to renew the presence of another to designate category information. Thus, it is easier to prevent a situation in which a presence ID corresponding to designated category information is not present.

In a similar manner to the renewal request, by using the thesaurus, in subscriptions using information from a third party, or in transfer requests using information from a third party, it is possible to increase the degree of freedom to specify the presence ID corresponding to designated category information.

It should be noted that other dictionaries, such as a shared dictionary that stores category information that is used in common within the presence system 100c can also be accumulated in the dictionary DB 200. Any category information that uses the shared dictionary is recorded in the card reader or the category information management server 30. In accordance with such a configuration, it is possible to prevent a state in which a presence ID corresponding to the category information included in the renewal request is not present. Furthermore, it is possible to prevent a condition in which a presence ID corresponding to the category information of the card reader, which is the renewer, is not present.

Fourth Embodiment

Figure 27:
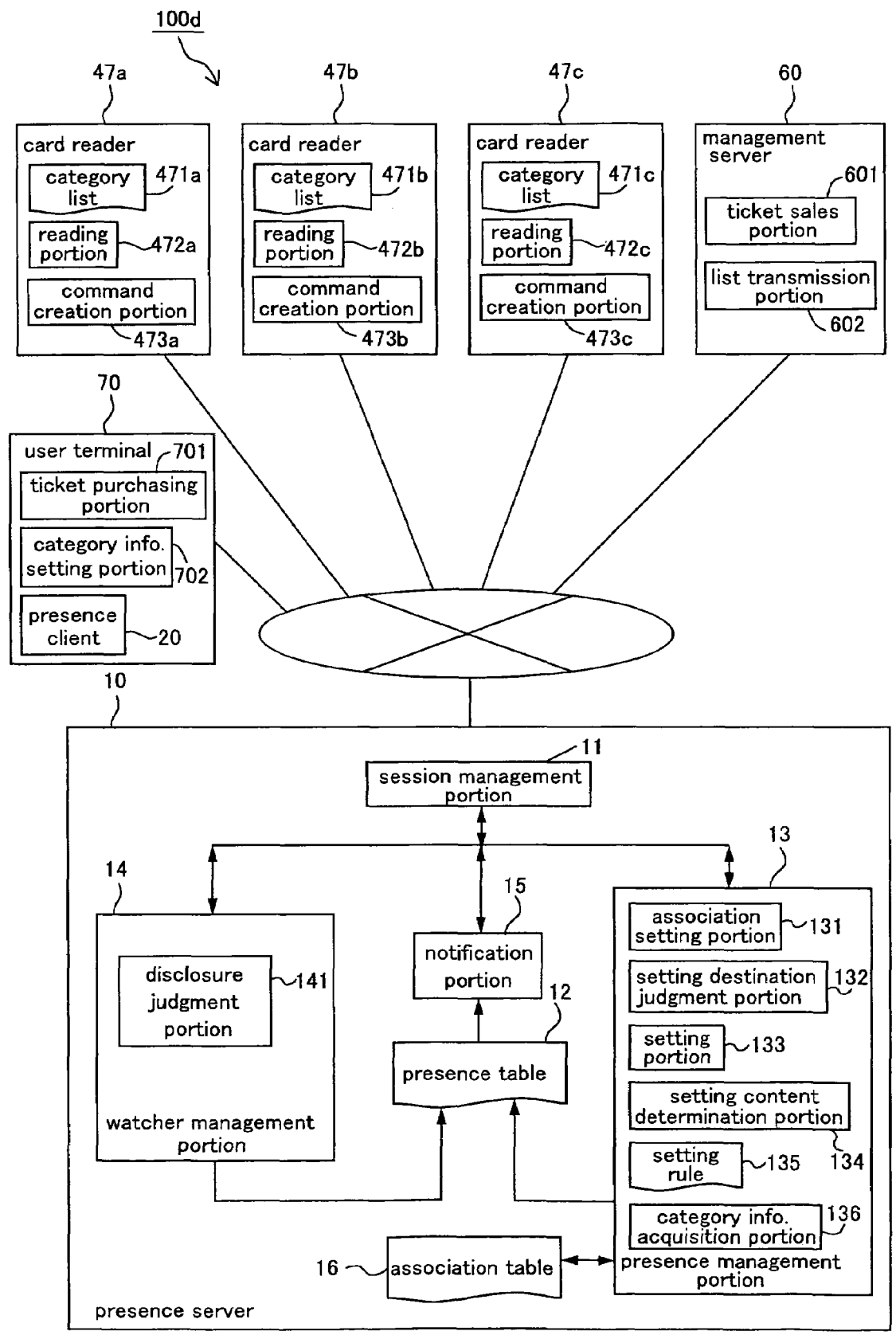
FIG. 27 is a structural overview of a presence system according to a fourth embodiment of the present invention.

In the fourth embodiment, if a change in the presence caused by an action of a user is predicted, then the user can associate the presence that changes and the category information in advance. Thus, this prevents the condition in which the presence correlating to the category information, which is notified together with a renewal request from a third party does not exist. As an example here, a situation is considered in which user A purchases a plane ticket from an online ticket sales system. Functional configuration of the entire system FIG. 27 is a structural overview of a presence system 100d according to the fourth embodiment. In a similar manner to the presence system 100a of the first embodiment, the presence system 100d is constituted by a presence server 10 and a presence client 20 that are connected via a network. Furthermore, the presence server 10 is connected via a network to card readers 47a, 47b and 47c, a management server 60 and a user terminal 70. The three card readers 47a, 47b and 47c are disposed at the airport entrance, at the check-in entrance and at the boarding gate, respectively. The presence system 100d may also include a category information management server 30. In the diagram, structural elements that have a similar function to those in the first embodiment are provided with the same numbers.

Card Reader

The card readers 47a, 47b and 47c have similar configurations, and thus the card reader 47a is described. The card reader 47a stores a category list 471a, and has a reading portion 472a and a command creation portion 473a. The reading portion 472a reads in information from an IC Card (see FIG. 1). Based on the information thus read in, and the information list 471a, the command creation portion 473a creates and transmits a renewal request.

Figure 29:
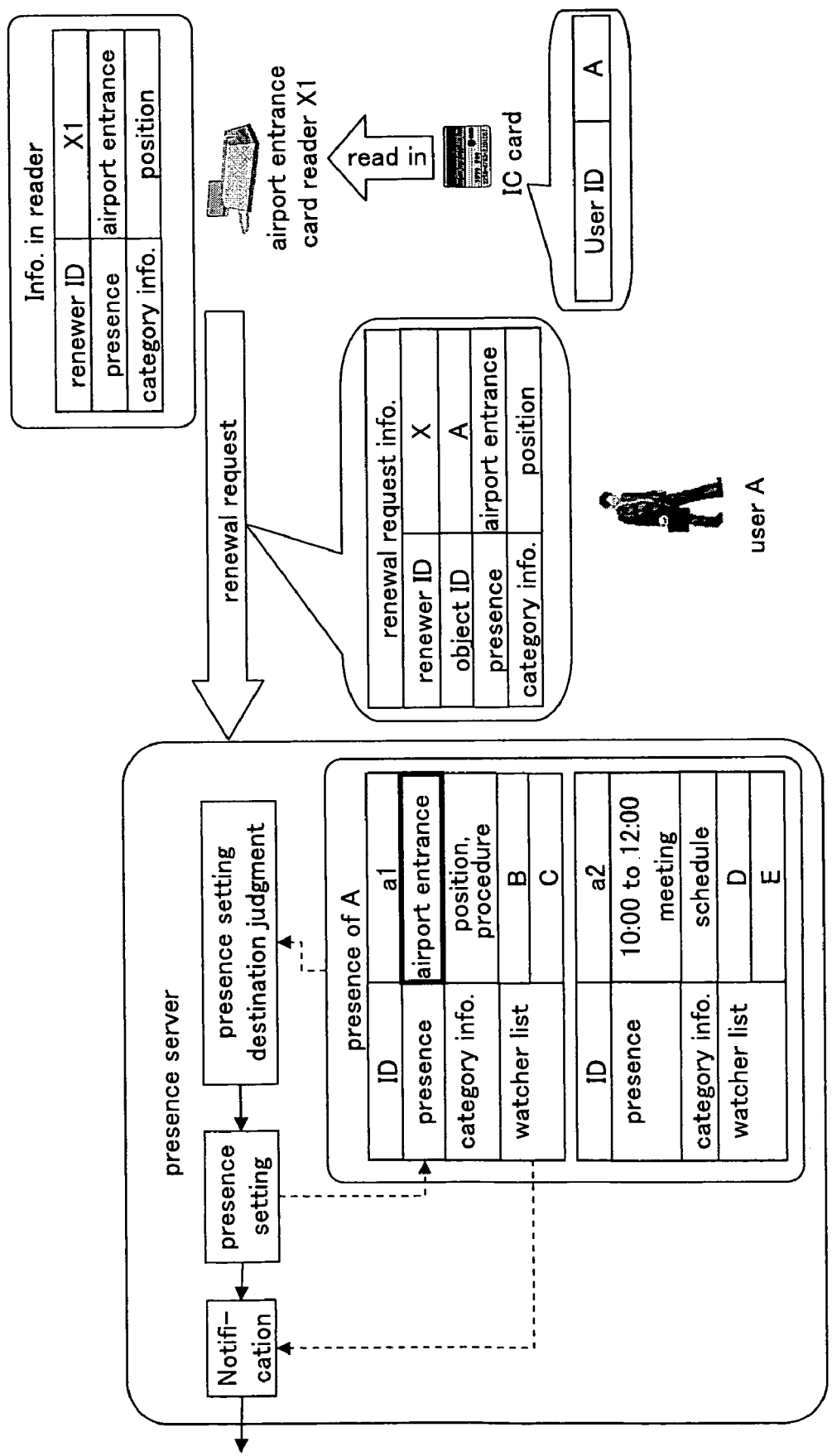
FIG. 29 is a diagram showing the flow of a transfer request in which category information is used, according to the presence system of FIG. 27.

FIG. 28A shows a conceptual diagram of the category list 471a in the card reader 47a. The renewer ID, the presence and the category information are stored in the category list 471a. The renewer ID is the user ID of the card reader in the presence system 100d. Based on this information, the card reader 47a transmits the renewal request that includes the following information to the presence server 10. FIG. 29 is a diagram showing the flow of the process of transmitting the renewal request.

Renewal Request
Renewer ID "X1"
Object ID "A"
Presence "airport entrance"
Category information "position"

FIG. 28B is a conceptual diagram of the category list 471b that the card reader 47b possesses. In accordance with the category list, the card reader 47b transmits the renewal request that includes the following information to the presence server 10.

Renewal Request
Renewer ID "X2"
Object ID "A"
Presence "check-in entrance"
Category information "procedure"

FIG. 28C is a conceptual diagram of the category list 471c possessed by the card reader 47c. In accordance with the category list, the card reader 47c transmits the renewal request that includes the following information to the presence server 10.

Renewal Request
Renewer ID "X3"
Object ID "A"

Presence "boarding gate"
Category information "procedure"

Management Server

The management server 60 sells plane tickets online from a ticket sales portion 601. Moreover, depending on the ticket that is purchased, a list transmission portion 602 of the management server 60 transmits the list of category information corresponding to that ticket to the user terminal 70. The category information list that the list transmission portion 602 transmits includes, in this example, the category information that each card reader 47a, 47b and 47c stores. The category information list is displayed on a display of the user terminal 70.

User Terminal

In addition to the presence client 20, the user terminal 70 has a ticket purchasing portion 701 and a category information setting portion 702. The ticket purchasing portion 701 contains a function to purchase a ticket from the management portion 60 online. The category information setting portion 702 urges the operator of the user terminal 70 to correlate the category information received from the management server 60 and the presence ID. Furthermore, the category information setting portion 702 transmits the correlation of the category information and the presence ID to the presence server 10.

FIG. 30 shows an example of a screen for notification of the category information list. This screen is displayed by the category information setting portion 702. For example, the category information list that is notified from the management server 60 is displayed on this screen. The user correlates the category information and the presence ID by drag & drop.

Flow of the Process of the Entire System

Figure 31:
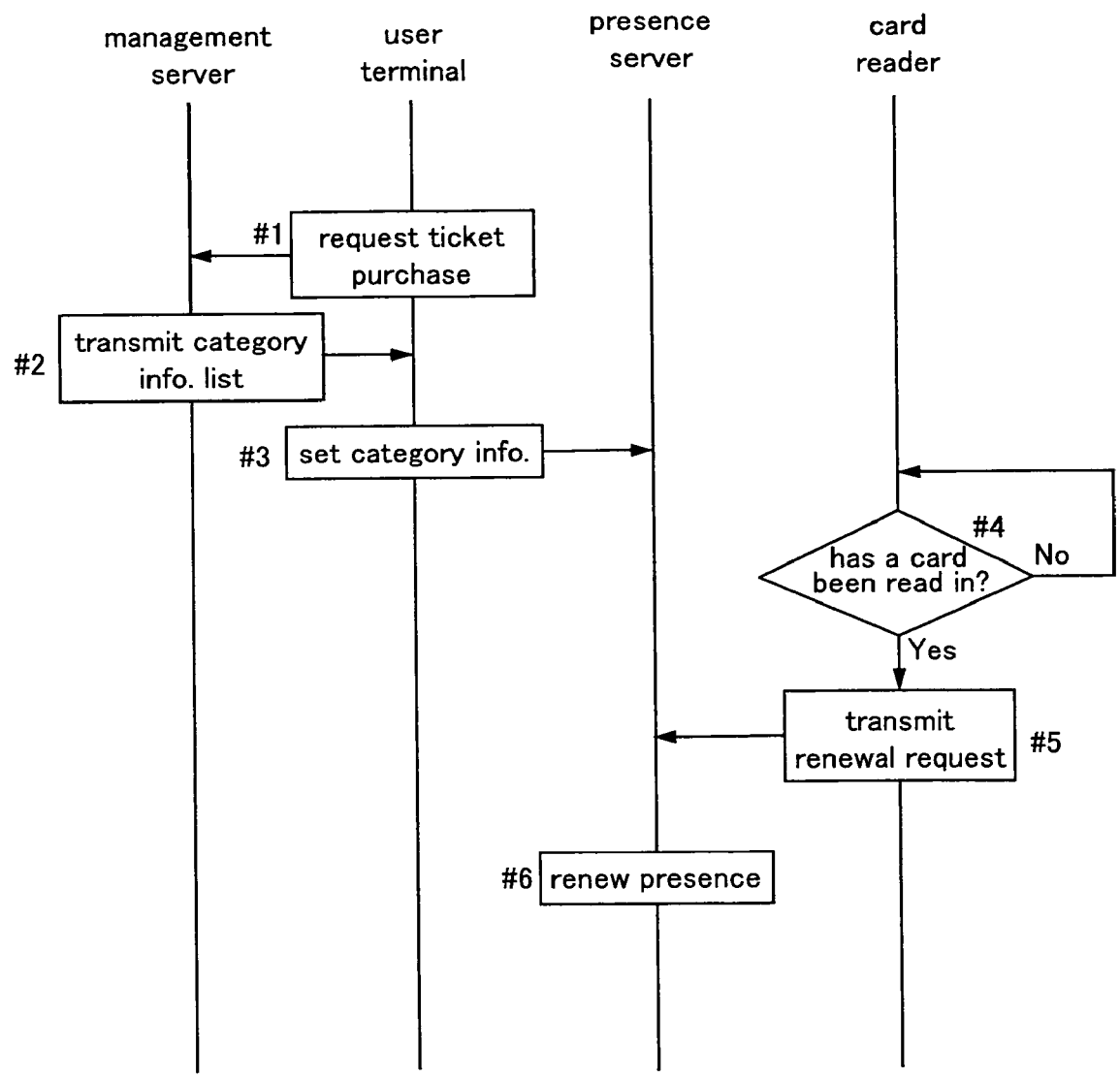
FIG. 31 is a diagram showing the flow of the process performed by the presence system in FIG. 27.

FIG. 31 is a diagram showing the flow of the process of the entire presence system 100d. First, a purchase request for a ticket is transmitted to the management server 60 from the user terminal 70 (#1). In response, the category information list is returned from the management server to the user terminal 70. Next, the association of the category information in the category information list and the presence ID, is transmitted from the user terminal 70 to the presence server 10 (#3). The association setting portion 131 of the presence server 10 stores this correlation in the association table 16. Thus, the correlation between the category information of the card reader and the presence ID of the user is stored within the presence server 10.

In this condition, when the card readers 47a, 47b and 47c read in the IC card of the user (#4) the renewal request is transmitted to the presence server 10. In accordance with this renewal request, the presence corresponding to the category information in the renewal request is updated. The correlation between the category information of the card reader and the presence ID of user A is recorded on the presence server 10, and thus the state in which the presence ID corresponding to the renewal request is not present can be prevented, and the presence can be reliably updated.

Fifth Embodiment

In the following fifth to eleventh embodiments, methods for creating renewal requests, subscription settings and transfer requests, for example (referred to below as commands), on the card readers or the presence server, are described. In order to simplify the description, a situation will be considered in the following fifth to eleventh embodiments, in which a truck visits cargo collection points CP1, CP2, . . . collecting goods and transporting them. The user ID of the truck is "T". Furthermore, the user IDs of the goods are "G1", "G2", "G3", . . . . A card reader is installed at the cargo collection points CP1 and CP2.

Functional Configuration of the Entire System

Figure 32:
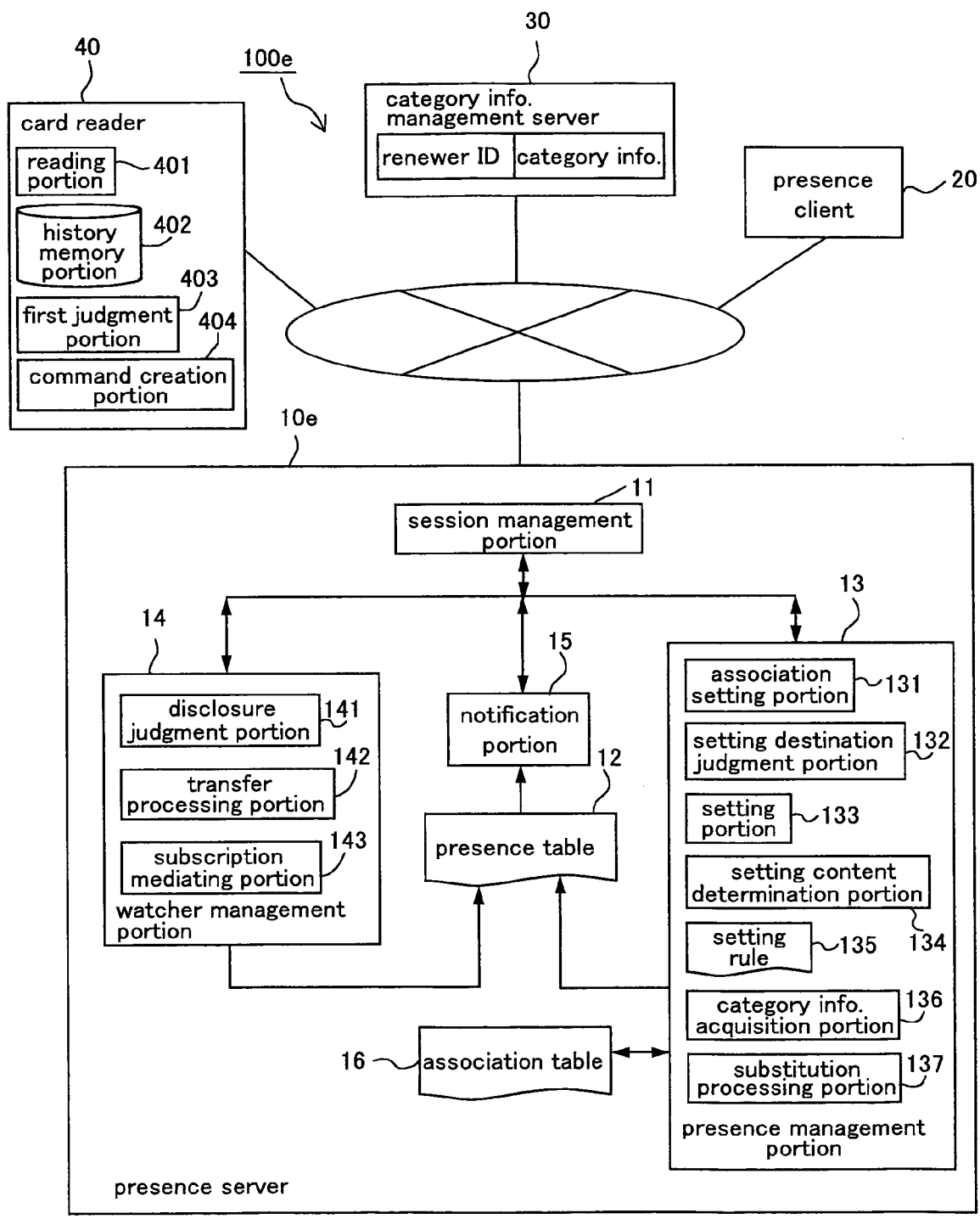
FIG. 32 is a structural overview of a presence system according to a fifth embodiment of the present invention.

FIG. 32 is a structural overview of a presence system 100e according to the fifth embodiment. The presence system 100e is constituted by a presence server 10e and a presence client 20, connected via a network. The presence system 100e may also include a category information management server 30. In this situation, it is possible that the information that a card reader 40 reads in from the IC card may or may not include category information. Furthermore, the presence server 10 is connected to the card reader 40 via a network. The structural elements shown in the diagram that have a similar function to those in the first embodiment are provided with the same symbols.

Presence Server

In addition to having the configuration of the presence server 10 according to the first embodiment, the presence server 10e preferably has a transfer processing portion 142 and a subscription mediating portion 143. This is so as to be capable of handling the commands of transfer requests and of subscription requests. Furthermore, in order to execute the transfer in accordance with the transfer request, it is preferable that the presence server 10e contains a substitution processing portion 137.

Card Reader

The card reader 40 contains a reading portion 401, a history memory portion 402, a first judgment portion 403 and a command creation portion 404. The reading portion 401 reads in the user ID and the category information on the IC card (see FIG. 1). The history memory portion 402 records the history of the information that is read in. The first judgment portion 403 determines the type of the command to create, based on the history information. Furthermore, if a transfer request is created, then the first judgment portion 403 determines the transfer origin and the transfer destination. Moreover if a subscription request is created, then the first judgment portion 403 determines the subscribee and the subscriber. The command creation portion 404 creates various commands based on decisions of the first judgment portion 403

FIG. 33 is a conceptual diagram of the history information that the history memory portion 402 stores. At least the following information (a) to (c) is included in the history information.

(a) Time: The time at which the user ID and category information is read in from the IC card.

(b) User ID: The user ID according to the presence system 100e recorded on the IC card that was read in.

(c) Category information: Category information recorded on the IC card that was read in.

Command Creation Process

Figure 34:
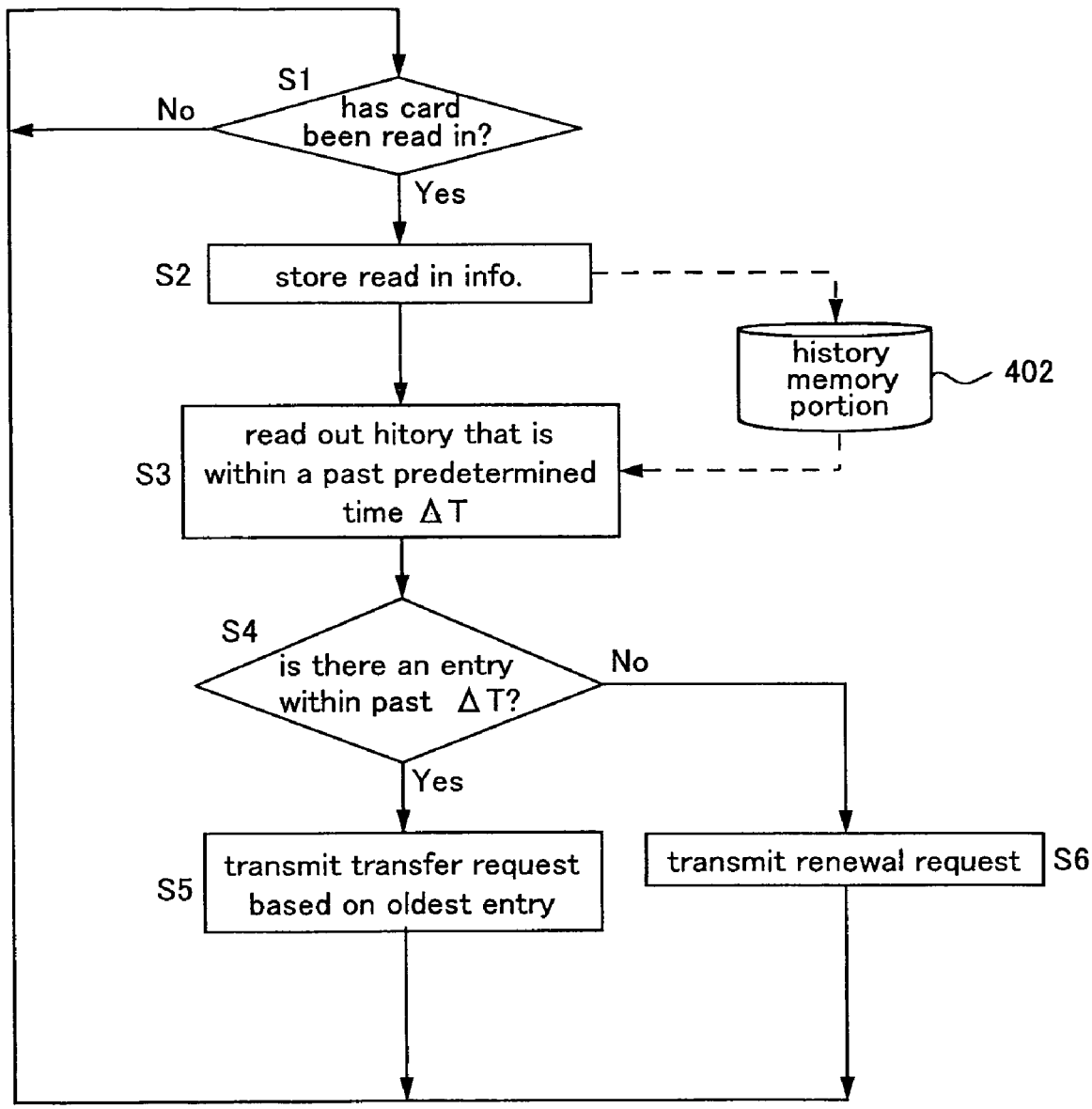
FIG. 34 is a flowchart showing an example of the flow of the command creation process that is executed by the card reader of FIG. 32.

FIG. 34 is a flowchart showing an example of the flow of the command creation process that the card reader 40 performs. Here, the command creation process is performed under the precondition that the IC card of the truck "T" is first passed through the card reader "X" at the cargo collection point CP1, after which the IC card of the goods that are loaded into the truck "T" are passed.

Step S1 and S2: When the reading portion 401 reads in (S1) the information on the IC card that is attached to the goods, that information is stored (S2) in the history memory portion 402 as history information. History information such as time "15:20", the user ID "G2" and the category information "position" are stored in the history information portion 402 (see FIG. 33). In the following, an entry of the newest information that is read in is called the current entry.

Step S3: The first judgment portion 403 reads out history information that is within a past predetermined time ΔT from the history memory portion 402. For example, the history information shown in FIG. 33 is read out.

Step S4: The first judgment portion 403 judges whether or not entries other than the current entry are within the past time ΔT. Referring to FIG. 33, for example, if ΔT is 30 minutes, then there are two entries.

Step S5: If there are entries within the past ΔT, then the first judgment portion determines the type of the command, for example, "transfer request". Furthermore, the first judgment portion 403 determines that the user ID of the oldest entry, from among the entries within ΔT, is the transfer origin. Moreover, the first judgment portion 403 determines that the user ID of the newest entry is the transfer destination. In this example, the transfer origin is the truck "T", and the transfer destination is the goods "G2".

It should be noted that the command category can also be set to "subscription" rather than "transfer" depending on necessity. In this situation, the subscriber and the subscribee can be decided based on the timing of the history information, or the user ID.

Figure 35:
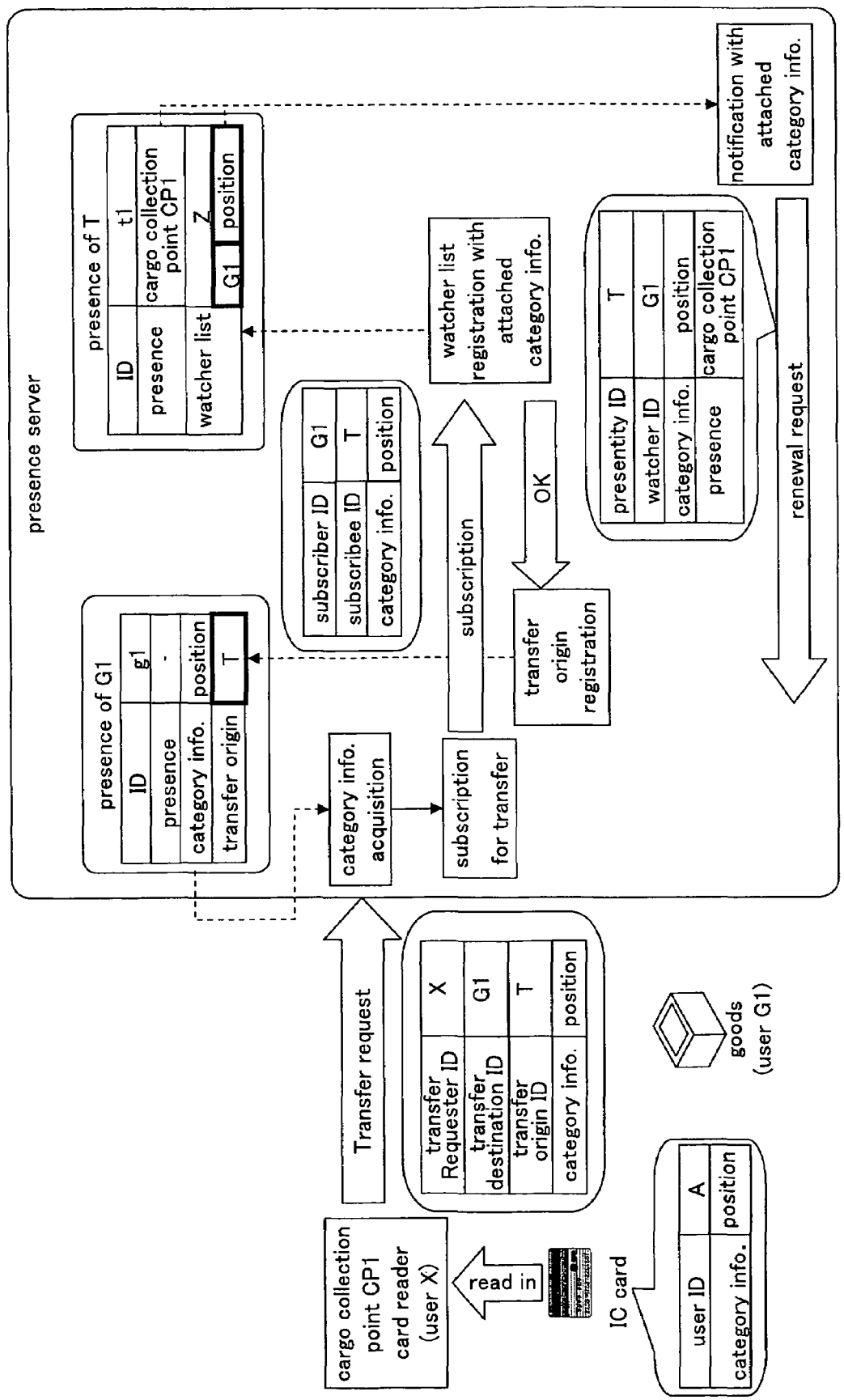
FIG. 35 is a diagram showing the flow of a transfer request in which category information is used, according to the presence system of FIG. 32.

The command creation portion 404 creates commands according to the decision of the first judgment portion 403, and transmits them to the presence server 10e. The category information included in the command is the category information read in by the card reader. A similar process was performed when the IC card of the goods "G1" was read in. FIG. 35 shows the flow of the process by which the card reader "X" of the cargo collection point CP1 creates the request to transfer the presence from the truck "T" to the goods "G1", and to transmit it to the presence server 10e.

Figure 36:
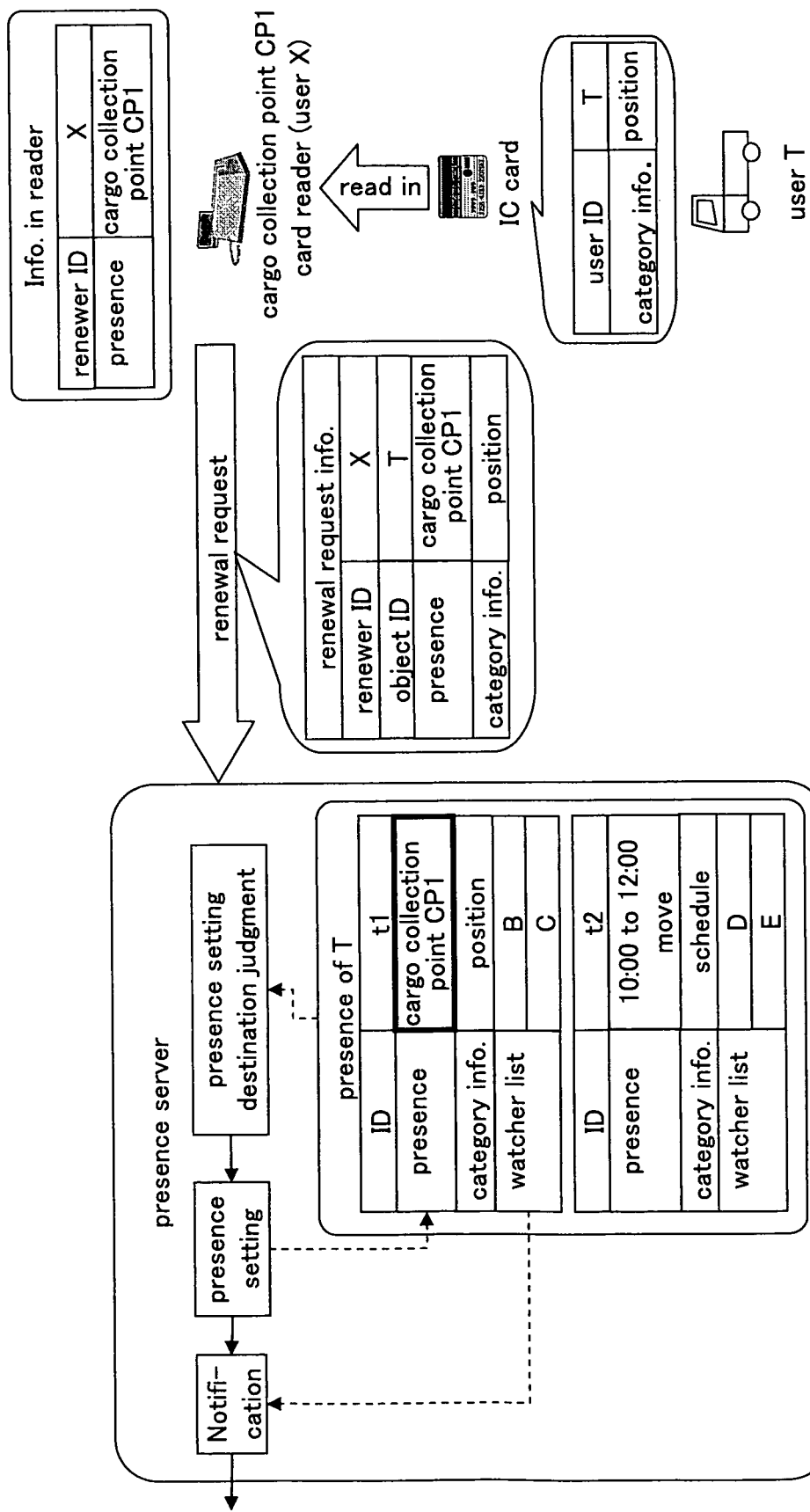
FIG. 36 is a diagram showing the flow of a renewal request in which category information is used, according to the presence system of FIG. 32.

Step S6: If there are no entries within the past ΔT other than the current entry, the first judgment portion 403 determines that the type of the command is, for example, "renewal request". Furthermore, the first judgment portion 403 determines that the user ID and the category information to be renewed are the user ID and the category information in the current entry. The command creation portion 404 creates commands in accordance with the decision of the first judgment portion 403, and transmits them to the presence server 10e. The category information included in the command is the category information that the card reader reads in. FIG. 36 shows the flow of the process to create a renewal request for the card reader "X" of the cargo collection point with regards to the truck "T", and to transmit this to the presence server 10e.

It should be noted that if the presence server 10e acquires category information from the category information management server 30, then it is not necessary to read out the category information from an IC card.

As in the foregoing description, category of the commands that are to be created can be determined based on the history information that the card reader 40 reads in, and the commands can be generated automatically.

Sixth Embodiment

In the sixth embodiment, a method for creating commands such as renewal requests on the presence server is described.

Functional Configuration of the Entire System

Figure 37:
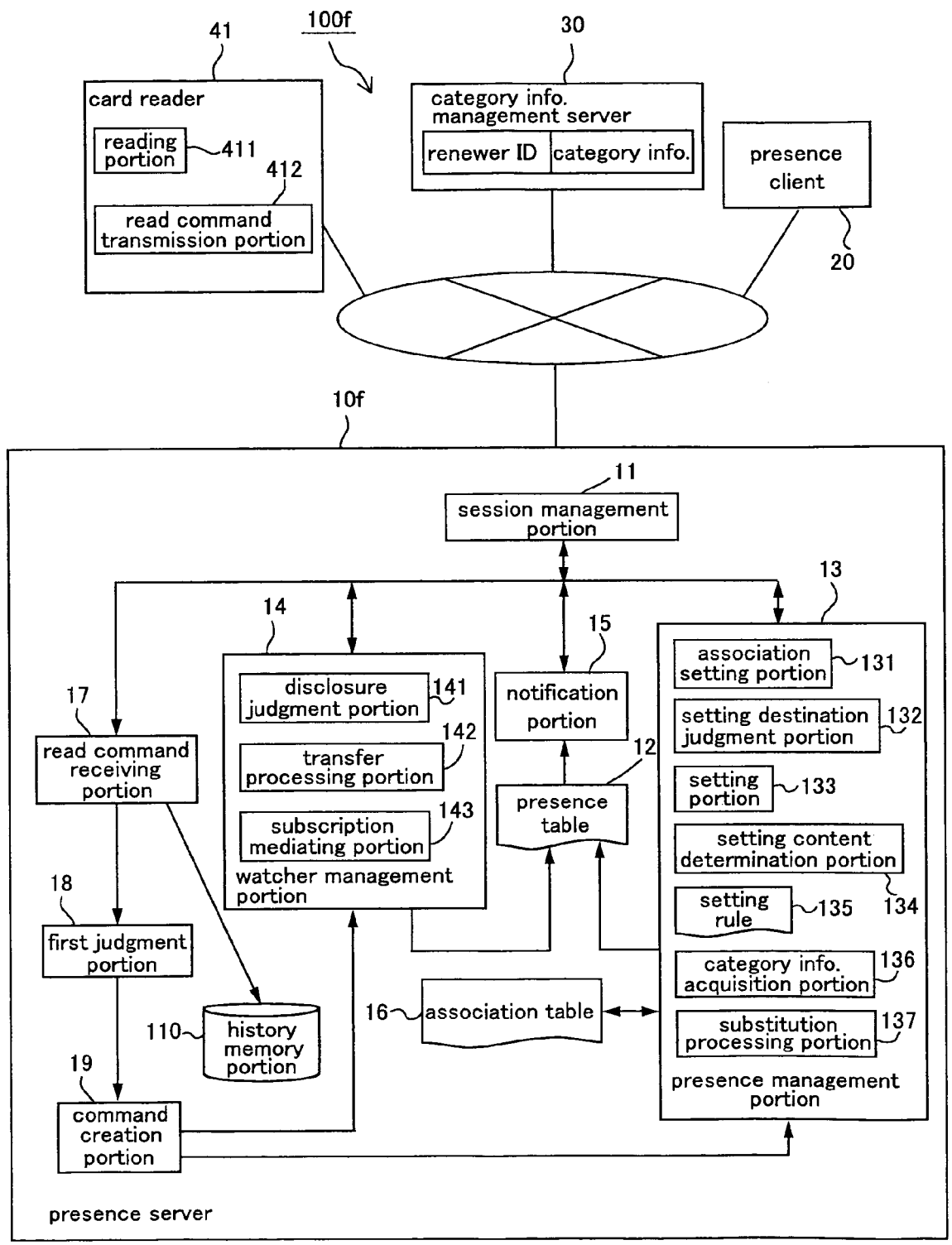
FIG. 37 is a structural overview of a presence system according to a sixth embodiment of the present invention.

FIG. 37 is a structural overview of a presence system 100f according to the sixth embodiment. In the presence system 100f, commands such as renewal requests are created in a presence server 10 based on information read in by a card reader.

In a similar manner to the presence system 100e of the fifth embodiment, the presence system 100f is constituted by a presence server 10f and a presence client 20 connected via a network. The presence system 100f may also include a category information management server 30. Furthermore, the presence server 10 is connected to a card reader 41 via a network. The structural elements shown in the diagram that have a similar function to those in the first embodiment are provided with the same symbols.

Presence Server

In addition to having the configuration of the presence server 10e of the fifth embodiment, the presence server 10f also includes the following structural elements.

(a) A read command receiving portion 17: This receives a read command from the card reader 41, and stores history information in a history memory portion 110 that will be described later. The history information includes similar information to that in the fifth embodiment.

(b) A first judgment portion 18: This has the same function as the first judgment portion 403 of the card reader 40 of the fifth embodiment. That is, it decides the type, for example, of commands to create, based on the history information.

(c) A command creation portion 19: This has a similar function to that of the command creation portion 404 of the card reader 40 of the fifth embodiment. That is, it creates commands, and notifies the presence management portion 13 or the watcher management portion 14.

(d) The history memory portion 110: This stores history information that is received together with the read command.

That is, the presence server 10f is constituted by the presence server 10 of the fifth embodiment, onto which is attached a part of the configuration of the card reader 40. The presence server 10f that is configured in such a manner creates commands such as renewal requests based on the read command, and performs renewals, transfers and subscriptions of presences based on the commands that are created.

Configuration of the Card Reader

The card reader 41 has a reading portion 411 and a read command creation portion 412. In a similar manner to the reading portion 401 of the card reader 40 of the fifth embodiment, the reading portion 411 reads in user IDs and category information from an IC card (see FIG. 15. The read command creation portion 412 transmits information that is read in to the presence server 10f.

Command Creation Process

Figure 38:
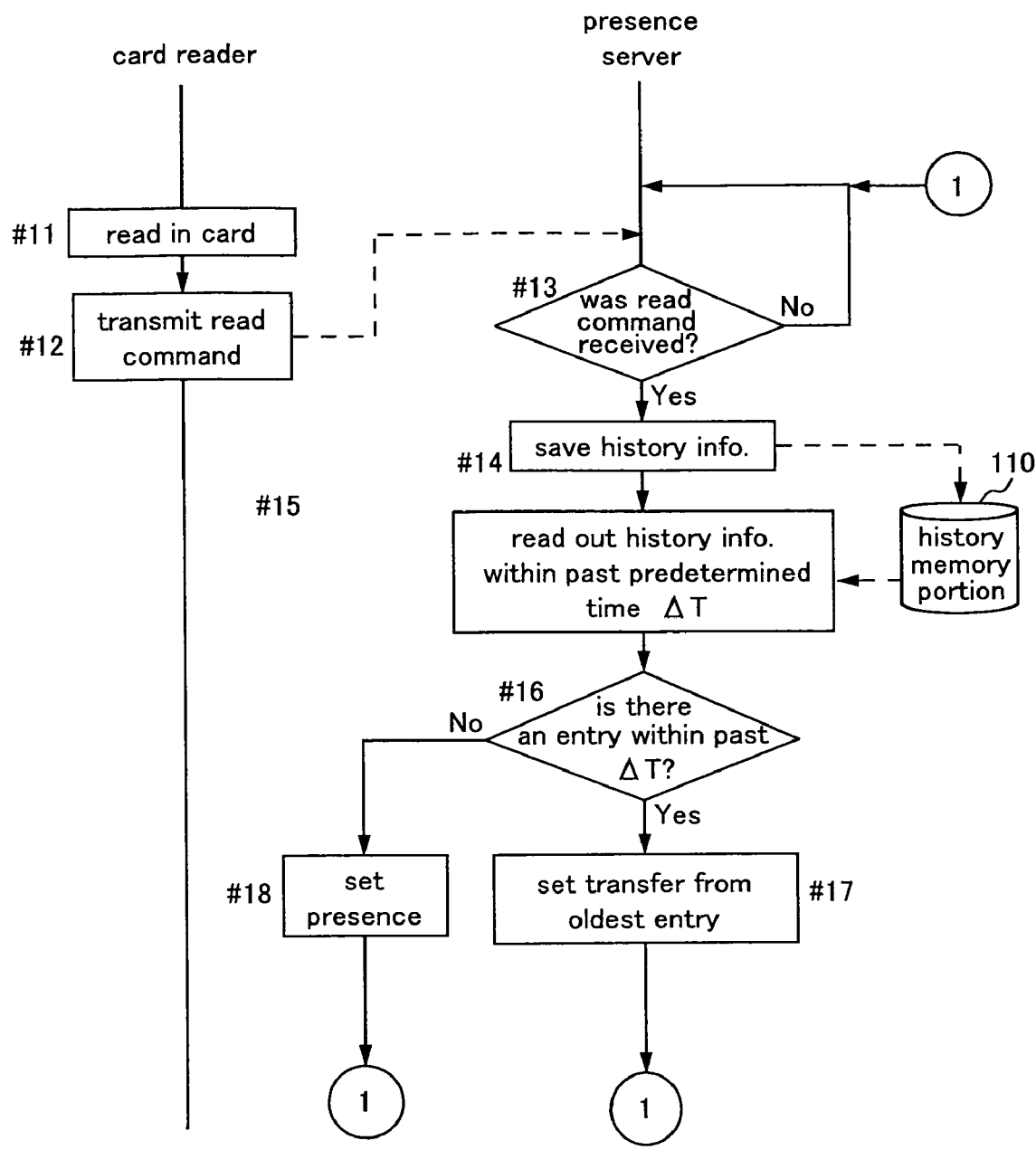
FIG. 38 is a diagram showing an example of the process of command creation performed by the presence server of FIG. 37.

FIG. 38 is a flow chart that shows an example of the flow of the command creation process that the presence server 10f performs. Here, the command creation process is performed with a precondition that, in a similar manner to the fifth embodiment, first, the IC card of the truck "T" is passed through the card reader "X" of the cargo collection point CP1, after which the IC card of the goods that are loaded onto the truck "T" is passed.

First, when the reading portion 411 of the card reader 41 reads in (#11) the information of the IC card attached to the goods, it transmits (#12) the read command that includes the history information to the presence server 10f.

When the read command receiving portion 17 of the presence server 10f receives (#13) a read command, it stores (#14) the history information, that is, the current entry, in the history memory portion 110.

Moreover, the first judgment portion 18 reads out (#15) the history information that is within the past predetermined time subscription ΔT from the history memory portion 110.

Next, the first judgment portion 18 judges (#16) whether or not entries other than the current entry are within the past ΔT.

If there are entries other than the current entry that are within the past ΔT, then the first judgment portion 18 determines (#17) the type of the command, for example "transfer request". Furthermore, the first judgment portion 18 determines that the user ID of the oldest entry within the past ΔT is the transfer origin. Moreover, the first judgment portion 18 determines that the user ID of the newest entry is the transfer destination. It should be noted that instead of setting the command category to transfer, it can also be set to subscription. In this situation, the first judgment portion 18 can determine the subscriber and the subscribee, based on the timing of the history information and the user ID.

Figure 39:
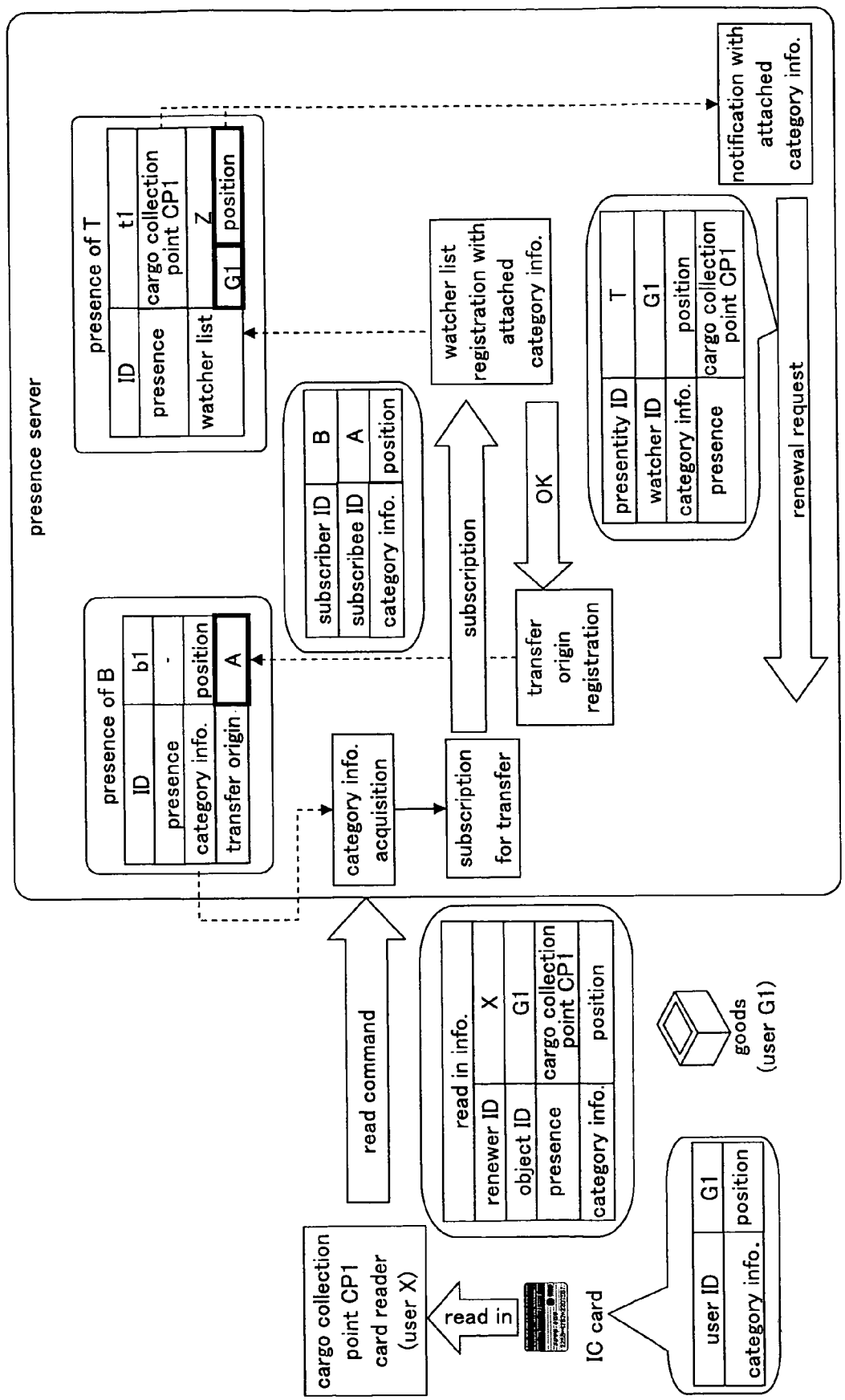
FIG. 39 is a diagram showing the flow of a transfer request in which category information is used, according to the presence system of FIG. 37.

After this, the command creation portion 19 creates the transfer request command in accordance with the decision of the first judgment portion 18, and notifies (#17) the watcher management portion 14. The category information included in the command is the category information that is included in the read command. The transfer processing portion 142 of the watcher management portion 14 performs the transfer setting based on this notification. FIG. 39 shows the flow of the process by which the presence server 10f creates a request to transfer the presence from the truck "T to the goods "G1", based on the read command from the card reader "X" of the cargo collection point, and sets the transfer.

Figure 40:
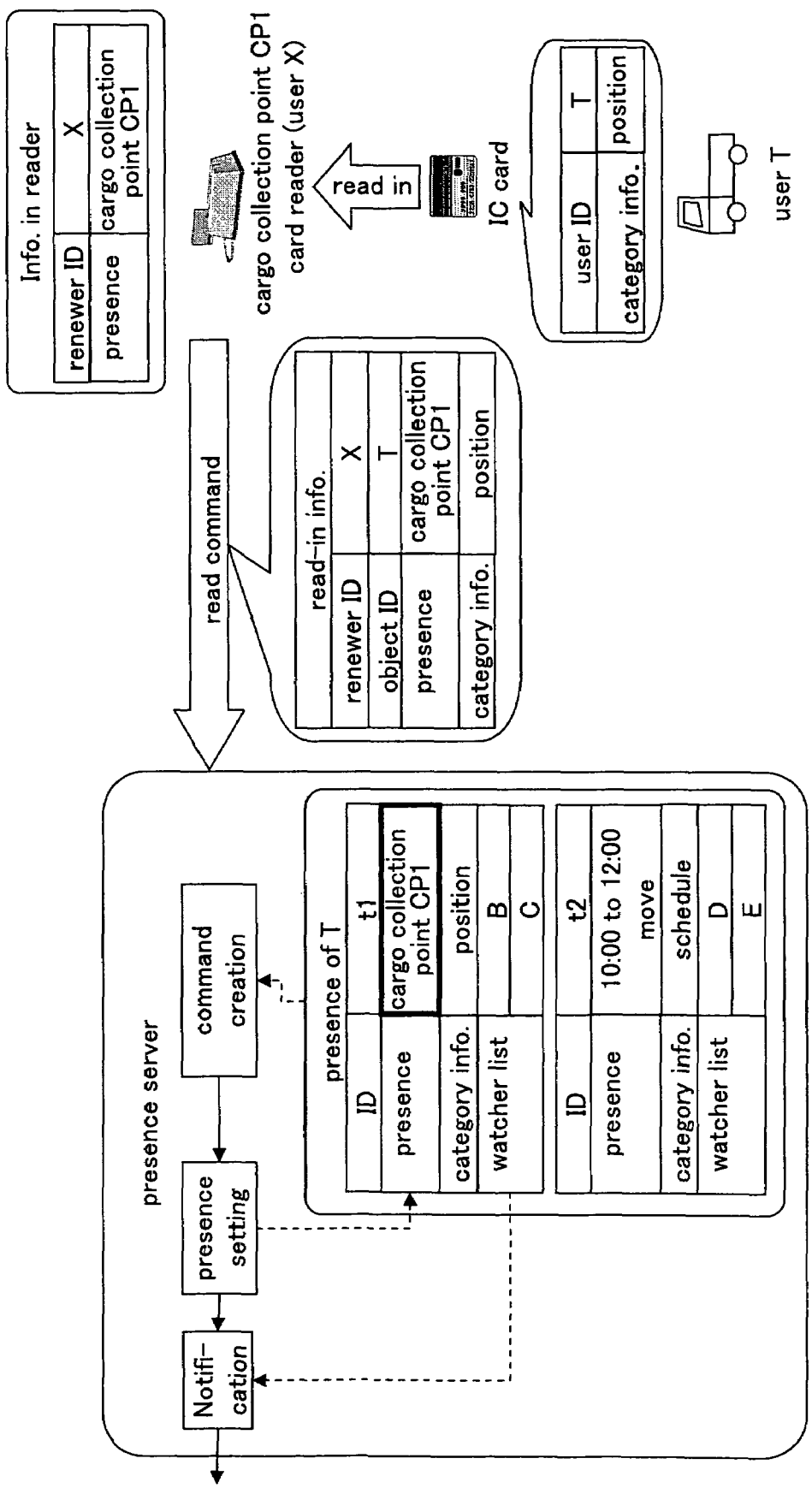
FIG. 40 is a diagram showing the flow of a renewal request in which category information is used, according to the presence system of FIG. 37.

If there is no entry within the past ΔT other than the current trend, then the first judgment portion 18 determines (#18) the type of the command, for example "renewal request". Furthermore, the first judgment portion 18 determines that the user ID and the category information to be renewed are the user ID and the category information in the current entry. The command creation portion 19 creates the renewal request in accordance with the decision of the first judgment portion 18, and notifies the presence management portion 13. The category information included in the command is the category information that is included in the read command. The setting portion 133 of the presence management portion 13 carries out renewal of the presence based on the renewal request that is received. FIG. 40 shows the flow of the process in which the presence server 10f creates a renewal request for the truck "T", based on the read command from the card reader "X" of the cargo collection point, and sets the presence.

It should be noted that the type of the command may be also be "subscription", rather than "transfer". In this situation, the command creation portion 18 notifies a subscription request to the watcher management portion 14. The subscription mediating portion 143 of the watcher management portion 14 renews the watcher list based on the subscription renewal that is received.

In this situation, if the category information management server 30 is provided, then the process server 10f may also acquire the category information included in the command from the category information management server 30.

As described above, the presence server 10f can determine the class, for example, of the command that is to be created, based on the history information that is read in by the card reader 41, and can create the command automatically.

Seventh Embodiment

Figure 41:
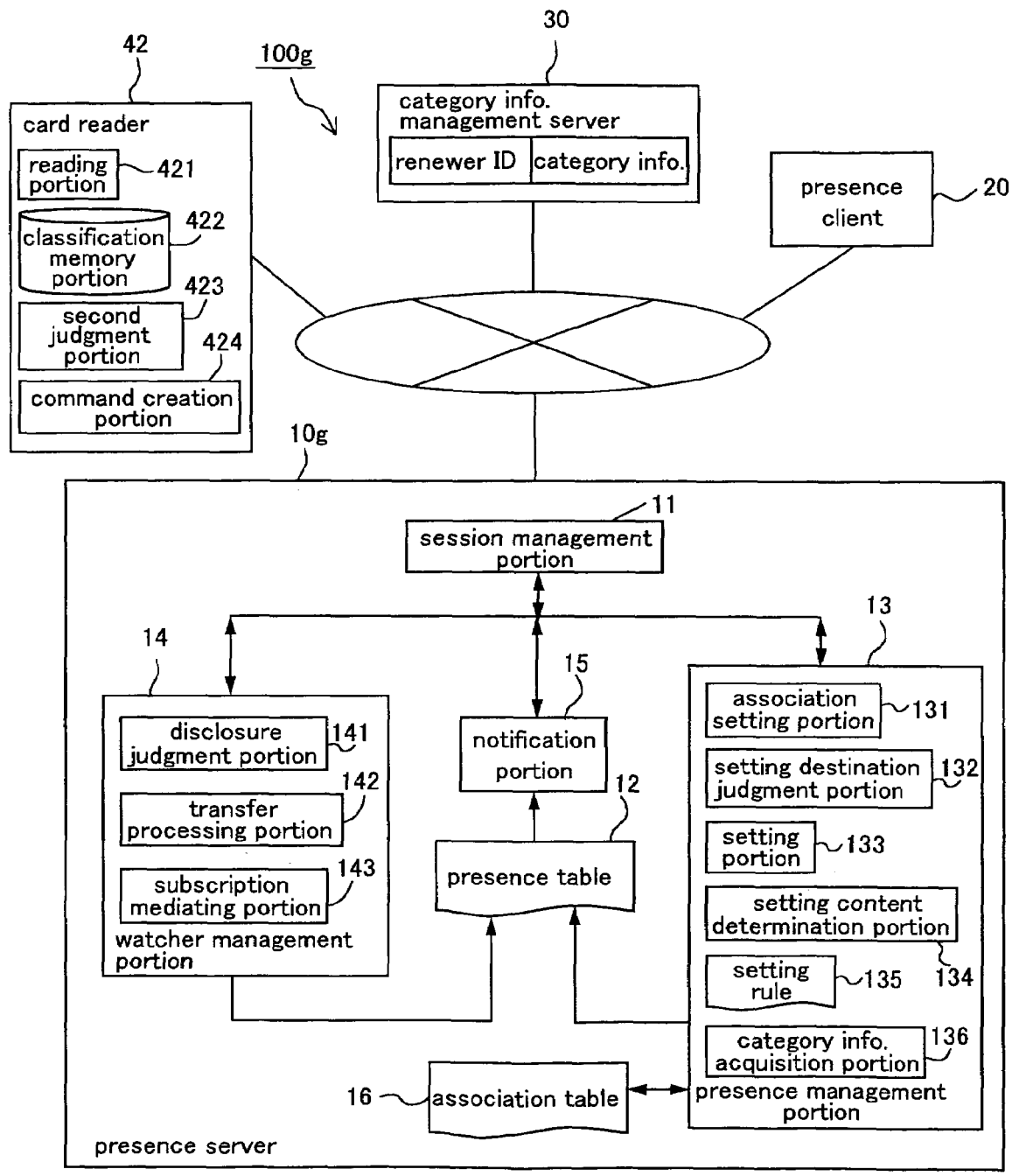
FIG. 41 is a structural overview of a presence system according to a seventh embodiment of the present invention.

FIG. 41 is a structural overview of a presence system 100g according to the seventh embodiment. The presence system 100g is constituted by a presence server 10g and a presence client 20, connected via a network. The presence system 100g may also include a category information management server 30. Furthermore, the presence server 10g is connected to a card reader 42 via a network. The structural elements shown in the diagram that have a similar function to those in the first embodiment are provided with the same symbols. The presence server 10g has a similar configuration as the fifth embodiment.

Card Reader

The card reader 42 has a reading portion 421, a classification memory portion 422, a second judgment portion 423 and a command creation portion 424. The reading portion 421 reads in information from an IC card (see FIG. 1). The classification memory portion 422 stores a user-classification table, a classification-command table, and a history table. The second judgment portion 423 determines the type of command to create, based on information in the classification memory portion 422. Furthermore, if a transfer request is created, the second judgment portion 423 determines the transfer origin and transfer destination. Moreover, if a subscription request is created, the second judgment portion 423 determines the subscribee and the subscriber. The command creation portion 424 creates various types of commands in accordance with the decisions of the second judgment portion 423.

FIG. 42 is a conceptual diagram of information stored in the classification memory portion 422. FIG. 42A shows a conceptual explanatory diagram of information that is accumulated in the user-classification table 422a. The user ID and the classification of the user thereof are associated in this table 422a. For example, a classification "truck" is associated with that user ID "T" of the truck, and the classification "goods" is associated with the user IDs "G1" and "G2" of the goods.

FIG. 42B shows a conceptual diagram of information that is accumulated in a classification-command table 422b. The classifications and the command types are associated in the table 422b. "Transfer request" is correlated with the classification "goods", and "renewal request" is correlated with the classification "truck".

The user IDs and the command classifications can be correlated by the user-classification table 422a and the classification-command table 422b. The two tables 422a and 422b are stored in advance in the classification memory portion 422.

FIG. 42C shows a conceptual diagram of the history information that is accumulated in the history table 422c. The history information includes at least the time and the user IDs. The time here is the time at which information is read in from the IC card. The user ID is the user ID within the presence system 100g recorded on the IC card that is read in. The history information is stored when the card reader 42 reads in the IC card.

Command Creation Process

Figure 43:
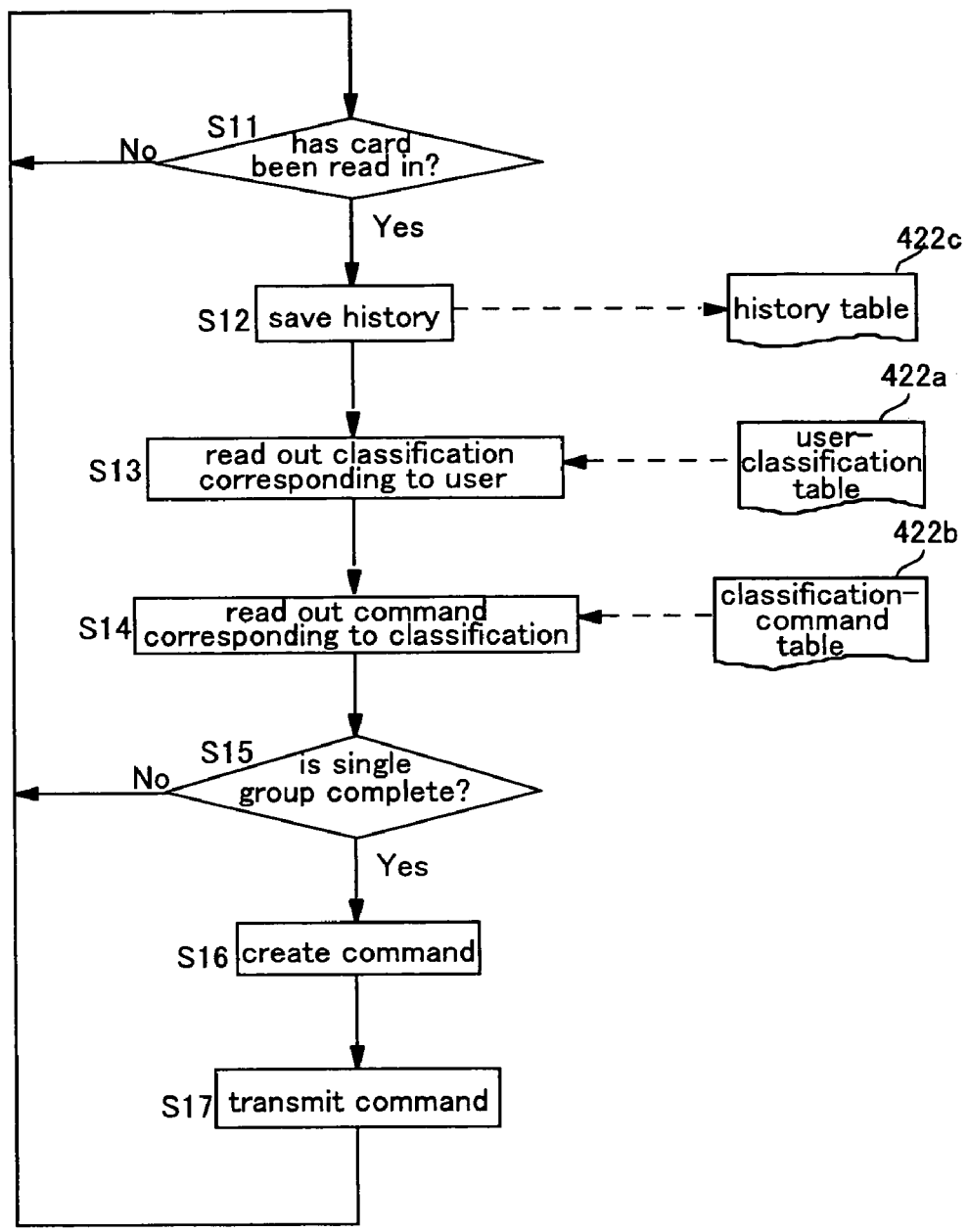
FIG. 43 is a flowchart showing an example of the flow of the process of command creation that is executed by the card reader of FIG. 41.

FIG. 43 is a flowchart that shows an example of the flow of the command creation process that the card reader 42 executes. Here, at the cargo collection point CP1, the goods are loaded onto a plurality of trucks. It can be assumed that when goods are loaded onto a single truck, the loading of a single group is complete. After completely loading one group, the loading of the next group commences after a predetermined amount of time.

Step S11: When the reading portion 421 of the card reader 42 reads in (S11) the user ID of the IC card that is attached to the truck or the goods, the reading portion 421 of the card reader 42 stores (S12) the history information in the classification memory portion 422. For example, history information such as time "15:10" and the user ID "G3" are stored in the history information portion 422 (see FIG. 42). In the following, the entry of the newest history information that is read in is referred to as the current entry.

Step 13: The second judgment portion 423 reads out the classification that corresponds to the user ID of the current entry from the user-classification table 422a.

Step S14: The second judgment portion 423 reads out the command type corresponding to the user ID from the classification-command table 422b. The second judgment portion 423 associates the user ID in the history information, the classification that was read out, and the command type corresponding to these as a single record, and stores them in a buffer, for example, which is not illustrated.

Step S15: The second judgment portion 423 judges whether or not loading of the single group has finished. This judgment refers to, for example, the history table 422c, and can be carried out according to whether or not the time period between the timing of the current entry, and the timing of the entry just before it, is greater than a predetermined time period. More specifically, an example will be used in which the predetermined time period is 5 minutes and in which the last entry of FIG. 42C, "15:10, G3" is the current entry. In this situation, the difference between it and the previous entry of "time 15:02" is 8 minutes, and thus loading of the single group is judged to be finished.

Step 16: If loading of the single group is complete, then the second judgment portion 423 creates commands for each record of the single group that is accumulated in the buffer If the command type of a record in the buffer is a transfer request, then, for example, the transfer origin can be specified as the classification "truck" in the single group, and the transfer destination can be set as the user ID of that record. Creation of a subscription request can be performed in a similar manner.

Step S17: After this, the commands that were created are transmitted in succession by the command creation portion 424 to the presence server 10g. The presence server 10g performs tasks such as setting updates and transfers of presences based on the commands, and setting subscriptions.

As in the foregoing description, the type of command can be determined by indirectly associating the user ID and the type of the command. Furthermore, it is possible to decide the transfer origin and the subscribee by automatically creating a command per single group unit.

It should be noted that it is also possible to directly associate the user ID and the type of command, and to determine the type of the command based on these.

In the above process, creating the command after storing the information of a single group in the buffer is in order to specify the transfer origin or the subscribee within the group. Accordingly, it is also possible to handle events such as reading in the IC card of the truck, not at the start, but in the middle or at the end of the single group. However, as in the fifth embodiment, in situations, for example, in which it is obligatory to read in the IC card of the truck at the beginning, it is possible to specify the truck as the transfer origin from the beginning, and thus commands may be created and transmitted each time the IC card is read.

Furthermore, in the foregoing process, whether or not loading of a single group is complete is judged by the time interval, but it may also be determined by another method. For example, judgment based on the number of goods that are loaded, or the presence of the input of a clear finish command can be considered.

Moreover, in the foregoing process, the category information read in from the user ID, or the category information corresponding to the card reader 42 may also be included in the command that is created. In this situation, the renewal requests with attached category information, transfer requests and subscription requests can be transmitted to the presence server 10g.

Eighth Embodiment

Figure 44:
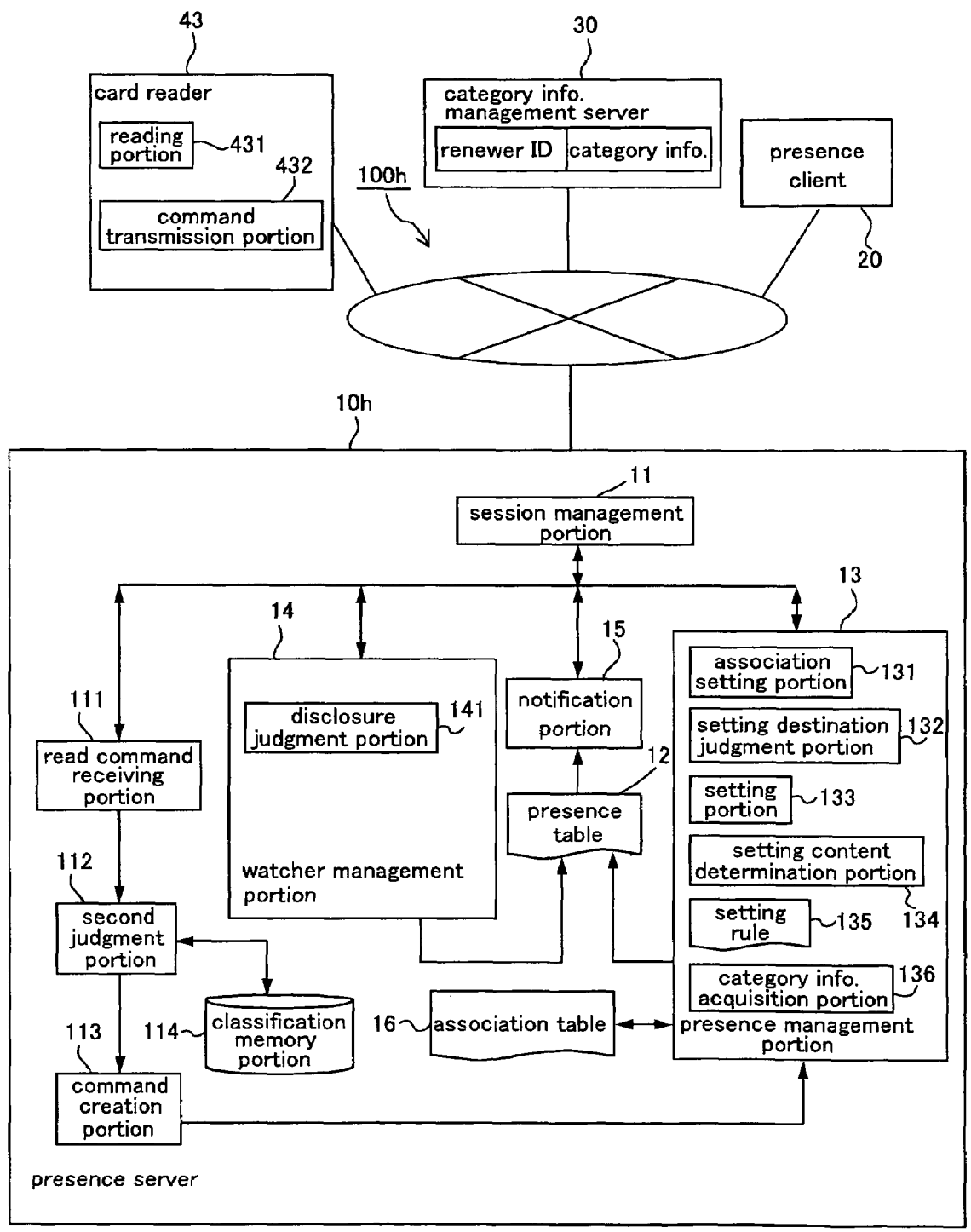
FIG. 44 is a structural overview of a presence system according to an eighth embodiment of the present invention.

FIG. 44 is a structural overview of a presence system 100h according to the eighth embodiment. In the presence system 100h, commands such as renewal requests are created within the presence server, based on information read in by a card reader.

In a similar manner to the presence system 100g of the seventh embodiment, the presence system 100h is constituted by a presence server 10h and a presence client 20, connected via a network. The presence system 100h may also include a category information server 30. Furthermore, the presence server 10h is connected to a card reader 43 via a network. The structural elements shown in the diagram that have a similar function to those in the first embodiment are provided with the same symbols.

Presence Server

In addition to having the configuration of the presence server 10g of the seventh embodiment, the presence server 10h includes the following structural elements.

(a) A read command receiving portion 111: This receives read commands from the card reader 43, and stores history information in a classification memory portion 114, that is described later. The history information includes the same information as in the seventh embodiment.

(b) A second judgment portion 112: This has a similar function to the second judgment portion 423 of the card reader 42 of the seventh embodiment. That is, it determines the type, for example, of the commands that are generated, based on the history information.

(c) A command creation portion 113: This has a similar function to the command creation portion 424 of the card reader 42 of the seventh embodiment. That is, it creates commands, and notifies the presence management portion 13 or the watcher management portion 14.

(d) A classification memory portion 114: This stores information in a similar manner to the classification memory portion 422 of the seventh embodiment (see FIG. 42). The history information can be acquired together with the read commands from the card reader 43.

That is, the presence server 10h has the configuration of the presence server 10g of the seventh embodiment, onto which the configuration of a part of the card reader 42 is attached. The presence server 10h that is configured in such a manner creates commands such as renewal requests based on the read commands, and updates, transfers and subscribes presences based on the commands thus created.

Card Reader

The card reader 43 has a reading portion 431 and a read command creation portion 432. In a similar manner to the reading portion 421 of the card reader 42 of the seventh embodiment, the reading portion 431 reads in information from an IC card (see FIG. 1). The read command creation 432 transmits the information thus read in to the presence server 10h.

Command Creation Process

In the presence system 100h configured as above, the presence server 10h creates a command based on the read command and notifies the presence management portion 13 or the watcher management portion 14. In a similar manner to the second judgment portion 423 of the eighth embodiment, a second judgment portion 112 performs judgment of the type of command to create, determination of the transfer origin and the transfer destination, and determination of the subscribee and the subscriber.

In the present embodiment, commands can be automatically generated in single group units in the presence server 10h.

Ninth Embodiment

Figure 45:
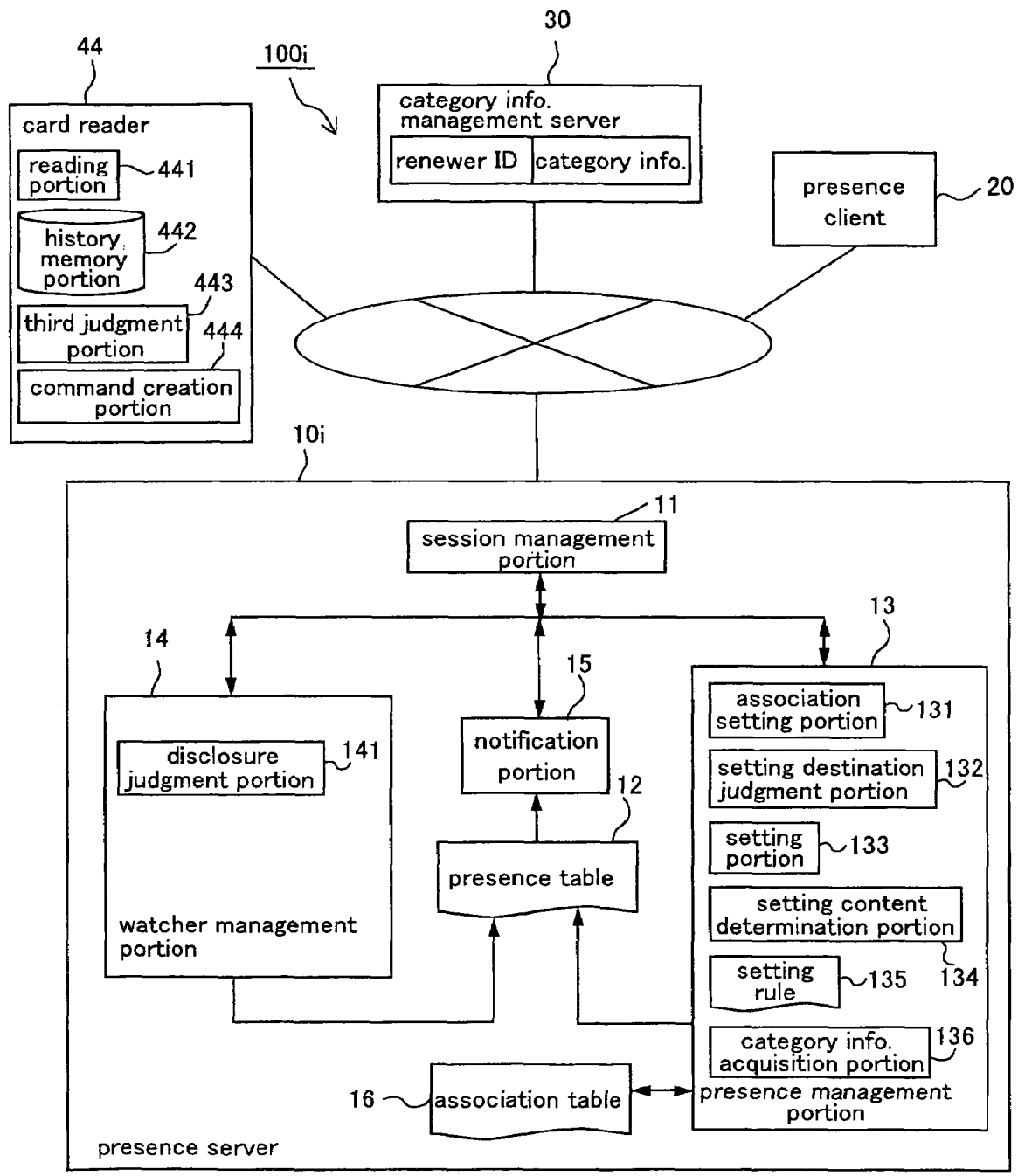
FIG. 45 is a structural overview of a presence system according to a ninth embodiment of the present invention.

FIG. 45 is a structural overview of a presence system 100i according to the ninth embodiment. In the present embodiment, a card reader automatically creates commands such as renewal requests, and transmits them to a presence server.

In a similar manner to the presence system 100e of the fifth embodiment, the presence system 100i is constituted by a presence server 10i and a presence client 20, connected via a network. The presence system 100i may also include a category information server 30. Furthermore, the presence server 10i is connected to a card reader 44 via a network. The structural elements shown in the diagram that have a similar function to those in the first embodiment are provided with the same symbols. The presence server 10i has a similar configuration as the presence server in the fifth embodiment.

Card Reader

The card reader 44 has a reading portion 441, a presence memory portion 442, a third judgment portion 443 and a command creation portion 444. The reading portion 441 reads in information from an IC card (see FIG. 1). The presence memory portion 442 stores a user-presence table, a presence-command table and a history table. The third judgment portion 443 determines the type of command to create based on the information in the presence memory portion 442. Furthermore, if a transfer request is to be created, the third judgment portion 443 determines the transfer origin and the transfer destination. Moreover, if a subscription request is to be created, the third judgment portion 443 determines the subscribee and the subscriber. The command creation portion 444 creates various types of commands based on the decisions of the third judgment portion 443, and transmits them to the presence server 10i.

FIG. 46 is a conceptual diagram of information stored in the classification memory portion 442. FIG. 46A shows a conceptual explanatory diagram of information accumulated in the user-presence table 442a. User IDs, and the presences attributed to those users are associated in the table 442a. For example, the presence "cargo collection point CP1" is associated with the user ID "T" of the truck, and the presence "goods" is associated with the user IDs "G1" and "G2" of the goods. Here, the presence "goods" of the goods is set so as to show the classification of the user.

FIG. 46B shows a conceptual diagram of information that is accumulated in the presence-command table 422b. In this table, presences are associated with command types. "Renewal request" is associated with the presence "cargo collection point CP1", and "transfer request" is associated with the presence "goods".

The user IDs can be associated with the command types in accordance with the user-presence table 442a and the presence-command table 442b. The two tables 442a and 442b are recorded in advance in the presence memory portion 442.

FIG. 46C shows a conceptual diagram of history information that is accumulated in the history table 442c. At least times and user IDs are included in the history information. In this situation, time refers to the time at which the information is read in from the IC card. The user ID is the user ID within the presence system 100i that is recorded on the IC card that is read in. The history information is stored when the card reader 44 reads in the IC card.

Command Creation Process

Figure 47:
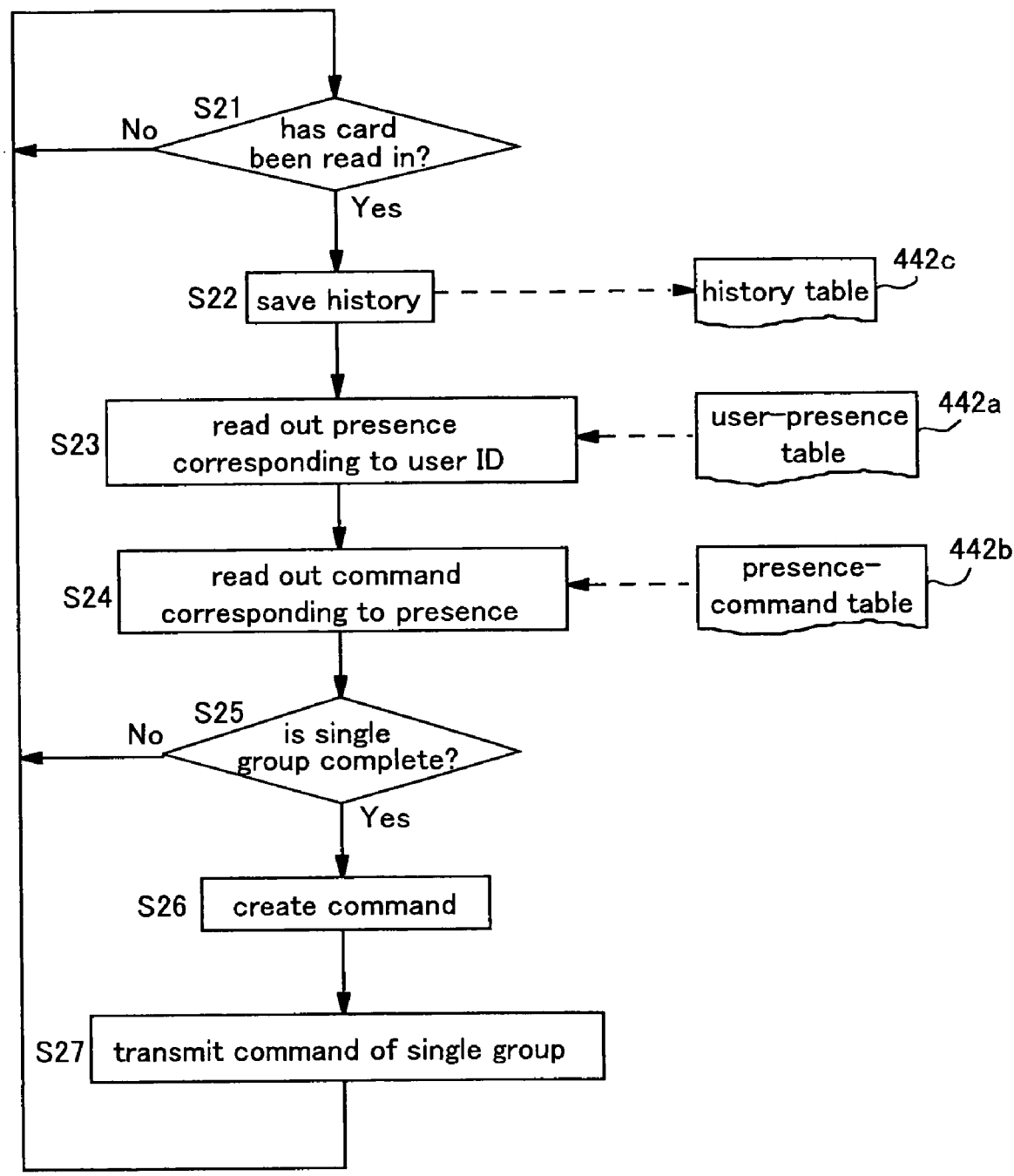
FIG. 47 is a flowchart showing an example of the flow of the command creation process that the card reader of FIG. 45 executes.

FIG. 47 is a flowchart showing an example of the flow of the command creation process that the card reader 44 executes. Here, a plurality of trucks at the cargo collection point CP1 are consecutively loaded with goods. It can be assumed that when one truck has been loaded with goods, the loading process of a single group is concluded. After the loading process of a single group is finished, the loading process of the next group is commenced after a predetermined amount of time.

Step S21: When the user ID of an IC card that is attached to the truck or the goods is read in (S21), the reading portion 441 of the card reader 44 stores (S22) the history information in the presence memory portion 442. Historical information such as the time "15:10" and the user ID "G3" is contained in the history information portion 442 (see FIG. 46). In the following, the entry of the most recent history information that is read in is called the current information.

Step S23: The third judgment portion 443 reads out the presence that corresponds to the user ID of the current entry from the user-presence table 442a.

Step S24: The third judgment portion 443 reads out the command type corresponding to the user ID from the presence-command table 442b. The third judgment portion 443 associates the user ID of the history information, the presence that was read out and the command type that corresponds to these as a single record, and temporarily stores them in a buffer, which is not illustrated.

Step S25: The third judgment portion 443 judges whether or not the process of loading the single group has concluded or not. This judgment can be performed by referring, for example, to the history table 442c, and judging whether or not the time interval between the time of the current entry, and the time of the entry previous to it is greater than a predetermined time interval or not. This decision is made in a similar manner to that of the seventh embodiment.

Step S26: If the process of loading the single group is complete, the third judgment portion 443 creates a command for each record in the single group accumulated in the buffer. If the command type in a given record is a transfer request, then, for example, the presence "cargo collection point CP1" can be specified as the transfer origin, and the transfer destination can be set to the user ID in this record. Creation of a subscription request can also be performed in a similar manner.

Step S27: After this, the single group's worth of commands that were created are sequentially transmitted to the presence server 10i by the command creation portion 44. The presence server 10i performs the setting of renewals and transfers of the presences, and setting of subscription, based on the commands.

By the foregoing process, the card reader 44 can automatically create the commands in single group units by a method other than that of the seventh embodiment.

It should be noted that the foregoing process, in which the information of a single group is stored in the buffer before creating the command is in order to specify the transfer origin or the subscribee within the single group. This point is similar to the seventh embodiment. By this, it is possible to handle situations such as where the IC card of, for example, a truck, is read in not at the start, but en-route, or at the end. However, as in the fifth embodiment, in situations wherein it is decided that the IC card of the truck is to be read in at the start, for example, it is possible to specify from the start that the transfer origin is the truck, and the command may be created and transmitted each time the IC card is read in.

Furthermore, in the foregoing process, although the decision as to whether or not the process of loading the single group is complete is determined by time interval, it is also possible to make this decision by another method, similar to that of the seventh embodiment. For example, judgment based on the number of goods that are loaded, or the presence or absence of the input of a clear finish command may be considered.

Moreover, in the foregoing process, the category information that was read in from the user ID or the category information corresponding to the card reader 42 may also be included in the command that is created. In this situation, renewal requests, transfer requests and subscription requests with attached category information are transmitted to the presence server 10g.

Tenth Embodiment

Figure 48:
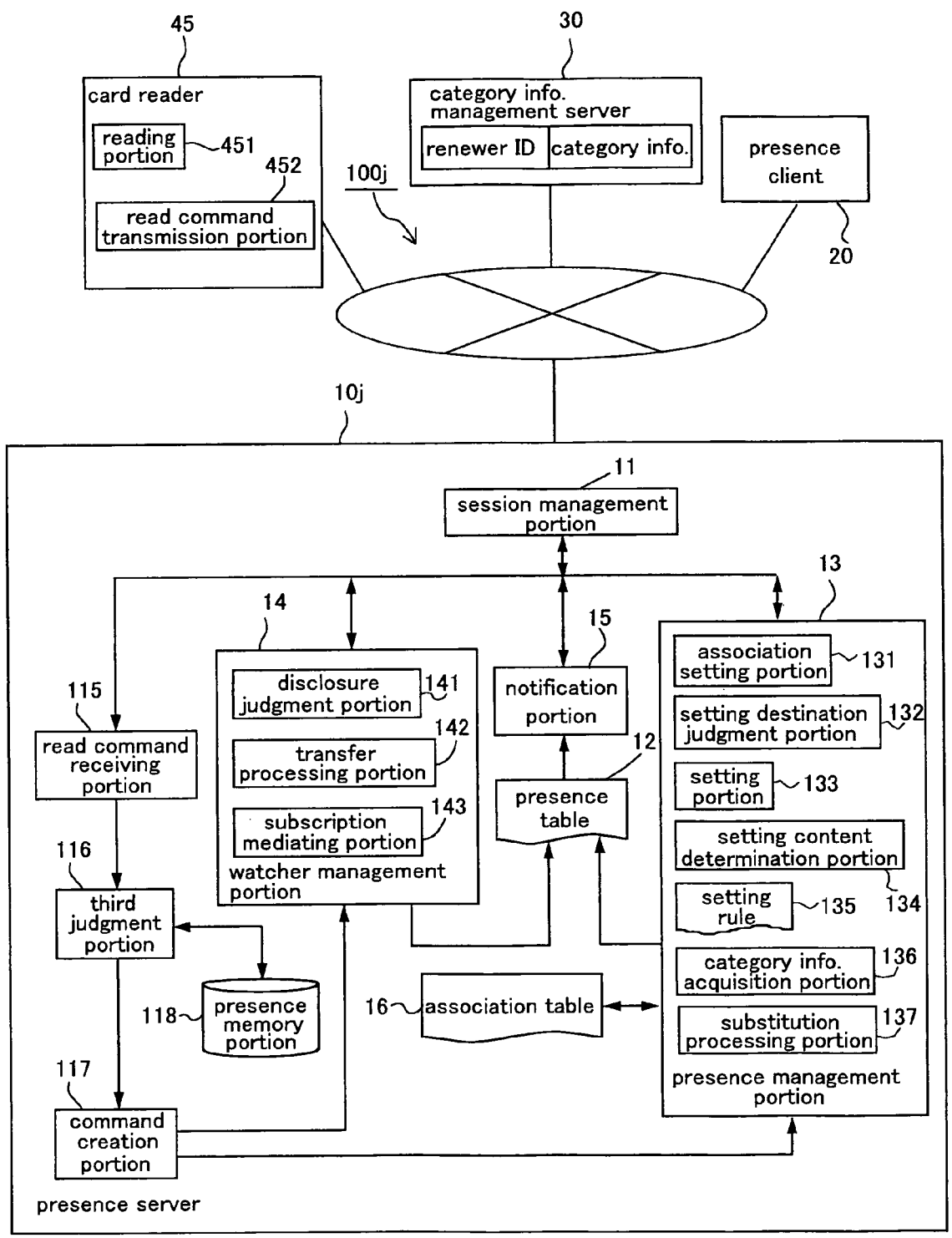
FIG. 48 is a structural overview of a presence system according to a tenth embodiment of the present invention.

FIG. 48 is a structural overview of a presence system 100j according to the tenth embodiment. In the presence system 100j, commands such as renewal requests are created within the presence server, based on information read in by a card reader.

In a similar manner to the presence system 100i of the ninth embodiment, the presence system 100j is constituted by a presence server 10j and a presence client 20 that are connected via a network. The presence system 100j may also include the category information management portion 30. Furthermore, the presence server 10j is connected to a card reader 45 via a network. The structural elements shown in the diagram that have a similar function to those in the first embodiment are provided with the same symbols.

Presence Server

In addition to having a similar configuration to the presence server 10i of the ninth embodiment, the presence server 10j also includes the following structural elements.

(a) A read command receiving portion 115: This receives read commands from the card reader 45, and stores history data in a presence memory portion 118 that will be explained later. The history information includes information similar to the history information in the ninth embodiment.

(b) A third judgment portion 116: This has the same function as that of the third judgment portion 443 of the card reader 45 of the ninth embodiment. That is, it determines the types, for example, of the commands to create, based on information in the presence memory portion 118 that will be explained later.

(c) A command creation portion 117: This has the same function as the command creation portion 444 in the card reader 45 of the ninth embodiment. That is, it creates commands, and notifies them to the presence management portion 13 or the watcher management portion 14.

(d) A presence memory portion 118: This stores information in a similar manner to that of the presence memory portion 442 of the ninth embodiment (see FIG. 46). The history information can be acquired together with the read command from the card reader 45.

That is, the presence server 10j has the configuration of the presence server 10i of the ninth embodiment, in addition to the configuration of a part of the card reader 44. The presence server 10j, configured in this manner creates commands such as renewal requests based on read commands, and performs renewals, transfers and subscription of presences based on the commands thus created.

Card Reader

The card reader 45 has a reading portion 451 and a read command creation portion 452. The reading portion 451 is similar to the reading portion 441 of the card reader 44 of the ninth embodiment, and it reads in information from an IC card (see FIG. 1). The read command creation portion 452 transmits the read in information to the presence server 10j.

Command Creation Process

In the presence system 100j such as that configured above, the presence server 10j creates commands based on the read commands, and notifies the presence management portion 13 or the watcher portion, 14. Judgment of the type of command to create, and decisions on the transfer origin and the transfer destination, and the subscriber and the subscriber are carried out by the third judgment portion 116 in a similar manner to that of the third judgment portion 443 of the ninth embodiment.

In the present embodiment, commands can be automatically created in the presence server 10j in single group units.

Eleventh Embodiment

Figure 49:
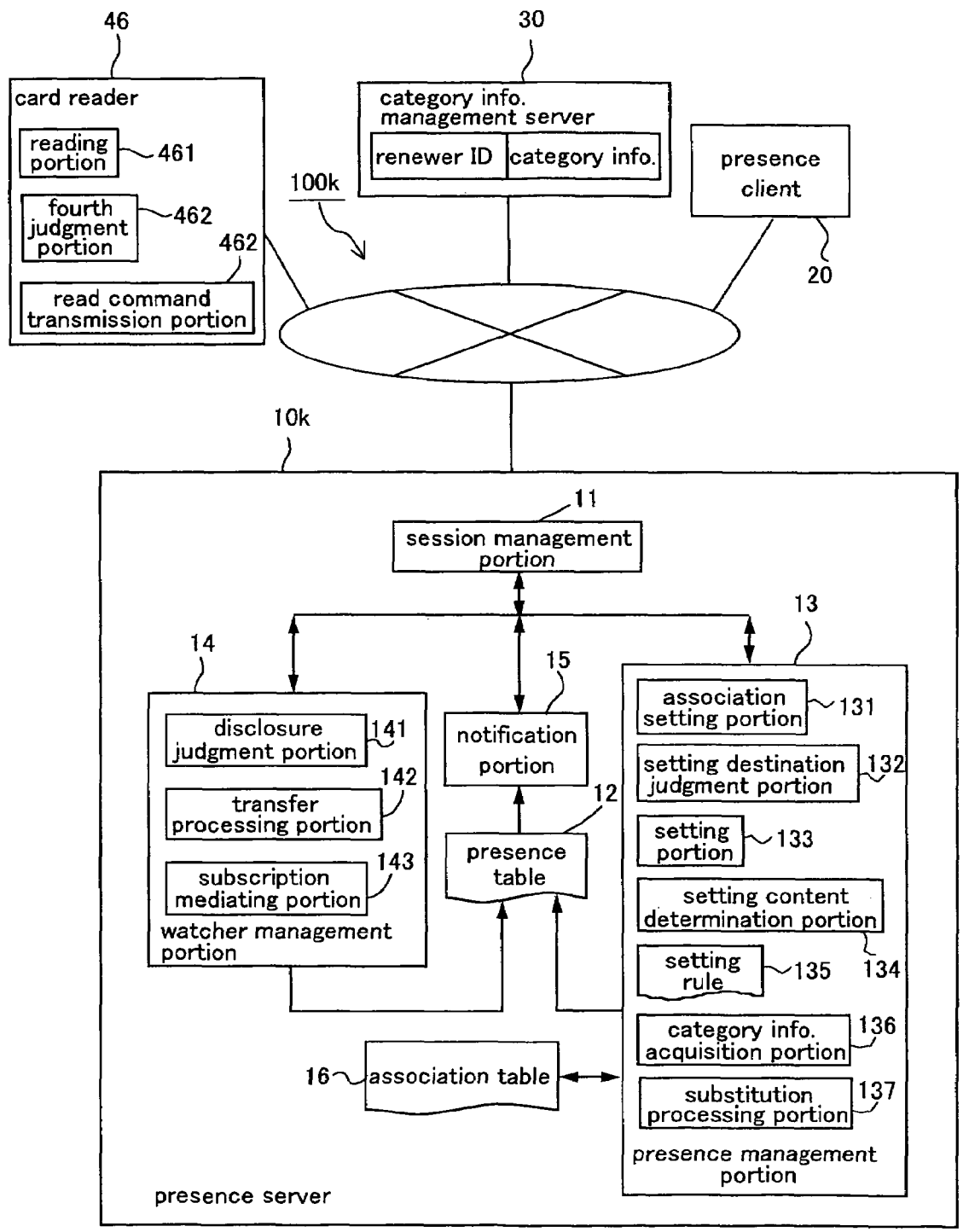
FIG. 49 is a structural overview of a presence system according to an eleventh embodiment of the present invention.

FIG. 49 is a structural overview of a presence system 100k according to the eleventh embodiment. In the present embodiment, a card reader automatically creates commands for transfer requests or transfer cancellation requests, and transmits them to a presence server.

The presence system 100k is configured by a presence server 10k and a presence client 20, connected via a network. The presence system 100k may also include a category information server 30. Furthermore, the presence server 10k is connected to the card reader 44 via a network. The structural elements shown in the diagram that have a similar function to those in the first embodiment are provided with the same symbols. The presence server 10k has the same configuration as the presence server of the fifth embodiment.

Card Reader

A card reader 46 has a reading portion 461, a fourth judgment portion 462 and a command creation portion 463. The reading portion 461 reads in user IDs from an IC card (see FIG. 1).

The fourth judgment portion 462 acquires presences corresponding to category information of the user ID and the card reader from the presence server 10k. The fourth judgment portion 462 creates or determines one of either a transfer request or a transfer cancellation request, based on the presence that was acquired. Moreover, if a transfer request is created, the fourth judgment portion 462 determines the transfer origin and the transfer destination. The method for making this decision may use methods described in the fifth to tenth embodiments.

The command creation portion 463 creates a command for a transfer request or transfer cancellation request based on the decision of the fourth judgment portion 462, and transmits it to the presence server 10k. The watcher management portion 14 of the presence server 10k that receives this transmission transfer sets or cancels the transfer setting by the transfer processing portion 142.

Command Creation Process

Figure 50:
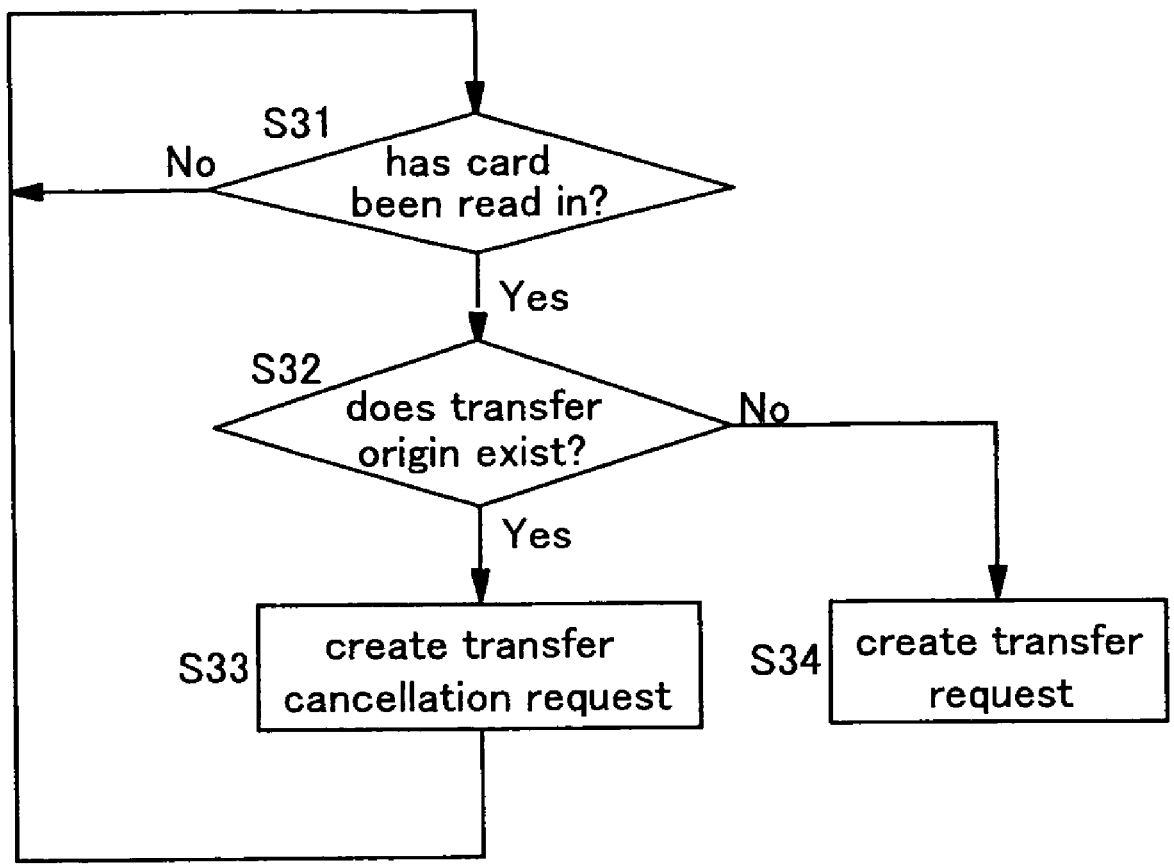
FIG. 50 is a flowchart showing an example of the command creation process that the card reader of FIG. 49 executes.

FIG. 50 is a flowchart showing an example of the flow of the command creation process that the card reader 46 executes.

Step S31: The reading portion 461 of the card reader 46 reads in at least the user ID from the IC card attached to the truck or the goods.

Step S32: The fourth judgment portion 462 acquires the presence corresponding to the user ID that was read in with the category information that is stored in the card reader 46, from the presence server 10k. Moreover the fourth judgment portion 462 specifies the presence ID corresponding to the user ID and the category information, and judges whether or not the transfer origin is provided in that presence ID.

Depending on the form in which the presence is stored, information on the transfer origin that is stored in association with the presence of a given user ID may also be acquired, where necessary, based on that user ID.

Step S33: If the transfer origin is set, then the fourth judgment portion 462 determines the command type to be "cancel transfer". After which the command creation portion 463 creates the transfer cancellation request command, and transmits it to the presence server 10k. The user ID and the presence ID are included in this command. The transfer processing portion 142 of the presence server 10k that receives this cancels the presence transfer setting that is specified by the user ID and the presence ID.

Step 34: If the transfer origin in the presence ID that the fourth judgment portion 462 has specified is not set, then the fourth judgment portion 462 determines the command type to be a "transfer request". The transfer origin can be determined by the methods described in the fifth to tenth embodiments. After this, the command creation portion 463 creates the transfer request command, and transmits it to the presence server 10k.

By the forgoing process, commands for transfer requests or transfer cancellation requests can be created in the card reader 46, and can be transmitted to the presence server 10k. In a similar manner, depending on whether or not a watcher is already set to the presence, a subscription command or a subscription cancellation command can be created.

It should be noted that it is also possible to provide the function of the fourth judgment portion 462 in the presence server 10k, and possible to create the command for transfer request or transfer cancellation request on the presence server 10k. In this situation, it is sufficient that the user ID and the category information that the card reader 46 read in are transmitted to the presence server 10k. In the situation where the category information management server 30 is present, the category information may also be acquired from that server.

Other Embodiments (A) The forgoing embodiments can be used in appropriate combination, depending on necessity.

(B) Programs, and recording media that are computer readable on which the programs thereof are recorded, for executing the foregoing methods, are included in the scope of the present invention. Computer readable flexible disks, hard disks, semiconductor memory, CD-ROMs, DVDs, magneto-optical disks (MOs) and other media may be used here as the recording media.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A presence system that manages presences of a user identified by a user identifier that specifies the user, the presence system comprising:
   a reception unit for receiving a renewal request that includes:
      a user identifier of a renewer, who is a user other than the owner of the presences;
      a user identifier of an object to be renewed, the object possessing a presence that the renewer attempts to set, and
      a presence that the renewer attempts to set;
   a category acquisition unit for acquiring category information associated with the renewer, wherein the category information represents the category of the content of the presence;
   an association table that stores an association of the identifiers of the presences of the object to be renewed, and the category information;
   a presence specification unit for referring to the association table, and for specifying the presence identifier associated with the category information corresponding to the renewer, and
   a presence setting unit for setting the presence included in the renewal request, with respect to the specified presence identifier.

2. The presence system according to claim 1, wherein the renewal request further includes the category information, and wherein the category acquisition unit acquires the category information from the reception unit.

3. The presence system according to claim 1, further comprising:
   a category information management unit for storing a category information management table that stores the category information in association with the user identifier of the renewer;
   wherein the category acquisition unit acquires category information corresponding to the renewer from the category information management unit.

4. The presence system according to claim 1, further comprising:
   a conversion rule table that stores conversion rules for converting the presence included in the renewal request into another presence, and
   a conversion unit for converting the presence included in the renewal request in accordance with the conversion rules.

5. The presence system according to claim 1, further comprising:
   a requester memory unit for storing the user identifier of the renewer and the category information associated with the renewer;
   a category information notification unit for notifying the category information associated with the renewer, to the object to be renewed before the reception unit receives the transfer request, and
   an association reception unit for receiving an association of the identifier of each presence of the object that is to be renewed with the category information associated with the renewer, and storing it in the association table.

6. A presence management method performed by a computer for managing presences of a user identified by a user identifier that specifies the user, the presence management method comprising:
- a reception step for receiving, by the computer, a renewal request that includes:
  - a user identifier of a renewer, who is a user other than the owner of the presences;
  - a user identifier of an object to be renewed, the object possessing a presence that the renewer attempts to set, and
  - a presence that the renewer attempts to set;
- a category acquisition step for acquiring, by the computer, category information associated with the renewer, wherein the category information represents the category of the content of the presence;
- an association memory step for storing, in a storage medium, an association table that stores an association of the identifiers of the presences of the object to be renewed, and the category information;
- a presence specification step for referring to the association table stored in the storage medium, and for specifying the presence identifier associated with the category information corresponding to the renewer, and
- a presence setting step for setting, by the computer, the presence included in the renewal request, associated with the specified presence identifier.

7. A computer readable recording medium on which a presence management program is recorded in order to execute the management of presences of a user identified by a user identifier that specifies the user, the presence management program comprising:
- a reception step for receiving a renewal request that includes:
  - a user identifier of a renewer, who is a user other than the owner of the presences;
  - a user identifier of an object to be renewed, the object possessing a presence that the renewer attempts to set, and
  - a presence that the renewer attempts to set;
- a category acquisition step for acquiring category information associated with the renewer, wherein the category information represents the category of the content of the presence;
- an association memory step for storing an association table that stores an association of the identifiers of the presences of the object to be renewed, and the category information;
- a presence specification step for referring to the association table, and for specifying the presence identifier associated with the category information corresponding to the renewer, and
- a presence setting step for setting the presence included in the renewal request, associated with the specified presence identifier.

8. A presence management program for managing presences of a user identified by a user identifier that specifies the user, the presence program causing a computer to function as:
- a reception unit for receiving a renewal request that includes:
  - a user identifier of a renewer, who is a user other than the owner of the presences;
  - a user identifier of an object to be renewed, the object possessing a presence that the renewer attempts to set, and
  - a presence that the renewer attempts to set;
- a category acquisition unit for acquiring category information associated with the renewer, wherein the category information represents the category of the content of the presence;
- an association table that stores an association of the identifiers of the presences of the object to be renewed, and the category information;
- a presence specification unit for referring to the association table, and for specifying the presence identifier associated with the category information corresponding to the renewer, and
- a presence setting unit for setting the presence included in the renewal request, associated with the specified presence identifier.

9. A presence system that manages presences of a user identified by a user identifier, the presence system comprising:
- an acquisition unit for acquiring a user identifier of a requester, who is a user other than the owner of a given presence, a user identifier of an object that possesses a presence and category information that expresses the category of any presence, and that is associated with the renewer or the object;
- a deciding unit for determining the type of command to process the presence of the object;
- a command creation unit for creating commands that include the type of the command that the deciding unit determines, category information that the acquiring unit acquires, and the user identifier of the object; and
- a command execution unit for receiving commands created by the command creation unit, for performing renewal of the presence of the object, subscription/subscription cancellation, or transfer/transfer cancellation in accordance with the commands thereof.

10. The presence system according to claim 9, wherein the acquisition unit further acquires an acquisition time of the user identifier of the requester, the presence system further comprising:
- a history memory unit for storing acquired history including the user identifier of the object and the acquisition time,
- wherein when a user identifier of a new requester is acquired, the judgment unit judges whether or not the user identifier of the object was acquired within a past predetermined time interval $\Delta T$, based on the acquisition history, and determines the type of the command based on the decision.

11. The presence system according to claim 10, wherein if the type of the command that was decided is transfer, then the judgment unit sets any one of the user identifiers of the objects acquired within the past predetermined time interval $\Delta T$ to be the user identifier of the transfer origin user.

12. The presence system according to claim 9, further comprising:
- a corresponding memory unit for storing the association of the user identifier of the object and the type of the command;
- wherein the judgment unit determines the command type corresponding to the user identifier of the object based on the association stored in the corresponding memory unit.

13. The presence system according to claim 12, wherein the acquisition unit further acquires an acquisition time of the user identifier of the requester, the presence system further comprising:

a history memory unit for storing an acquisition history including the user identifier of the object and the acquisition timing thereof;

wherein the judgment unit groups the user identifier of the object based on the acquisition history, and if the command type is transfer or subscription, then the judgment unit specifies the user identifier that will be the transfer origin and the subscribee, within the single group.

14. The presence system according to claim 9, further comprising:

a presence content acquisition unit for acquiring the content of a presence based on the user identifier of the object and the category information corresponding to the requester or the object;

wherein the judgment unit judges whether or not the transfer origin is set in the acquired presence content, and designates the command type as either transfer or transfer cancellation, based on the judgment result.

* * * * *